(12) United States Patent
Tabu et al.

(10) Patent No.: US 6,560,219 B1
(45) Date of Patent: May 6, 2003

(54) HYBRID EXCHANGE, AN EXCHANGE, AND A RE-ARRANGEMENT METHOD FOR STM DATA IN AN EXCHANGE

(75) Inventors: Takashi Tabu, Tokyo (JP); Masami Murayama, Yokohama (JP); Sachiko Inoue, Sagamihara (JP); Hidehiko Suzuki, Kawasaki (JP); Yoshihiro Kubota, Kawasaki (JP); Kohei Ueki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/951,883

(22) Filed: Oct. 16, 1997

(30) Foreign Application Priority Data

Oct. 17, 1996 (JP) ............................... 8-275146
Sep. 9, 1997 (JP) ............................... 9-244169

(51) Int. Cl.[7] ............................................. H04L 12/64

(52) U.S. Cl. ...................................... 370/352; 370/353

(58) Field of Search ............................. 370/466, 474, 370/465, 395, 476, 477, 397, 352, 353, 493, 494, 495, 354, 355

(56) References Cited

U.S. PATENT DOCUMENTS

| | | | | |
|---|---|---|---|---|
| 4,926,416 A | * | 5/1990 | Weik | 370/354 |
| 5,173,901 A | * | 12/1992 | De Somer | 370/396 |
| 5,204,857 A | * | 4/1993 | Obara | |
| 5,206,858 A | * | 4/1993 | Nalcano et al. | |
| 5,287,348 A | | 2/1994 | Schmidt et al. | |
| 5,301,189 A | | 4/1994 | Schmidt et al. | |
| 5,341,376 A | * | 8/1994 | Yamashita | 370/466 |
| 5,577,037 A | * | 11/1996 | Takatori et al. | 370/395.7 |
| 6,009,100 A | * | 12/1999 | Gausmann et al. | |

FOREIGN PATENT DOCUMENTS

| | | |
|---|---|---|
| JP | 60-245339 | 12/1985 |
| JP | 60-254860 | 12/1985 |
| JP | 61-2454 | 1/1986 |
| JP | 61-5655 | 1/1986 |
| JP | 61-292495 | 12/1986 |
| JP | 62-102637 | 5/1987 |
| JP | 62-104397 | 5/1987 |
| JP | 62-136997 | 6/1987 |
| JP | 63-70637 | 3/1988 |
| JP | 1-148000 | 6/1989 |
| JP | 2-224547 | 9/1990 |
| JP | 2-276339 | 11/1990 |
| JP | 5-37548 | 2/1993 |
| JP | 5-191436 | 7/1993 |

(List continued on next page.)

OTHER PUBLICATIONS

A Slotted Ring Copy Fabric for a Multicast Fast Packet Switch; Peter Newman, Mattew Doar The University of CAmbridge Computer LAboratory.

*Primary Examiner*—Ken Vanderpuye
(74) *Attorney, Agent, or Firm*—Katten Muchin Zavis Roseman

(57) ABSTRACT

A hybrid exchange which exchanges the STM data to be transmitted periodically to realize an exchange in unit of the ATM data to be transmitted asynchronously includes asynchronous transmission terminal interface as the interface with an STM terminal, an synchronous transmission terminal interface as the interface with an ATM terminal, an ATM exchange interface as the interface with an ATM exchange, a transmitting unit for transmitting the STM time slot and ATM time slot, and a control unit for controlling the interfaces. The synchronous transmission terminal interface assigns the STM data to be transmitted periodically to the STM time slot, while the asynchronous transmission terminal interface assigns the ATM data to be transmitted asynchronously to the ATM time slot. The STM time slot and ATM time slot are identified by the STM/ATM identifier. The STM time slot is stored by multiplexing a plurality of STM data.

20 Claims, 44 Drawing Sheets

FOREIGN PATENT DOCUMENTS

| | | |
|---|---|---|
| JP | 5-336159 | 12/1993 |
| JP | 07058779 | 3/1995 |
| JP | 07162437 | 6/1995 |
| JP | 08191306 | 7/1996 |

* cited by examiner

FIG. 25(a)

| ADD. | |
|---|---|
| 0 | 1-H1 |
| 1 | 1-H2 |
| 2 | 1-H3 |
| 3 | 1-H4 |
| 4 | 1-H5 |
| 5 | 1-P1 |
| 6 | 1-P2 |
| 7 | 1-P3 |
| 8 | 1-P4 |
| 9 | 1-P5 |
| 10 | 1-P6 |
| 11 | 1-P7 |
| 12 | 1-P8 |
| 13 | 1-P9 |
| 14 | 1-P10 |
| 15 | 1-P11 |
| 16 | 1-P12 |
| ⋮ | ⋮ |
| 2316 | 44-P33 |
| 2317 | 44-P34 |
| 2318 | 44-P35 |
| 2319 | 44-P36 |
| 2320 | 44-P37 |
| 2321 | 44-P38 |
| 2322 | 44-P39 |
| 2323 | 44-P40 |
| 2324 | 44-P41 |
| 2325 | 44-P42 |
| 2326 | 44-P43 |
| 2327 | 44-P44 |
| 2328 | 44-P45 |
| 2329 | 44-P46 |
| 2330 | 44-P47 |
| 2331 | 44-P48 |

CORRESPONDING TO SMALL UNIT 703

FIG. 25(b)

| ADD. | |
|---|---|
| 0 | 1-H1 |
| 1 | 1-H2 |
| 2 | 1-H3 |
| 3 | 1-H4 |
| 4 | 1-H5 |
| 5 | 1-P1 |
| 6 | 1-P2 |
| 7 | 1-P3 |
| 8 | 1-P4 |
| 9 | 1-P5 |
| 10 | 1-P6 |
| 11 | 1-P7 |
| 12 | 1-P8 |
| 13 | 1-P9 |
| 14 | 1-P10 |
| 15 | 1-P11 |
| 16 | 1-P12 |
| ⋮ | ⋮ |
| 18640 | 352-P33 |
| 18641 | 352-P34 |
| 18642 | 352-P35 |
| 18643 | 352-P36 |
| 18644 | 352-P37 |
| 18645 | 352-P38 |
| 18646 | 352-P39 |
| 18647 | 352-P40 |
| 18648 | 352-P41 |
| 18649 | 352-P42 |
| 18650 | 352-P43 |
| 18651 | 352-P44 |
| 18652 | 352-P45 |
| 18653 | 352-P46 |
| 18654 | 352-P47 |
| 18655 | 352-P48 |

CORRESPONDING TO LARGE UNIT

OLD AND NEW MAPPING EXAMPLE
IN THE EMBODIMENT 2

| CELL NO. | IDLE/BUSY INFORMATION | DESTINATION |
|---|---|---|
| 1 | 1 | |
| 2 | 1 | |
| 3 | 0 | |
| ⋮ | | |
| n | | |

FIG. 38

| CELL NO. | PL NO. | IDLE/BUSY INFORMATION | SUBSCRIBER |
|---|---|---|---|
| 1 | 1 | 1 | |
| | 2 | 1 | |
| | 3 | 1 | |
| | ⋮ | | |
| | 48 | 1 | |
| 2 | 1 | 1 | |
| | 2 | 1 | |
| | | | |
| | 10 | 1 → 0 | |
| | | | |
| | 48 | 1 | |
| 3 | 1 | 1 | |
| | 2 | 1 | |
| | 3 | 0 | — |
| | | | |
| | 48 | 0 | — |
| ⋮ | ⋮ | ⋮ | ⋮ |
| n | 1 | 0 | — |
| | 2 | 0 | — |
| | | | |
| | 48 | 0 | — |

FIG. 39

HYBRID EXCHANGE, AN EXCHANGE, AND A RE-ARRANGEMENT METHOD FOR STM DATA IN AN EXCHANGE

BACKGROUND OF THE INVENTION

1. Field of the Invention

The present invention relates in general to a hybrid exchange for exchanging the STM (Synchronous Transfer Mode) data of narrow band calls such as voice data and the ATM (Asynchronous Transfer Mode) data of broad band calls and, more specifically to a hybrid exchange for exchanging the STM data in unit of each STM data by periodically transmitting this data using the STM time slot, an exchange for exchanging a plurality of STM data composite in unit of each STM data by periodically transmitting the data using the STM time slot and a re-arrangement method for STM data in exchange for re-arranging the STM data among a plurality of fixed length packets.

2. Description of the Related Art

FIG. 1 is a diagram showing an STM exchange for exchanging the STM data such as voice data. In the bTM exchange, the STM data which is periodically assigned to the time slot appearing on the frame in the predetermined period is exchanged in every time slot depending on the preset information For example, in FIG. 1, for the input line 1, A is assigned periodically to the time slot TS1, while B to the time slot TS2 and C to the time slot TS3. In the same manner, a, b, c are respectively assigned to each time slot in regard to the input line 2. Depending on the preset information, the STM data A assigned to the time slot TS1 on the input line 1, for example, is exchanged to the time slot TS2 of the output line 2. As explained above, the exchange system in the STM exchange is suitable for the communication for periodically sending information such as voice data.

However, on the occasion of dealing with the communication for sending the information generated like a burst signal with the STM exchange, an idle area is generated in the time slot to be periodically assigned and thereby transmission efficiency may be deteriorated.

Therefore, for the data which is generated like a burst signal in the data terminal, etc., a packet exchange system has been proposed to realize exchange of data by using a packet of the variable lengths and then adding a header indicating the destination address to the packet. However, the packet exchange requires the time for exchanging one packet because it executes the exchange process by analyzing destination address of the header added to the packet. Accordingly, the packet exchange is not suitable for transmission of broad band data.

Considering the background as explained above, there is provided an ATM exchange system in which data is divided in unit of data of the fixed length; a header information is added to the divided data to generate ATM cells; these ATM cells are asynchronously transmitted and the ATM exchange executes the exchange process from the point of view of hardware depending on the value of header added to the ATM cell. According to the ATM exchange system, the data which is generated like a broad band burst signal may be transmitted as in the case of the dynamic image communication terminal.

FIG. 2 is a diagram showing a network in which the ATM exchange and STM exchange are used simultaneously. In FIG. 2, the ATM network 10 is composed of a plurality of ATM exchanges and transmits the data through the ATM cell which is the packet in the fixed length of 53 bytes. The ATM network 10 accommodates, on the one hand, ATM terminals X, Y for transmitting the ATM data and on the other hand, accommodates, STM exchanges 20, 30, via ATM interfaces 40, 50, to accommodate STM terminals a, b for transmitting the STM data.

The ATM data from the ATM terminal X is transmitted, for every generation of data, to the ATM network 10 through the payload of the ATM cell having the header H indicating the ATM terminal Y. The ATM network 10 transmits this ATM cell to the ATM terminal Y depending on the routing information of the header H.

Meanwhile, the STM data from the STM terminal a is superimposed on the time slots which are periodically assigned and then transmitted to the STM exchange 20. For example, when the STM terminal a is designed as a voice terminal of 64 Kbps, the STM data is transmitted through the time slot of 8 bits assigned in the period of 125 $\mu$s. This STM data is processed first in the STM exchange and then transmitted to the ATM interface 40. The ATM interface is provided for transferring the data between the time slot and ATM cell with each other. The ATM interface 40 loads this ATM data, for transmission to the ATM network 10, to one byte of the payload of the ATM cell having the header directed to the STM exchange 30 accommodating the STM terminal b. The ATM network 10 transmits the ATM cell loading this STM data, without any discrimination from the ordinary ATM cell, depending on the routing information of the header H of the ATM cell. The ATM interface 50 extracts, upon reception of this ATM cell, the STM data from the predetermined position of the payload and then sends this ATM cell to the STM exchange 30 using the time slot periodically assigned. The STM exchange 30 executes the exchange process of the time slot and then sends the STM data to the STM terminal b of the destination address.

In the present situation, the greater part of the terminals is formed almost of the STM terminals such as telephone sets and ATM terminals are only introduced gradually by means of dynamic image communication terminals. Therefore, it will be very convenient when the ATM terminals which are gradually introduced can also be accommodated in the STM exchange as well as the STM terminals.

However, the STM exchange intrinsically introduces the synchronous transfer mode system for periodically assigning the time slot in unit of STM data to each STM terminal. For example, the telephone set of 64 Kbps is manufactured based on the hardware and software for exchanging and processing the data by assigning the time slot in unit of 8 bits for every other 125 $\mu$s. Therefore, the STM exchange of the related art has a problem that it cannot execute the exchange process for the ATM cell in unit of 53 bytes in different exchange unit.

Meanwhile, the ATM exchange is designed on the basis of the hardware and software of the asynchronous transfer mode for transferring the data as required when data is generated as the ATM cell of 53 bytes. Accordingly, when it is required to manufacture the STM exchange and ATM exchange, it is impossible to use in common the hardware and software for the STM exchange and ATM exchange and thereby there rises a problem that manufacturing cost cannot be reduced.

SUMMARY OF THE INVENTION

It is an object of the present invention to reduce manufacturing cost and effectively develop the STM exchange and the ATM exchange by using common hardware and software for the basic configuration of the STM exchange and the ATM exchange.

It is another object of the present invention to provide a hybrid exchange for exchanging the STM data to be transmitted periodically to enable the data exchange in unit of the ATM data to be transmitted asynchronously.

Yet another object of the present invention is to provide a hybrid exchange for enabling transmission of STM data such as voice data through reduction of the transmission delay.

A further object of the present invention is to provide a hybrid exchange which is connected to an ATM exchange for transmitting the ATM data in the form of ATM cell in order to transmit and exchange the STM data of the STM time slot even with an ATM exchange.

Yet another object of the present invention is to provide an exchange which establishes reception sequence of the STM data for communication of the STM data via the ATM network including the ATM exchange.

Yet a further object of the present invention is to provide an exchange which enables efficient use of payload for transmission of a plurality of STM data in the form of the ATM cell of the payload composite.

These and other objects of the invention are attained by a hybrid exchange for exchanging periodically transmitted first data and second data through time-division slots of a fixed length which includes a first time slot and a second time slot, the hybrid exchange comprising first inserting means for periodically assigning said first time slot to said first data and inserting said first data to said first time slot with an identifier which indicates the first data; second inserting means for non-periodically assigning said second slot to said second data and inserting said second data to said second time slot with an identifier which indicates the second data; first extracting means for identifying said first time slot and extracting said first data from said first time slot; and second extracting means for identifying said second time slot with an identifier which indicates said second data and extracting said second data from said second time slot.

The objects of the present invention are also attained by a hybrid exchange for exchanging STM data and ATM data transmitted periodically through a time-division-multiplexed time slot of a fixed length, said time slot being formed of an STM time slot and an ATM time slot; and hybrid exchange comprising first inserting means for periodically assigning said STM time slot to the STM data and inserting said STM data to said STM time slot with an STM/ATM identifier indicating the STM data; second inserting means for non-periodically assigning said ATM time slot to the ATM data and inserting said ATM data to said ATM time slot with the STM/ATM identifier indicating the ATM data; first extracting means for identifying said STM time slot with said STM/ATM identifier and extracting said STM data from said STM time slot; and second extracting means for identifying said ATM time slot with said STM/ATM identifier and extracting said ATM data from said ATM time slot.

The objects of the present invention are also attained by a hybrid exchange according to claim 4, wherein said first inserting means inserts the STM/ATM identifier to the header of said fixed length packet and the fixed length packet obtained by multiplexing a plurality of STM data to the payload section, and said first extracting means extracts the STM data from the payload section of said fixed length packet. A hybrid exchange for exchanging a first fixed length packet for storing an STM data composition of a plurality of subscribers and a second fixed length packet for storing STM data of one subscriber to the payload of the fixed length packet, the hybrid exchange comprising an identifier setting means for setting an STM/ATM identifier indicating existence of the STM data to a header of the first fixed length packet and setting the STM/ATM identifier indicating existence of the ATM data to a header of the second fixed length packet; a sequence information setting means for setting a sequence information regarding a periodical sequence to the header of said first fixed length packet; a storing means for storing the sequence information in the header of the first fixed length packet and position information in payload of the first fixed length packet corresponding to each STM data; an identifying means for identifying the first and second fixed length packets depending on the STM/ATM identifier; an STM data exchanging means for exchanging the first fixed length packet on the basis of the sequence information and position information stored in said storing means; and an ATM data exchanging means for exchanging the second fixed length packet in unit of the ATM data.

The ATM exchange interface section may comprise means for setting a management information consisting of transmission sequence information of the ATM cells transmitted to the ATM exchange in the predetermined period and identifying information for identifying the self hybrid exchange to the ATM cell assembled from the first fixed length packet, and means for setting the receiving sequence of the ATM cells received within the predetermined period on the basis of the management information of the ATM cells.

The objects of the present invention are further attained by a method for re-arranging STM data in an exchange for transmitting and receiving a fixed length packet arranging a plurality of STM data in the payload of the fixed length packet depending on a destination in a header of the fixed length packet and switching such STM data in unit of the STM data arranged in the payload, the method comprising the steps of detecting a fixed length packet having the idle areas larger than a predetermined vale in the payload in a plurality of fixed length packet; judging whether or not the total value of the idle area of the payload in a plurality of fixed length packets detected in said detecting step is larger than the predetermined value; and re-arranging the STM data arranged in the payload of a plurality of the fixed length packets to eliminate the idle area in the payload when the total idle area in the payload of a plurality of fixed length packets is judged to be larger than the predetermined value in said judged step.

BRIEF DESCRIPTION OF THE DRAWINGS

FIGS. 25(a) and 25(b) show diagrams showing a practical examples of the mapping table;

FIG. 38 is a diagram showing contents of an ATM cell idle/busy management·transmission address identifying data 1610;

FIG. 39 is a diagram showing contents of an ATM cell payload idle/busy management data 1620;

DESCRIPTION OF THE PREFERRED EMBODIMENTS

Figure 3A:
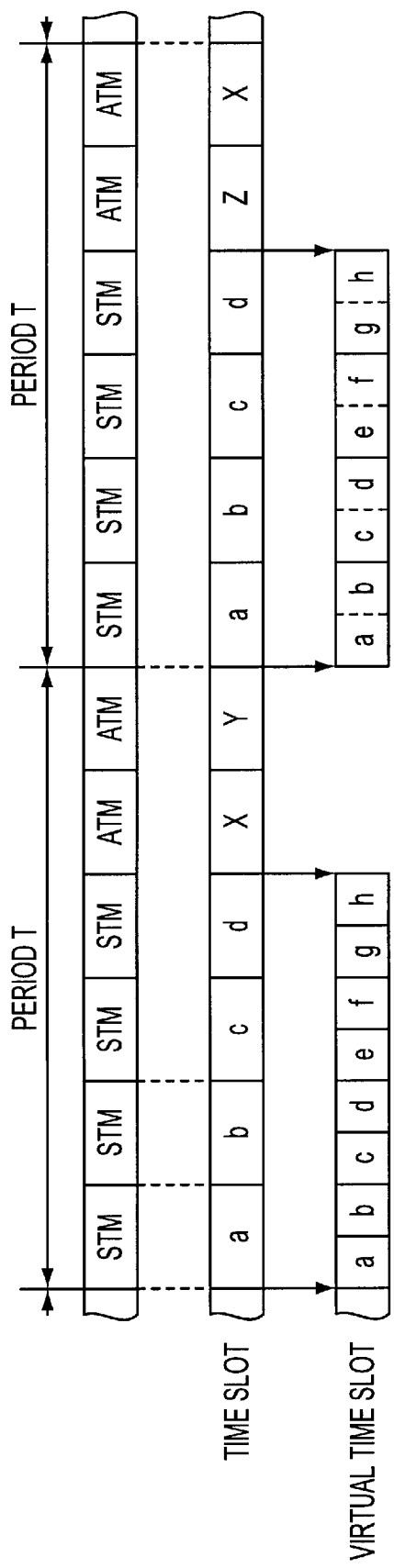
FIGS. 3(a) and (b) diagrammatically show a signal transmission format in the hybrid exchange of the present invention.
Figure 3B:
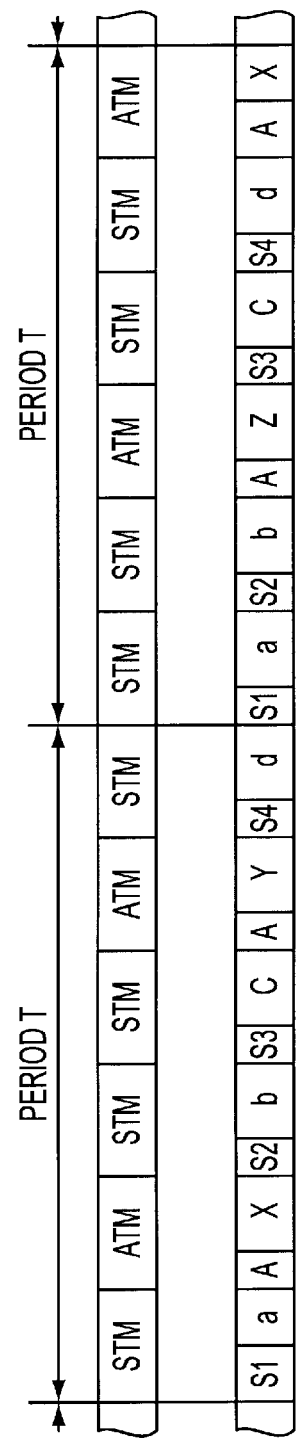

Referring now to the drawings in detail, FIGS. 3(a) and 3(b) show a signal transmission format in the hybrid exchange of the present invention. The transmission system of the present invention provides the STM time slot for assigning the STM data to be transmitted periodically and the ATM time slot for assigning the ATM data to be transmitted asynchronously and also uses the transmission format for assigning the time slot other than the STM time slot as the ATM time slot. The number of STM time slots may be varied in each period.

Since the STM data is assigned to the STM time slot for each period, it can be accommodated while assuring the quality of the existing STM data.

In FIG. 3(a), since the STM time slot and ATM time slot are fixedly assigned for each STM time slot area and ATM time slot area, the exchange may be simplified.

Moreover, as shown in FIG. 3(b), the STM time slot and ATM time slot may also be set variably. In such a case, the packet of the fixed length to be loaded on each time slot is composed of a payload section for accommodating data and a header section for indicating a destination address. Moreover, the packet of the fixed length to be loaded on the time slot also has an identifier for identifying the STM time slot and ATM time slot and uses a part of the header of the packet of the fixed length as the identifier. In addition, the packet of the fixed length to be loaded on the STM time slot also has a number information for identifying the sequence of the STM time slot.

Moreover, in order to assure the transmission quality of the STM data, the packet of the fixed length storing simultaneously a plurality of STM data may be loaded to each STM time slot. In this case, one STM time slot may be considered as a plurality of virtual time slots. As a result, for example, as shown in FIG. 3(a), in the case of loading the packet of the fixed length storing at a time two STM data into one STM time slot, four STM time slots may be assumed virtually as eight time slots. A control section of the exchange realizes the exchange in unit of the virtual time slot by controlling the number information of the STM time slot and storing position information of the payload in the STM time slot.

Figure 4:
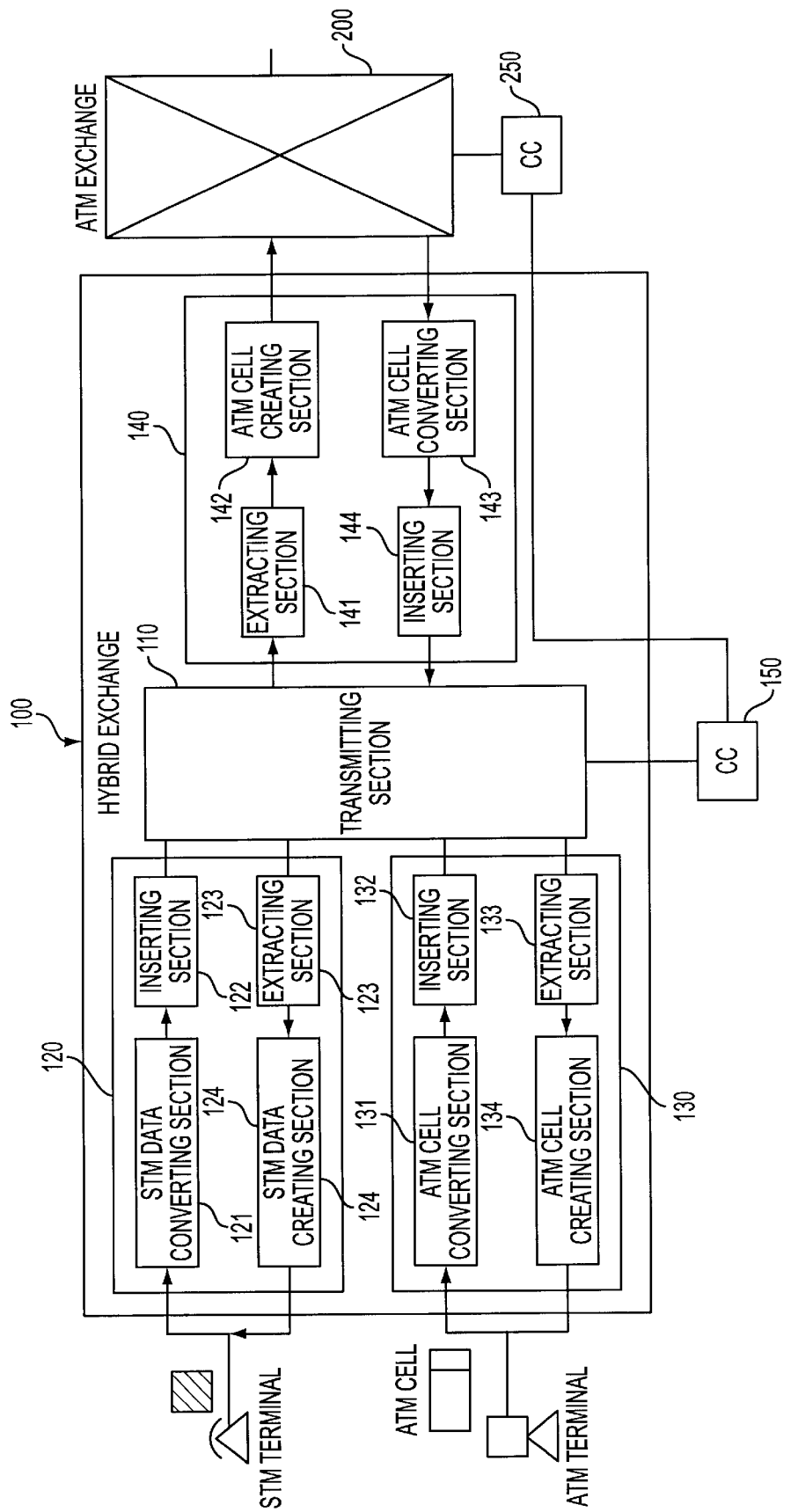
FIG. 4 is a block diagram of the hybrid exchange of the present invention.

FIG. 4 is a function block diagram of the hybrid exchange of the present invention.<In this figure, the hybrid exchange 100 is connected to both STM terminal for dealing with the STM data to be transmitted in the constant period and ATM terminal for dealing with the ATM data to be transmitted asynchronously and is also connected to an ATM exchange 200 for dealing with the ATM cells.

The hybrid exchange 100 is composed of a synchronous transmission terminal interface 120 for interface with the STM terminal, an asynchronous transmission terminal interface 130 for interface with the ATM terminal, an ATM exchange interface 140 for interface with the ATM exchange, a transmitting section 110 for transmitting the STM time slot and ATM time slot and a control section or unit (CC) 150 for controlling these elements.

The synchronous transmission terminal interface 120 is composed of an STM data converting section 121 for converting the STM data into the format to be loaded on the STM time slot, an inserting section 122 for inserting the converted STM data into the STM time slot flowing into the transmitting section 110, an extracting section 123 for extracting data from the STM time slot of the transmitting section 110 and an STM data creating section 124 for creating the STM data from the extracted data. The STM data converting section 121 may be structured to load each STM data from a plurality of STM terminal to one STM time slot to sequentially store the STM data depending on the information designated from control section 150. Moreover, when the STM time slot is formed of the packet of the fixed length, the STM data is stored in the payload section of the packet. In addition, the header may be structured to provide an identifier indicating the STM time slot and to give the number indicating the sequence of the STM time slot in each period. The fixed length packet may introduce the format in the same size as the ATM cell where the header is formed of 5 octets, while the payload section is formed of 48 octets. The inserting section 122 inserts the STM data into the time slot under the control of control section 150 among he STM time slot area in the transmission path. The extracting section 123 extracts the STM data from the time slot from the STM time slot area under the control of control section 150. The STM data creating section 124 converts the data extracted from the STM time slot into the STM data. When a plurality of STM data are stored in one STM time slot, the necessary STM data is extracted depending on the control section 150.

Meanwhile, the asynchronous transmission terminal interface 130 is composed of an ATM cell converting section 131 for converting the ATM cell storing the ATM data into the format to be loaded on the ATM time slot, an inserting section 132 for inserting the converted data into the ATM time slot flowing into the transmitting section 110, an extracting section 133 for extracting data from the ATM time slot of the transmitting section 110 and an ATM cell creating section 134 for creating the ATM cell from the extracted data. When the ATM cell converting section 131 introduces the structure to load the fixed length packet consisting of the header and payload into the ATM time slot, data is stored in the payload section of the packet and the header is provided with the identifier indicating the ATM time slot. The inserting section 132 inserts the fixed length packet to the idle time slot among the ATM time slot area. The extracting section 133 extracts the fixed length packet from the ATM time slot area under the control of control section 150.

The ATM exchange interface 140 is composed of an extracting section 141 for extracting data from the STM time slot and ATM time slot flowing into the transmitting section 110, an ATM cell creating section 142 for assembling the extracted data to the ATM cell exchanged by the ATM exchange 200, an ATM cell converting section 143 for disassembling the data extracted from the ATM cell received by the ATM exchange 200 into the format to be loaded on the STM time slot or ATM time slot and an inserting section 144 for inserting the converted data into the STM time slot or ATM time slot flowing into the transmitting section. The extracting section 141 extracts, under the control of control section 150, the data from the necessary STM time slot and ATM time slot. The ATM cell creating section 142 corresponds to the UNI (User Network Interface) in the standard ATM communication. The ATM cell creating section 142 selects, when a plurality STM data are loaded on one STM time slot, the necessary STM data to create the ATM cell by collecting the STM data having the same destination address. The inserting section 144 inserts the STM data into the STM time slot among the STM time slot area under the control of control section 150 and also inserts the ATM data into the idle ATM time slot among the ATM time slot area.

The transmitting section 110 transmits the STM time slot and ATM time slot in the transmitting format shown in FIGS. 3(*a*) and FIG. 3(*b*).

Control section 150 is provided in the hybrid exchange 100 to control the synchronous transmission terminal interface 120, asynchronous transmission terminal interface 130 and ATM exchange interface 140. Moreover, it is also possible that control section 150 of the hybrid exchange 100 is also used in common as control section (CC) 250 of the ATM exchange 200 and one hybrid exchange 100 may be formed including the ATM exchange 200.

With employment of the structure explained above, the exchange process for each STM time slot and ATM time slot may be realized. Moreover, even when a plurality of STM data are stored in each STM time slot, the exchange process may be done for each STM data.

Figure 5:
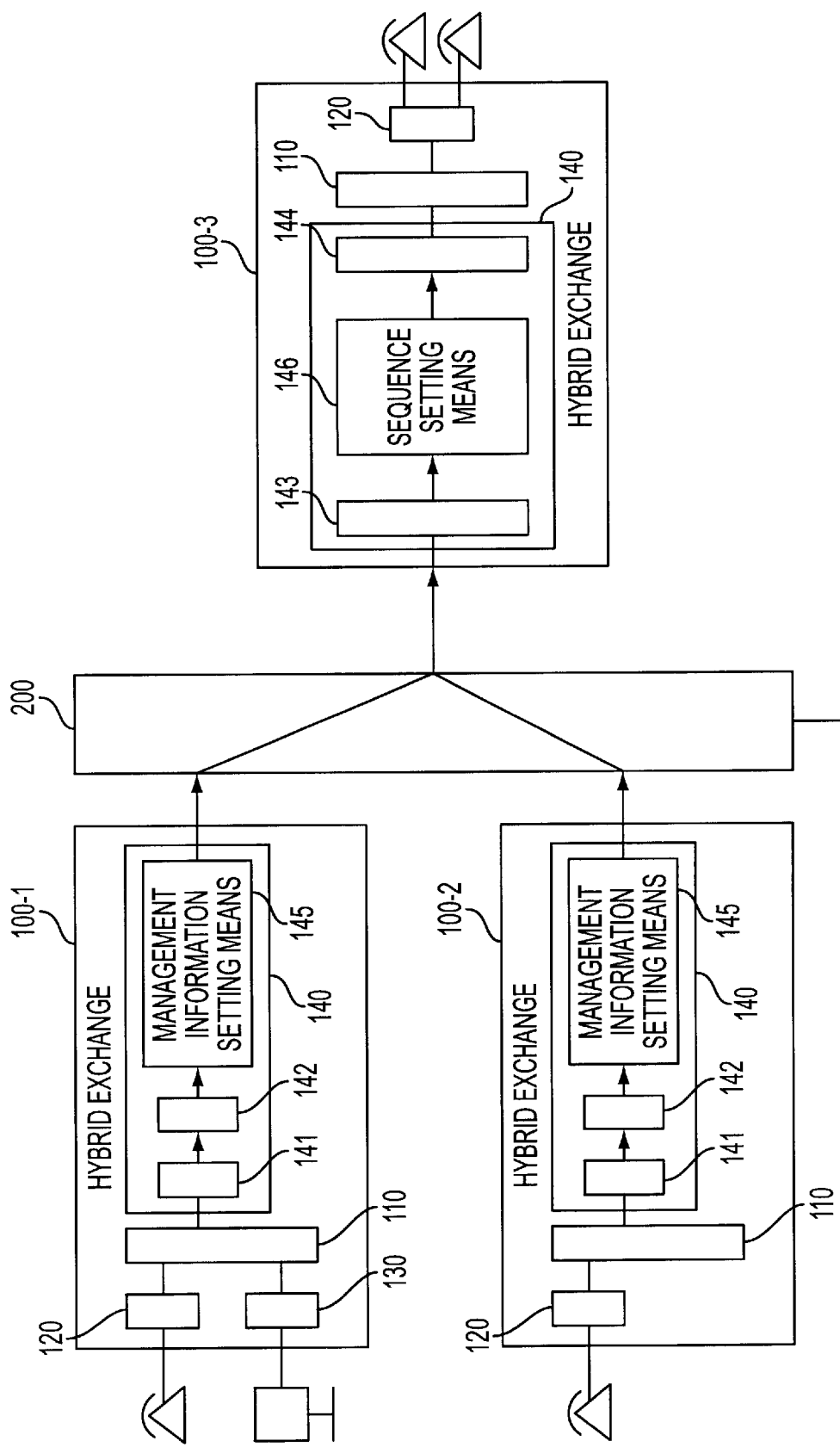
FIG. 5 is a diagram for explaining the principle of the exchange for setting the reception sequence of the STM data for the communication of the STM data via the ATM exchange.

FIG. 5 is a diagram for explaining the principle of the exchange for setting the receiving sequence of the STM data in the case for making communication of the STM data via the ATM exchange. The reference numbers like those of FIG. 4 indicate the like elements.

In FIG. 5, the hybrid exchange 100-1 accommodating the STM terminal and ATM terminal and hybrid exchanges 100-2, 100-3 accommodating the STM terminal are connected to the ATM exchange 200. It is considered here that the STM data from the STM terminal a is transmitted to the STM terminal b, while the STM data from the STM terminal c is transmitted to the STM terminal d. In the ATM exchange 200, since the ATM cell for the same output route is in the waiting condition in the buffer, the ATM cell having the STM data transmitted from the hybrid exchange 100-1 or the ATM cell having the STM data transmitted from the hybrid exchange 100-2 is not always received in the same period in the hybrid exchange 100-3. Therefore, the ATM exchange interface 140 of the hybrid exchange 100-1, 100-2 has a management information setting means 145 for setting the management information including the identification information of own hybrid exchange to the header of ATM cells. Moreover, the ATM exchange interface 140 of the hybrid exchange 100-3 has a sequence setting means 146 for setting the sequence of the ATM cell by identifying that from which hybrid exchange 100-1, 100-2 the data is transmitted on the basis of the management information set in the header of the ATM cell. Therefore, the sequence of the ATM cell received from different hybrid exchanges 100-1, 100-2 may always be set constant to keep the periodicity of the STM data.

Moreover, the management information set by the management information setting means 145 is formed to include, in addition to the identification information, the transmission sequence information in the predetermined period of the ATM cell to be transmitted to the ATM exchange, while the sequence setting means 146 is structured to set the sequence of ATM cell on the basis of the management information including the identification information and sequence information. Thereby, since the ATM cell from the same hybrid exchange may be set sequentially based on the sequence information of the management information, periodicity of the STM data may be maintained.

Figure 6A:
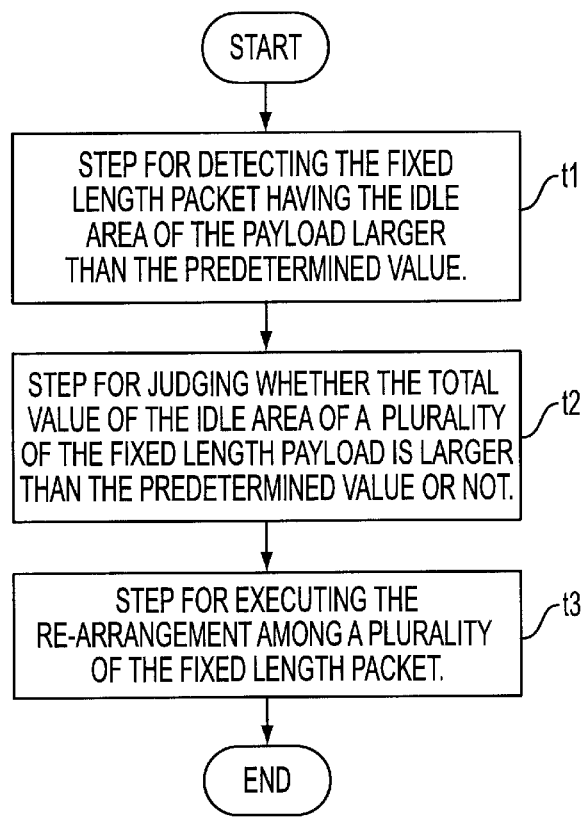
FIGS. 6(a) and 6(b) diagrammatically show the re-arrangement procedures for the STM data in the ATM cell where a plurality of STM data are arranged in the payload.
Figure 6B:
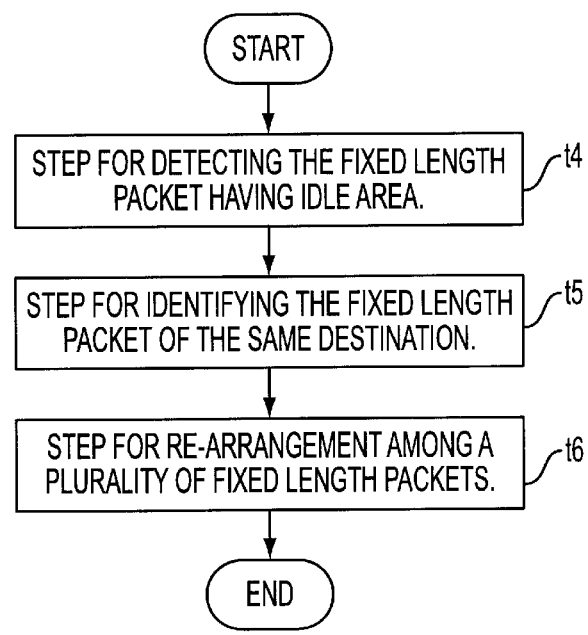

FIGS. 6(*a*) and 6(*b*) show a flowchart showing the re-arrangement procedures of STM data in the ATM cell where a plurality of STM data is set to the payload composite.

FIG. 6(*a*) shows a first re-arrangement method. A detection step (t1) detects the fixed length packet having the idle areas more than the predetermined value in the payload of each fixed length packet. A judging step (t2) judges whether the total number of idle areas in the payload in a plurality of fixed length packet detected in the detection step is more than the predetermined value or not. A re-arrangement step (t3) executes the re-arrangement, when the total number of idle areas of the payload in a plurality of fixed length packet is judged larger than the predetermined value in the judging step, for the STM data arranged in each payload of a plurality of fixed length packet so that there is no longer the idle area in the payload.

FIG. 6(*b*) shows a second re-arrangement method. A detection step (t4) watches whether there is an idle area in the payload of each fixed length packet to detect the fixed length packet having idle area. An identifying step (t5) identifies the fixed length packets having the same destination address on the basis of the headers of a plurality of fixed length packet. A re-arrangement step (t6) executes the re-arrangement of the STM data among a plurality of fixed length packet, when a plurality of fixed length packet having the same destination address are detected in the identifying step, so that the number of fixed length packets having the idle area of payload may be reduced to one or less.

[1] Total System Structure

Figure 1:
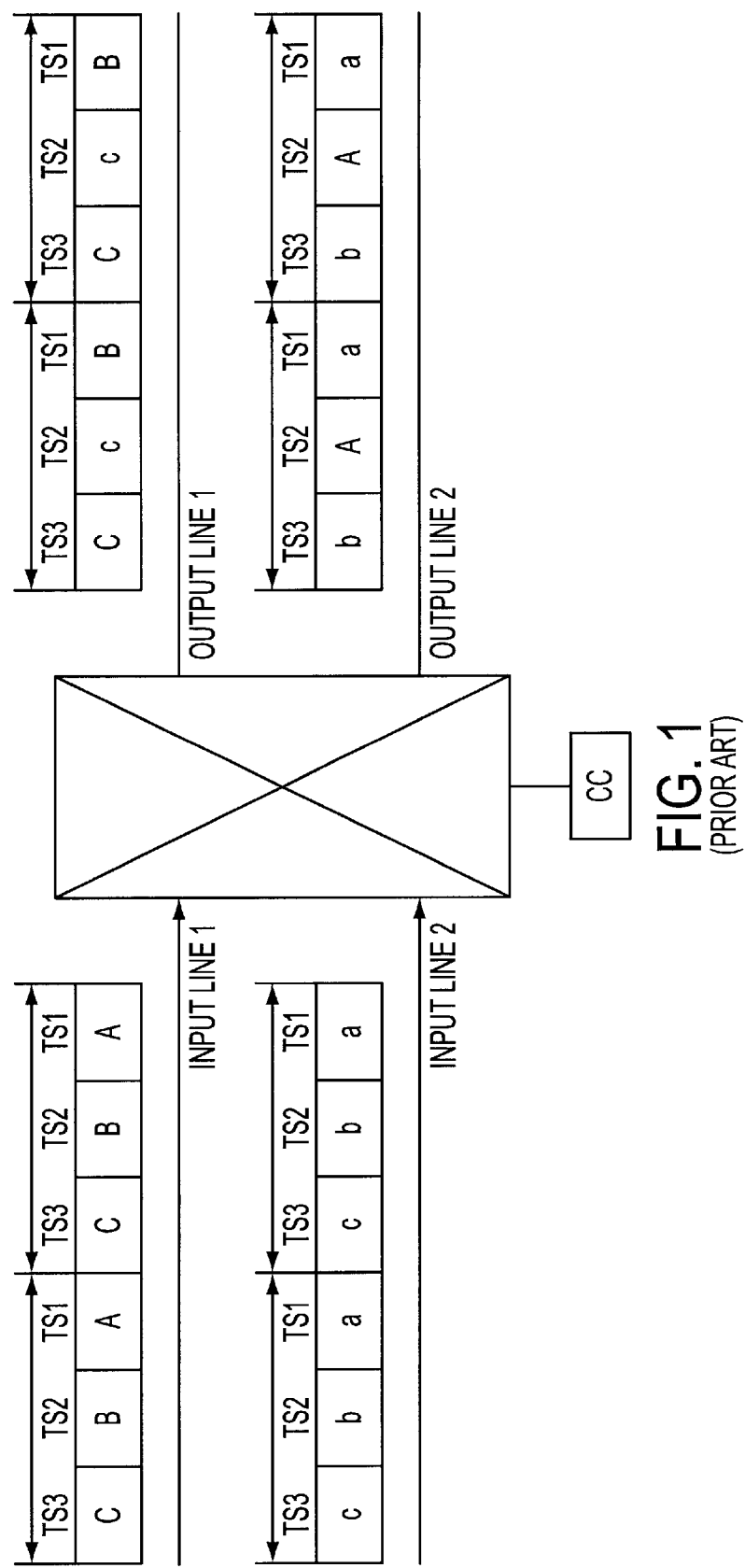
FIG. 1 is a diagram showing an STM exchange for executing the exchange process of STM data.
Figure 2:
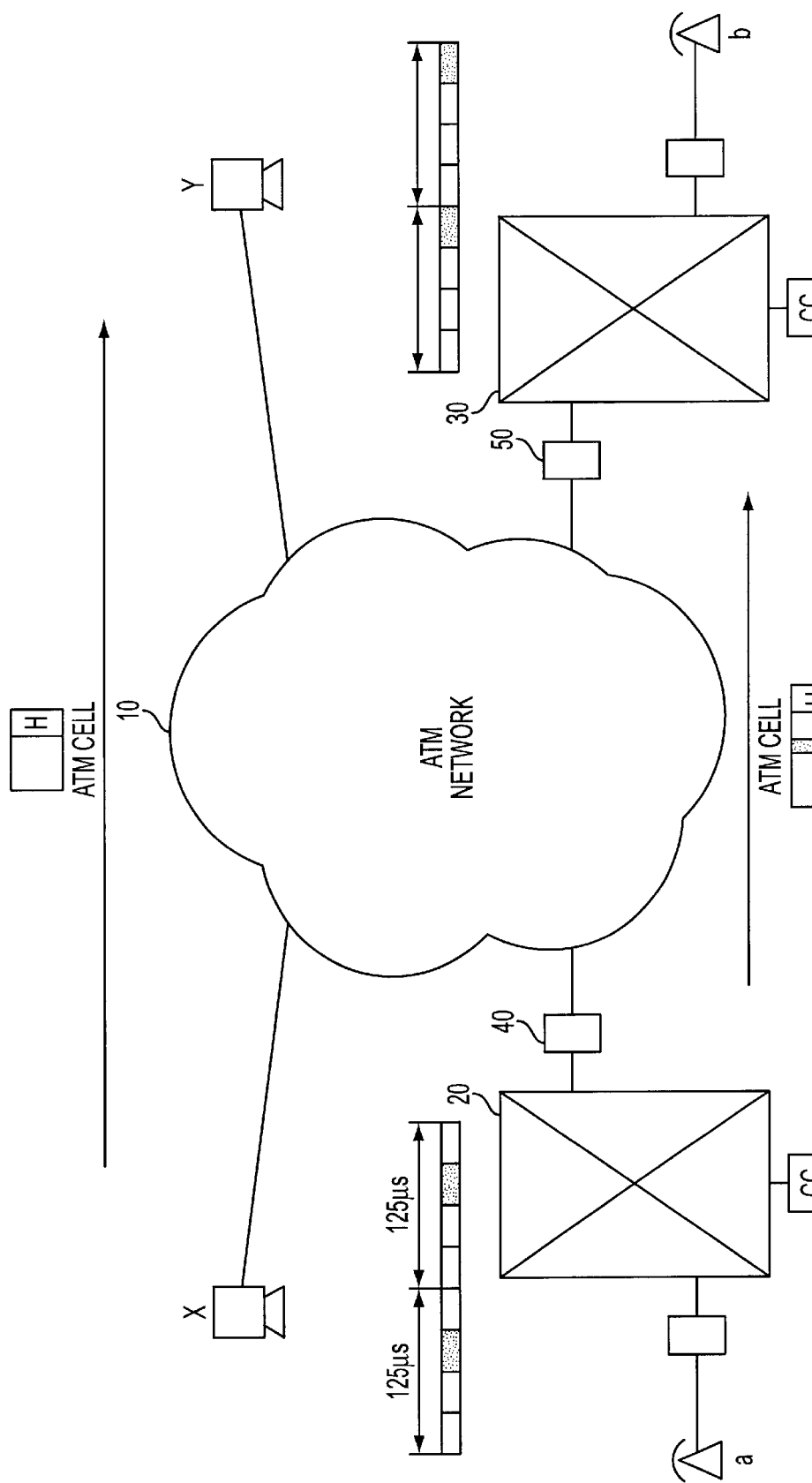
FIG. 2 is a diagram showing a network allowing co-existence of the ATM exchange and STM exchange.
Figure 7:
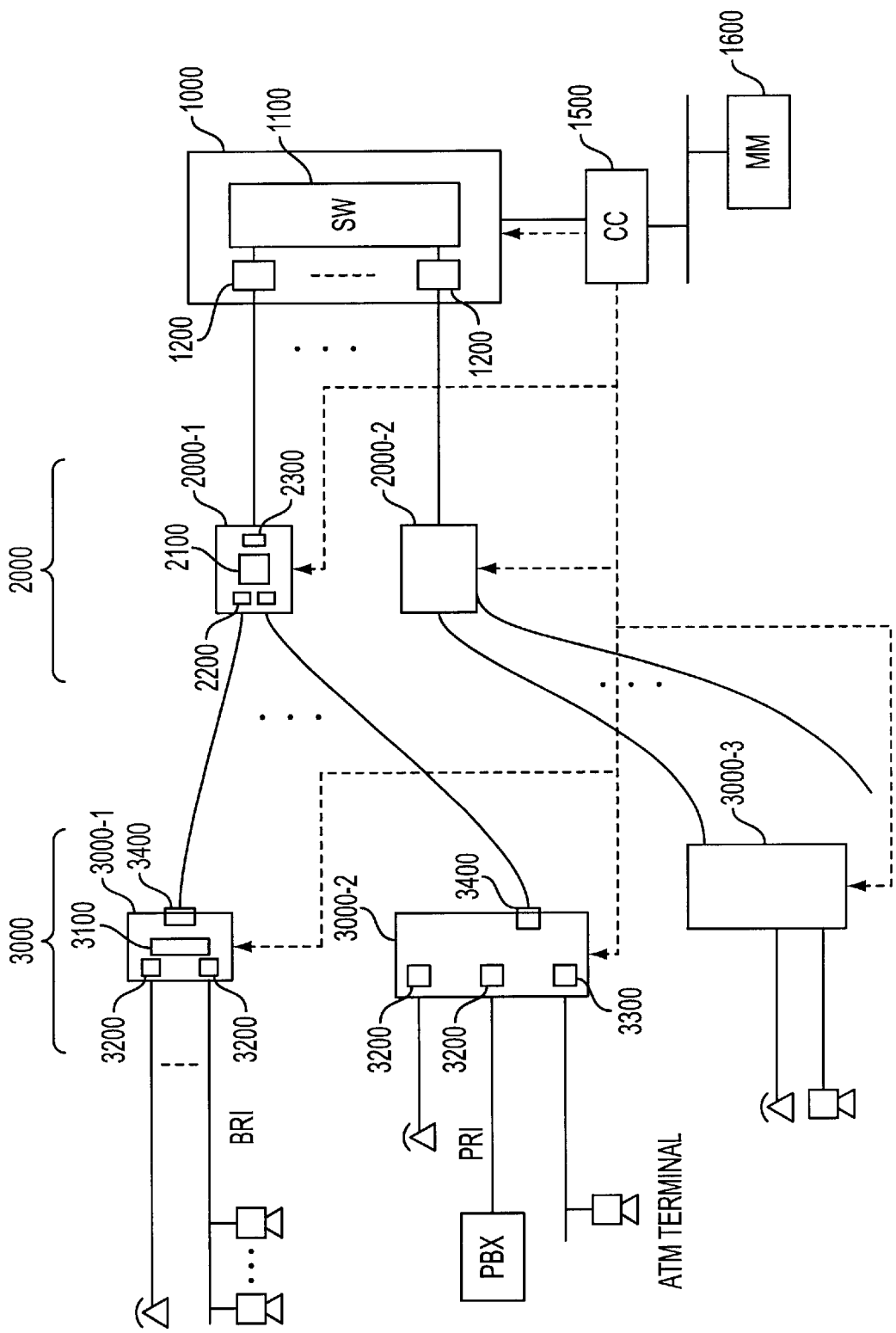
FIG. 7 is a diagram showing a system structure adopted in the present invention.

FIG. 7 is a diagram showing a structure of exchange system to which the present invention is applied. In this figure, a large unit 1000 is connected with a plurality of medium units 2000 and each medium unit is connected with a plurality of small units 3000. The hybrid exchange 100 shown in FIG. 2 corresponds to the exchange composed of a plurality of medium units 2000 and a plurality of small units 3000 connected to each medium unit and is then connected to a large unit 1000 corresponding to the ATM exchange 200.

The large unit 1000 has a cell switch 1100 having the switching rate, for example, of 20 Gbps and accommodates a plurality of transmission routes via AIFSH (ATM Interface Shelf) 1200. AIFSH 1200 alternatively adds the header of ATM cell to VPI/VCI in the outgoing side from VPI/VCI in the incoming side for the ATM cell of 53 bytes input from the transmission route and also adds TAG for the switching to AIFSH 1200 in the outgoing side. The cell switch 1100 is composed, for example, of self routing modules of a plurality of stages and executes the switching operation depending on the TAG information added to the cell in order to execute the exchange process. AIFSH 1200 accommodates the transmission lines of 156 Mbps and 622 Mbps, etc.

The medium unit 2000 has a cell scotch 2100 having the switching rate, for example, of 2 Gbps and accommodates a plurality of transmission lines via the small unit interface 2300 explained later. The STM time slot and ATM time slot loading the fixed length packet of 53 bytes transmitted from the small unit 3000 are switched for the exchange process by the switching system described later. Moreover, the medium unit 2000 is connected with the large unit 1000 via the ATM exchange interface 2300 (corresponding to 140 of FIG. 2) explained later.

The small unit 3000 has a cell switch 3100 having the switching rate, for example, of 156 Mbps and also includes an STM terminal interface 2300 (corresponding to 120 of FIG. 2) accommodating the subscriber line of the STM data and an ATM terminal interface 3300 (corresponding to 130 of FIG. 2) accommodating the subscriber line of the ATM data, and a medium unit interface 3400. The STM terminal interface 3200 accommodates a telephone set for sending the ISDN data of 64 Kbps, an ISDN data terminal connected by the basic interface of 2B+D and a PBX, etc. connected by the primary order group interface of 23B+D.

In FIG. 7, communication data between subscribers accommodated in the same small unit 3000 is exchanged within the small unit 3000. Moreover, in the communication between the subscribers accommodated in different small units 3000 and also accommodated in the same medium unit 2000, data is transmitted between the small unit 3000 and the medium unit 2000 accommodating this small unit and is then exchanged. In addition, in the communication between the subscribers accommodated in different small units 3000 and also accommodated in the same medium unit 2000, data is transmitted for the exchange process among the small unit 3000, medium unit 2000 accommodating the small unit and large unit 1000 accommodating the medium unit 2000.

Moreover, since the small unit 3000 and medium unit 2000 employ the transmission format and exchange system explained later, the STM data can be exchanged in unit of the STM data, while the ATM data is exchanged in unit of the ATM data.

[2] Explanation of Small Unit

Figure 8:
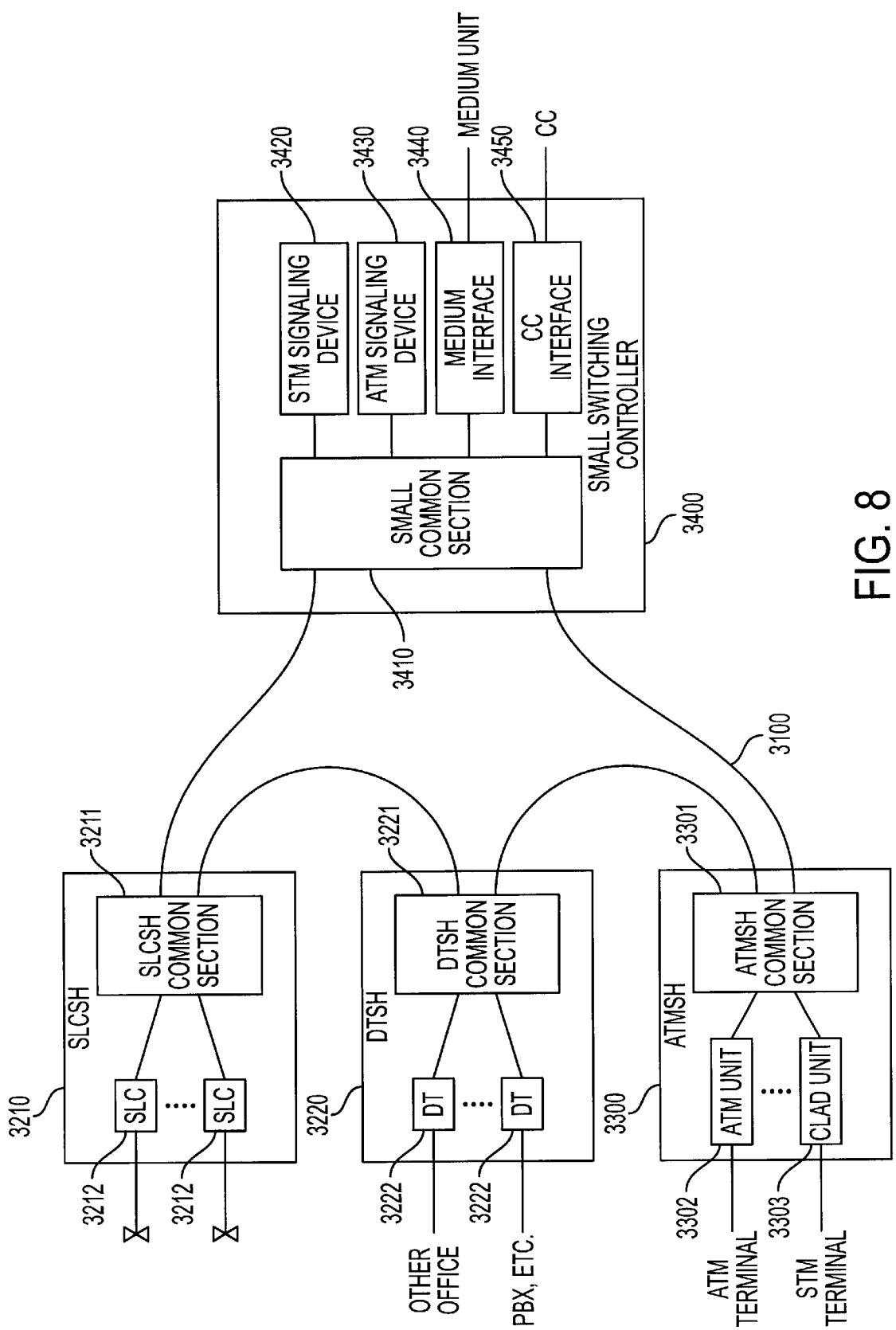
FIG. 8 is a diagram showing a system structure of a small unit.

FIG. 8 is a diagram showing a system structure of a small unit. The small switch 3100 is connected with a small switching controller 3400 as an interface with a medium unit, SLCSH (Subscriber Line Circuit Shelf) 3210 accommodating subscribers like telephone sets as the interface with the STM terminal, a DTSH (Digital Terminal Shelf) 3220 accommodating PBX or trunk lines to the other telephone offices via the primary group interface, an ATMSH (ATM Shelf) 3300 accommodating subscribers of ATM terminal such as moving image communication terminal and a ring type transmission line 3100 having the transmission rate of 156 Mbps.

The small switching controller 3400 comprises a small common section 3410 for inserting and extracting the fixed length packet of 53 bytes to the STM time slot and ATM time slot flowing into the ring type transmission line 3100A, a medium interface 3440 as an interface with the medium unit 2000, a CC interface 3450 as an interface with the control section 1500, an STM signaling device 3420 and an ATM signaling device 3430.

SLCSH 3210 is composed of an SLCSH common section 3211 and a plurality of SLC (Subscriber Line Circuit) 3212 accommodating STM subscribers. DTSH 3220 is composed of a DTSH common section 3221 and a plurality of DT (Digital Terminal) 3222 accommodating STM subscribers such as PBX of the other telephone offices. ATMSH 3300 is composed of an ATM unit 3302 accommodating ATM subscribers such as moving image communication terminal and a clad unit 3303 having the clad for creating the ATM data from the STM data transmitted from the STM subscribers.

In the present invention, since the switching operation is executed using the ring type transmission line in the small unit 3000, the transmission efficiency may be improved in comparison with that when the mesh path is provided between the shelves.

Figure 9:
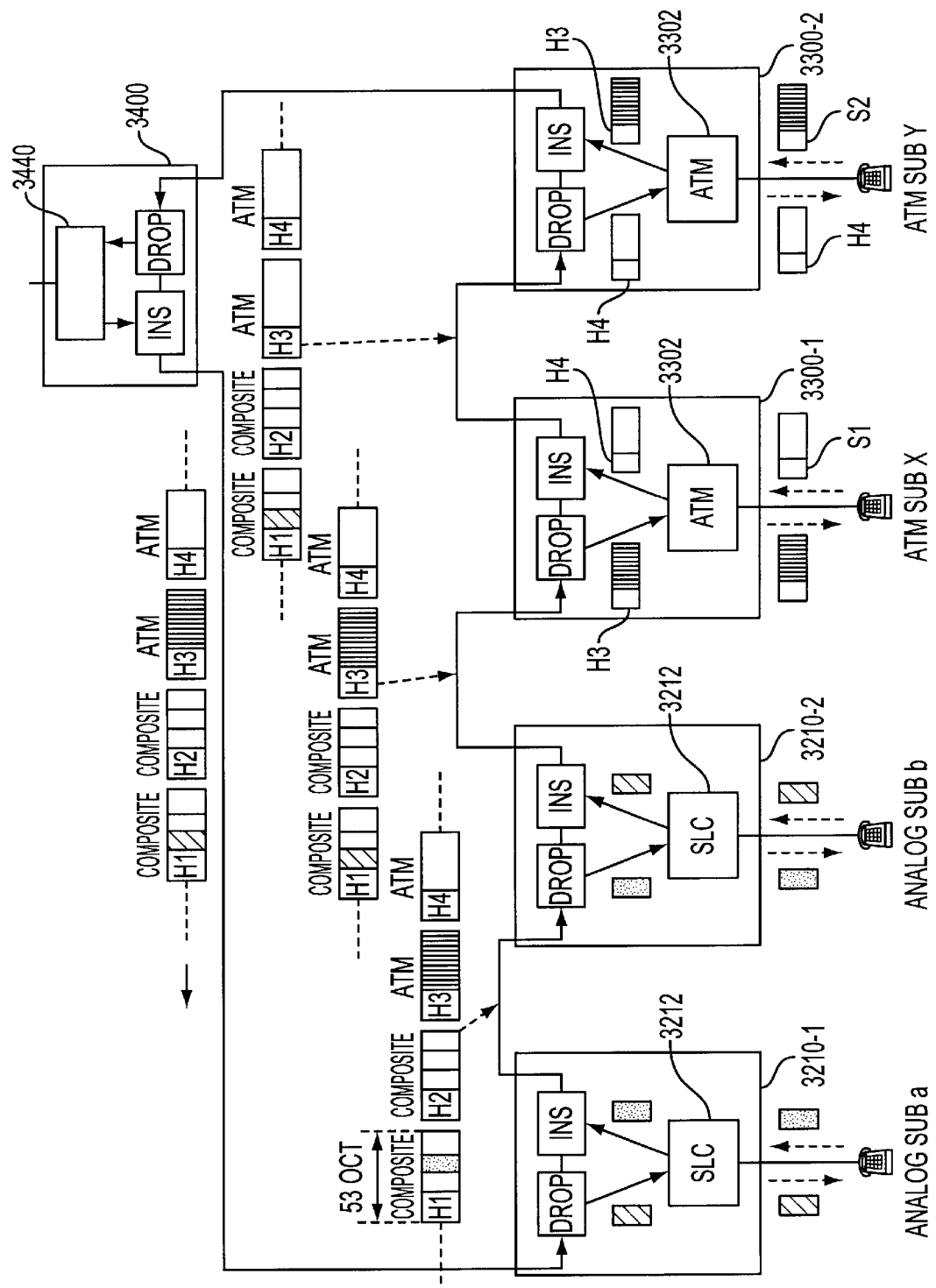
FIG. 9 is a diagram showing a time slot flowing into a ring type transmission route.

FIG. 9 is a diagram showing a time division exchanging system or exchanging the STM data and ATM data using the time slot. This ring type transmission line 3100A is composed of a plurality of time slots (STM time slot, ATM time slot) which can transmit the packet of 53 octets. In FIG. 9, SLCSH 3210-1 accommodates an analog terminal a, SLCSH 3210-2 accommodates an analog terminal b, ATMSH 3300-1 accommodates an ATM terminal X, ATMSH 3300-2 accommodates an ATM terminal Y, respectively and the communication between the analog terminal a and an analog terminal b and communication between the ATM terminal X and ATM terminal Y accommodated in the same small unit 3000 are carried out. The STM data such as voice to the analog terminal b from the analog terminal a is indicated by the black rectangular marks and the STM data such as voice to the analog terminal a from the analog terminal a is indicated by the rectangular marks given the diagonal lines. On the other hand, the ATM data to the ATM terminal Y from the ATM terminal X is transmitted by the ATM cell having the header S1 and the fixed length packet having the header H loaded to the ATM time slot, while the ATM data to the ATM terminal X from the ATM terminal Y is transmitted by the ATM cell having the header S2 and the fixed length packet having the header H3 loaded to the ATM time slot. The drop circuit of SLCSH or ATMSH extracts the STM data and ATM data from each time slot depending on the table set by CC, while the insert circuit of SLCSH or ATMSH inserts the STM data and ATM data to each time slot depending on the preset table.

Figure 10A:
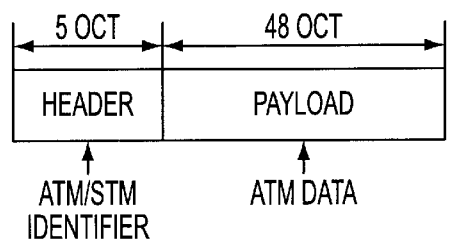
FIGS. 10(a), 10(b) and 10(c) diagrammatically show the ATM time slot transmitted over the ring type transmission route of the small unit and a format of the fixed length packet loaded on the STM time slot.
Figure 10B:
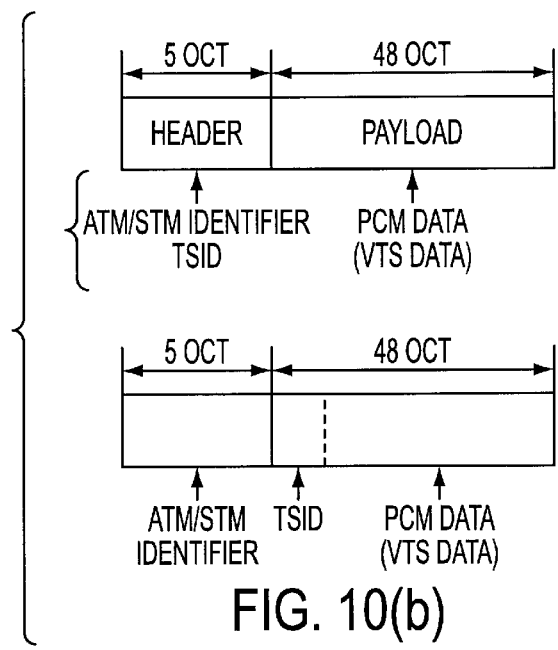
Figure 10C:
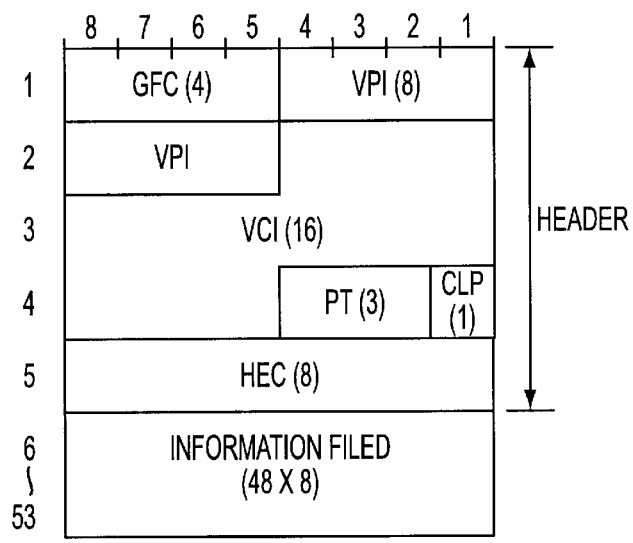

FIGS. 10(a), 10(b), and 10(c) diagrammatically show an embodiment of the format of a fixed length packet to be loaded on the ATM time slot and STM time slot in the ring type transmission line in the small unit. The ATM time slot is used to load the fixed length packet for transmitting the ATM data, while the STM time slot is used to load the fixed length packet for transmitting the STM data. FIG. 10(a) shows a format of the fixed length packet loaded to the ATM time slot. FIG. 10(b) shows a format of the fixed length packet loaded to the STM time slot and FIG. 10(c) shows a format of the header to the fixed length packet. The fixed length packet loaded to the ATM time slot and STM time slot of the present invention is provided with an ATM/STM identifier for identifying the ATM time slot or STM time slot. The ATM/STM identifier is provided in the header of the fixed length packet, for example, as shown in FIGS. 10(a), 10(b). Moreover, as shown in FIG. 10(b), the STM time slot number TSID (#1 to #n) is provided in the header or payload in the fixed length packet loaded on the STM time slot. This STM time slot number TSID indicates, as shown in FIG. 9, the sequence of the STM time slots #1 to #n constituting the virtual time slots VTS1 to VTS48n. The fixed length packet loaded on the STM time slot assigns one octet among the payload of 48 octets to one subscriber respectively to transmit 48 subscribers in maximum with one packet. For example, in FIG. 9, the subscriber of first octet of the STM time slot number TSID #1 is assigned to the virtual time slot VTS1 and the subscriber of the first octet of the STM time slot number TSID #2 is assigned to the virtual time slot VTS49. As a result, 48n virtual time slots can be formed by n STM time slots. Moreover, the number of octets to be assigned to one subscriber can be determined freely depending on the transmission quality required for the data transfer.

The same time slot may be assigned or different time slots may also be assigned to the virtual time slot VTS of the ascending transmission line and the virtual time slot VTS of the descending transmission line of one subscriber. For example, when a subscriber depresses the PB tone while hearing the dial tone, since the virtual time slot VTS of the ascending line and the virtual time slot VTS of the descending line are used simultaneously, different time slots must be used.

The time required for transmitting the data through the ring type transmission line can be set to 125 $\mu$sec as explained later. Therefore, a virtual time slot of TDM of 125 $\mu$sec (8 kHz) can be assumed as the octet of the payload in the STM time slot.

In FIG. 10(c), the fixed length packet loaded on the ATM time slot or STM time slot can use the standard ATM cell format as the basic structure. The ATM/STM identifier can be set to the ordinary control flow (GFC) of 4 bits to be used to transmit the protocol for preventing collision on the interface of ATM cells transmitted from a plurality of terminals. For example, in the case of the fixed length packet to be loaded on the ATM time slot, all 0 is set and in the case of the fixed length packet to be loaded on the STM time slot, all 1 is set. Moreover, when the STM time slot number TSID (#1 to #n) is provided in the header, a value of the fixed length packet GFC loaded on the STM time slot uses a value other than the value (all 0) to be assigned to the fixed length packet loaded on the ATM time slot. For example, such value is "0001", "0010", "00011", . . .

Switching in the small unit 3000 will be explained with reference to FIG. 8 and FIG. 9.

a) In the Case of STM Data

Upon detection of off-hook of an analog subscriber a, the SLCSH 3210-1 transmits such information to the small switching controller 3400 using the control signal line. The small switching controller 3400 receives, thereafter, the telephone number of the analog subscriber b as the communication partner with the signaling device and transmits the telephone number of analog subscriber b to control section 1500 via the control section interface 3450. Control section 1500 recognizes the accommodation location of the analog subscriber b and determines the virtual time slot VTS used for the communication between the analog subscribers a and b. The virtual time slot VTS may be assigned by unique in unit of the medium unit 2100 or may be assigned uniquely at a time. Control section 1500 notifies the determined virtual time slot VTS to the SLCSH 3210-1 accommodating the analog subscriber a via the control signal line and the SLCSH 3210-2 accommodating the analog subscriber b. SLCSH 3210-1, SLCSH 3210-2 store the notified virtual time slot VTS and thereafter makes access to this virtual time slot. The SLCSH 3210-1 inserts the STM data for transmission to the predetermined payload of the fixed length packet having the virtual time slot VTS to which the voice data received from the subscriber a is assigned and also extracts the STM data for transmission to the subscriber a from -the predetermined payload of the fixed length packet having the assigned virtual time slot VTS. In the same manner, the SLCSH 3210-2 also inserts the STM data for transmission to the predetermined payload of the fixed length packet having the virtual time slot VTS to which the voice data received from the subscriber b and also extracts the voice data for transmission to the subscriber b from the predetermined payload of the fixed length packet having the virtual time slot assigned to itself.

b) In the Case of ATM Data

In the SVC (Switched Virtual Connection) service, ATMSH 3300-1 sets, upon reception of the control cell from the ATM subscriber X, the ATM/STM identifier to insert it to the idle ATM time slot of the ring type transmission line and transmits it to the small switching controller 3400. The small switching controller 3400 receives this control cell with the ATM signaling device 3430 and transmits the control cell to CC 1500 via the central control 1500 interface 3450.

Central control 1500 recognizes the accommodation location of the ATM subscriber Y and determines the VPI/VCI used for the communication between the ATM subscriber X and ATM subscriber Y. Central control 1500 notifies the determined VPI/VCI to the ATM subscribers X and Y using the control cell and also notifies the header conversion information to ATMSH 3300-1 and ATMSH 3300-2. Thereby, VPI/VCI is identified at the time of starting the communication. ATMSH 3300-1 receives the ATM cell (VPI/VCI=S1) from the ATM subscriber X to update (VPI/VCI=H4) the VPI/VCI depending on the notified header converting information and also sets the ATM/STM identifier to insert it for transmission into the idle ATM time slot. Depending on the notified information, the ATM cell having VPI/VCI=H3 is extracted from the ring type transmission line to transmit it to the ATM subscriber X. In the same manner, upon reception of the ATM cell from the ATM subscriber Y, ATMSH 3300-2 updates VPI/VCI (VPI/VCI= H3) depending on the notified header converting information and also sets the ATM/STM identifier to insert for transmission into the idle ATM time slot. Depending on the notified information, the ATM cell having VPI/VCI=H4 is extracted from the ring type transmission line and is then transmitted to the ATM subscriber Y.

On the other hand, in the case of the PVC (Permanent Virtual Connection) service, since the header converting information is preset in the ATMSH 3300 before the start of communication, the value of VPI/VCI is converted depending on the header converting information in order to execute the communication.

Operation of the small unit 3300 allowing coexistence of STMSH and ATMSH has been explained above. For example, when only the shelf accommodating the STM data such as SLCSH 3210, DTSH3220 is accommodated, access is made only to the STM time slot.

Next, a delay time in data transmission will be explained. In the ring type transmission line of 156 Mbps of the present invention, 44 time slots are given for 125 $\mu$s. In actual, there are 45.99 time slots (156 Mbps÷8 kHz÷53 bytes÷8 bits) but the data is actually loaded on the 44 time slots. The 44 shelves in maximum can be connected by setting the time required for processing of the fixed length packet in one time slot in each shelf to the transmission rate of about one time slot.

Figure 12:
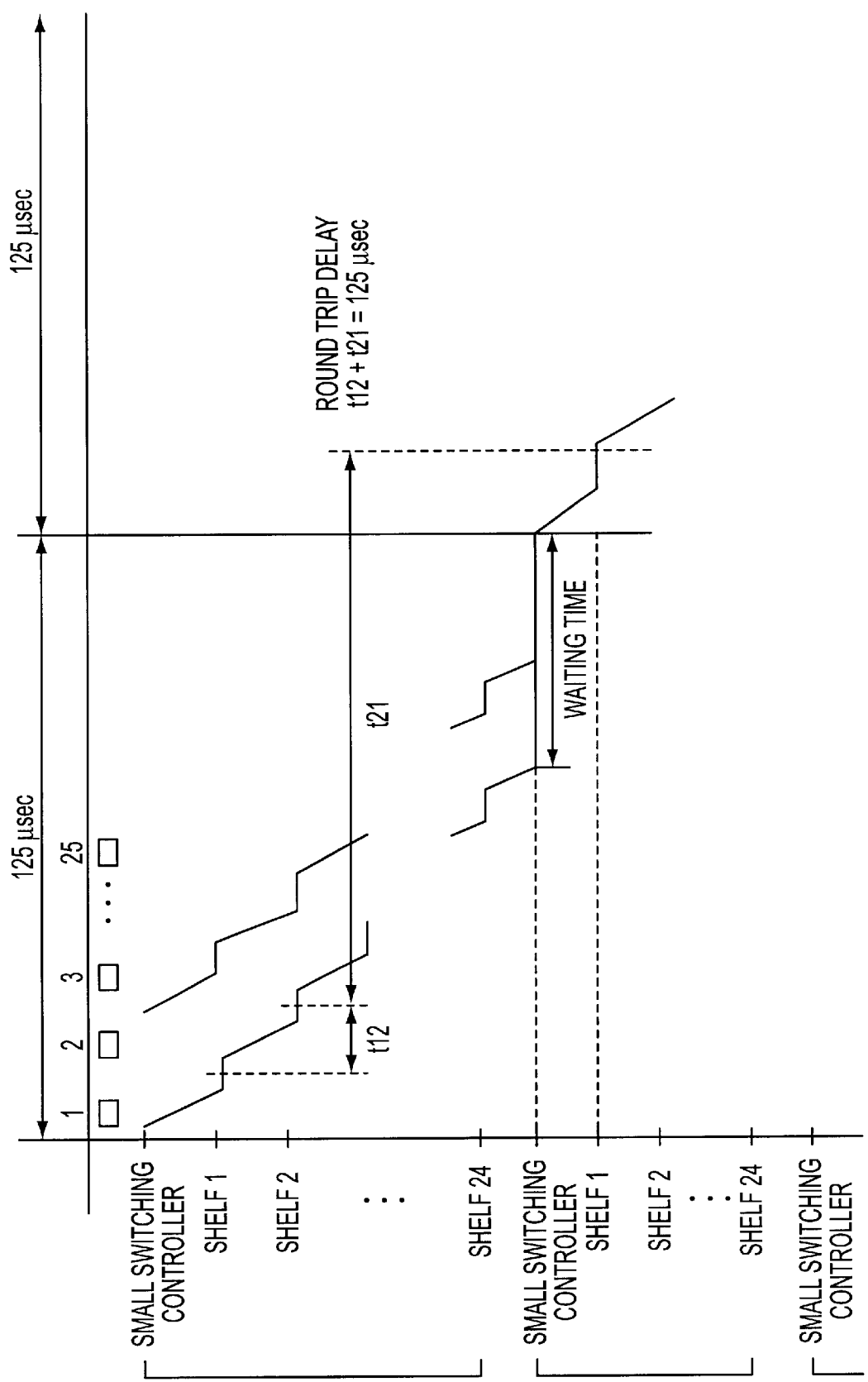
FIG. 12 is a diagram showing data transmission when 24 shelves are accommodated.

FIG. 12 is a diagram showing data transmission when 24 shelves are accommodated. The fixed length packet transmitted from the small switching controller 3400 reaches the shelf 1 and is then transmitted to the shelf 2 after the process in the shelf 1. After the predetermined process in each shelf, such fixed length packet is transmitted sequentially up to the final stage shelf. As explained, the fixed length packet is circulated up to the small switching controller. In this case, the time required for running the transmission line can be set to 68. 16 $\mu$s (=125 $\mu$s÷44 time slots×24 shelves) and the packet is set in the waiting condition. Using this waiting time, the time slot may be transmitted to the medium unit and large unit as the high level unit.

On the other hand, the round trip delay required by the regulation of ITU-T Q.551 (a total time of the time t12 required by the packet which is transmitted from the shelf 1 and received by the shelf 2 in the communication between the shelf 1 and shelf 2 and the time t21 required by the packet which is transmitted from the shelf 2 and received by the shelf 1, namely 125 $\mu$s (=t12+t21) in FIG. 12) specifies the delay time between dial tones (DT) to 1500 $\mu$s which is the most severe value. When consideration is taken into account for the delay time of 500 $\mu$s in the DT, only the delay time of 1000 $\mu$s is allowed. This value corresponds to 8 frames when it is calculated in the frame of 125 $\mu$s. In the present invention, since the total delay is only the delay of one frame even in the small unit, if the data is transmitted through the medium unit and large unit, the specification of ITU-T can sufficiently be satisfied by returning the data within eight frames.

Figure 11:
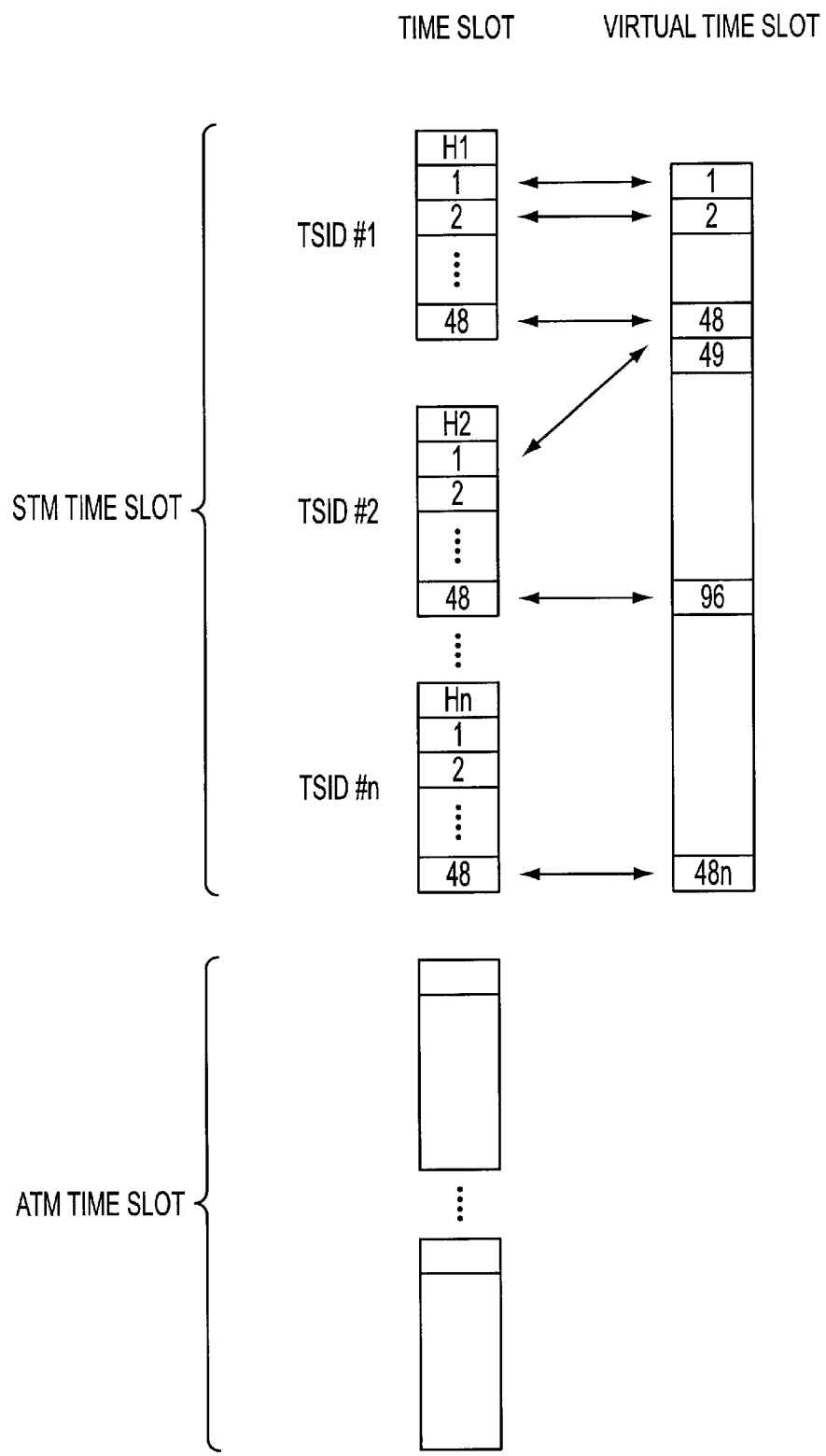
FIG. 11 is a diagram showing a relationship between the time slot and a virtual time slot.

In the examples of FIG. 11 and FIG. 12, the data is circulated once through the ring type transmission line during the period of 125 $\mu$s (8 KHz) by assigning the virtual time slot VTS of one octet to one subscriber, the data may be transmitted in the transmission rate of 64 Kbps (=8 KHz×8 bits). However, various transmission rates (for example, 0.5 KHz×8 bits=4 Kbps, 1 KHz×16 bits=16 Kbps, in addition to 8 KHz×8 bits=64 Kbps) may be realized by defining one virtual time slot VTS with a plurality of octets in the STM time slot to change the circulation period of the STM time slot.

Next, the number of STM time slots and ATM time slots to be assigned will be explained.

When the small unit 3000 having the ring type transmission line of 156 Mbps transmits only the STM time slot, 2112 paths (=44 time slots×48 octets) can be set if the same channel is used for both ascending and descending lines, while 1056 paths may be set if the different channels are used for ascending and descending lines. On the other hand, when the small unit 3000 transmits both STM time slot and ATM time slot, since the number of time slots required is determined from the blocking rate and mean holding time depending on the number of STM terminals to be accommodated, the number of STM time slots required may be determined and the other time slots can be assigned to the ATM time slot.

The number of STM time slots may be fixedly assigned and variably assigned also. For example, in the case of the variable assignment, following control is performed. Namely, when a first subscriber originates a call, the virtual time slot of the fixed length packet to be loaded on the first STM time slot is assigned, and when the 49th subscriber originates a call, the virtual time slot of the fixed length packet to be loaded on the second STM time slot is assigned. Moreover, in this case, each subscriber terminates a call at random and therefore idle packet of the fixed length is generated to and from. Therefore, a plurality of packet of the fixed length including the idle areas more than the specified number is summarized as one fixed length packet.

Figure 13:
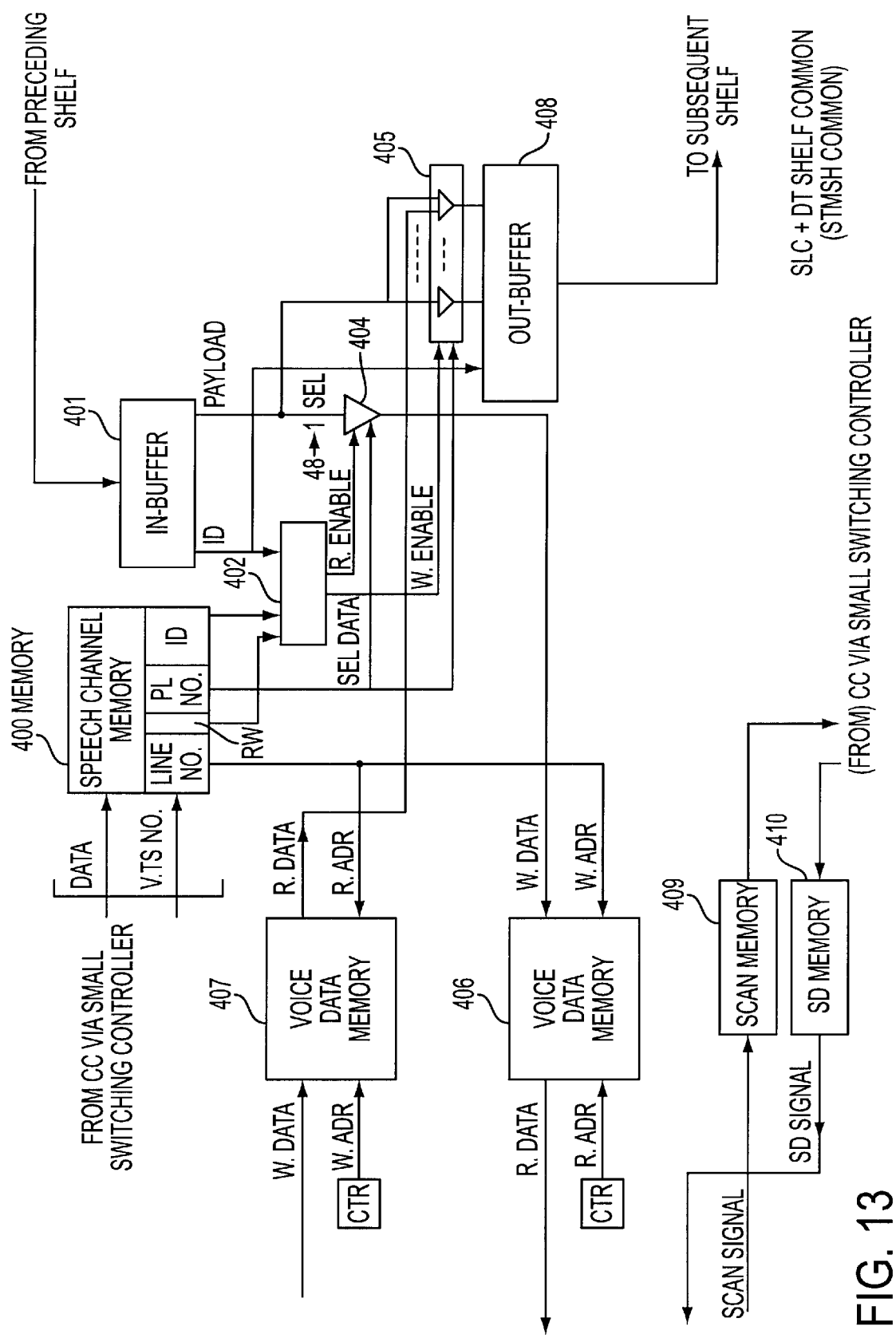
FIG. 13 is a block diagram showing detail of the common area of STMSH.

FIG. 13 shows a detail structure of the SLCSH common section 3211 and DTSH common section 3221 in STMSH such as SCLSH 3210, DTSGSH 3220. In this figure, a memory 400 has a speech channel memory to which the data corresponding between the subscriber and the virtual time slot VTS assigned to this subscriber is registered from central control 1500. An in-buffer 401 extracts and store the fixed length packet from the time slot flowing into the ring type transmission line 3100A and a cell identifying circuit 402 judges whether the header of the fixed length packet has the virtual time slot VTS assigned to the subscriber set in the speech channel memory or not by judging whether the header has the STM time slot number ID or not. When the header includes the STM time slot number ID, the cell identifying circuit 402 counts up the payload number and receives a read instruction/write instruction when the payload number for writing or reading appears to control the enable signal for the read circuit 404 and write circuit 405. In the case of the ATM time slot, since the enable signal for the read circuit 404 and write circuit 405 is not issued, the fixed length packet to be loaded on the ATM time slot is transmitted in direct.

The read circuit 404 is formed of one selector to extract the STM data located at the designated payload number. The fetched STM data is written into a voice data memory 406 in the predetermined descending transmission line from the memory 400 depending on the line number. When a plurality of designated virtual time slot VTS are included in one time slot, writing operations are repeated for such time slots. Meanwhile, the write circuit 405 is formed of 48 selectors and each selector corresponds to each octet of the payload. The selector is selected depending on the payload number from the memory 400 an the voice data written into the voice data memory 407 on the ascending transmission line can be inserted into the predetermined virtual time slot VTS. An out-buffer 408 once stores the fixed length packet which has been subjected to a series of process and transmits this packet to the next shelf through the STM time slot depending on the predetermined timing.

As explained above, according to the STMSH common section of this embodiment, the ATM time slot is transmitted to the next shelf without execution of any process, but the STM time slot, which is not the relevant STM time slot, is transmitted to the next shelf in direct. If the relevant time slot is detected, it is read, or written, or skipped (any operation of read or write is not executed) depending on the read/write enable signal for the payload (virtual time slot) designated by the memory 400. Therefore, the exchange process in unit of the STM data assigned to the virtual time slot can be realized. In above explanation, the read circuit 404 is formed of one selector but it may also be formed by providing in parallel the 48 selectors as in the case of the write circuit 405.

As SD memory 410 is provided for temporarily storing the SD signal from the SD memory, which will be explained later, of the small switching controller 3400 and this SD data is set to the subscriber circuit SLC and trunk card, etc. On the other hand, a scan memory 409 is provided to temporarily store the scan signal from the subscriber circuit SLC and trunk card. Moreover the scan memory 409 transfers the scan signal to the scan memory, which will be explained later, of the small switching controller 3400.

Figure 14:
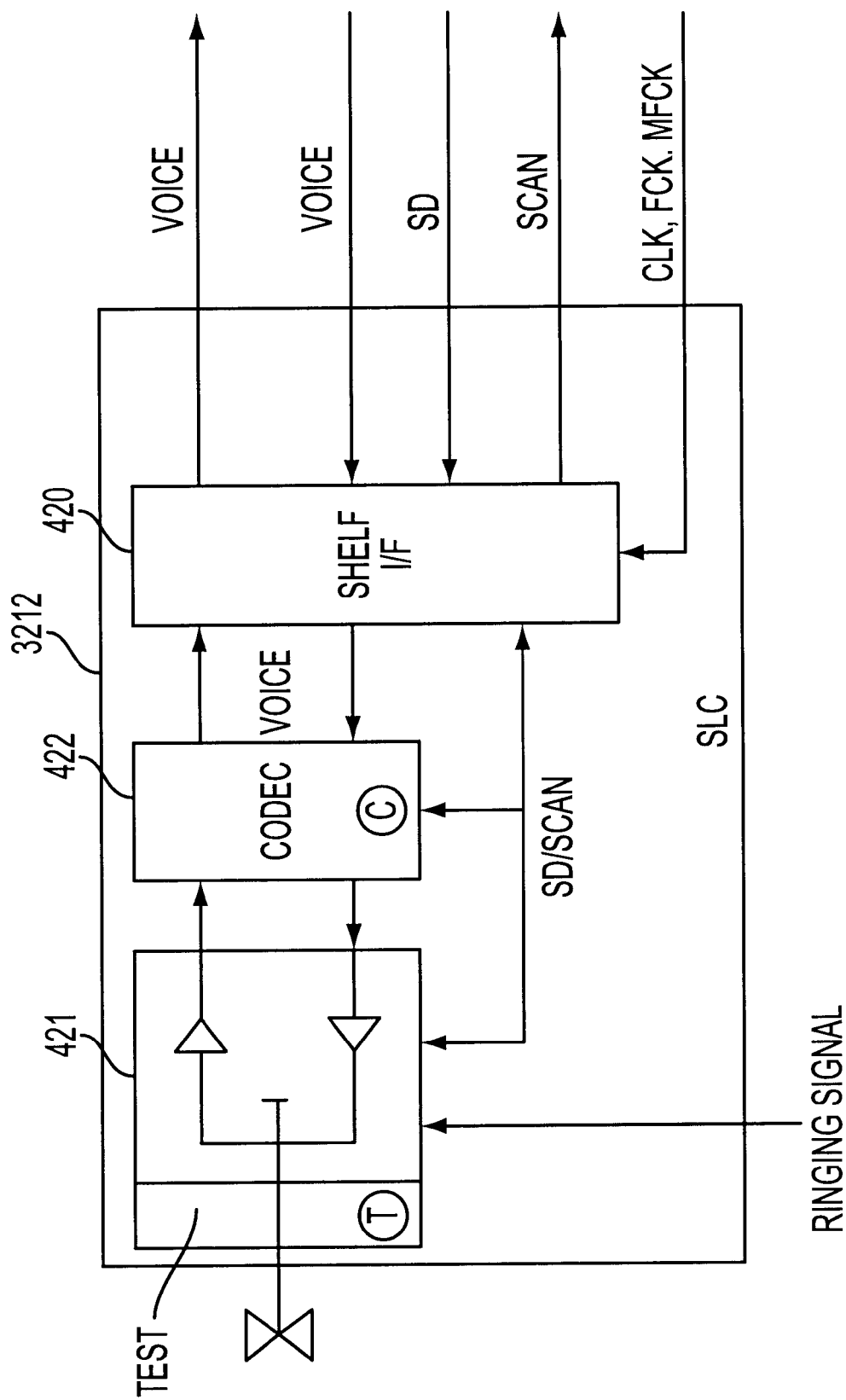
FIG. 14 is a block diagram showing a detail structure of SLC.

FIG. 14 is a diagram showing a detail structure of SLC 3212. As shown in this figure, the SLC is formed of a shelf interface section 420 as the interface with the SLCSH common section 3211, a power feeding section 421 for feeding the power to the subscriber terminal and a PCM CODEC 422 for converting the analog voice data from subscriber into the digital voice data. The shelf interface section 420 accommodates the ascending and descending lines of voice data, SD signal line, SCAN signal line, CLK (clock)·FCK (frame clock)·MFCK (multi-frame clock) line which form a highway in the shelf.

Figure 15:
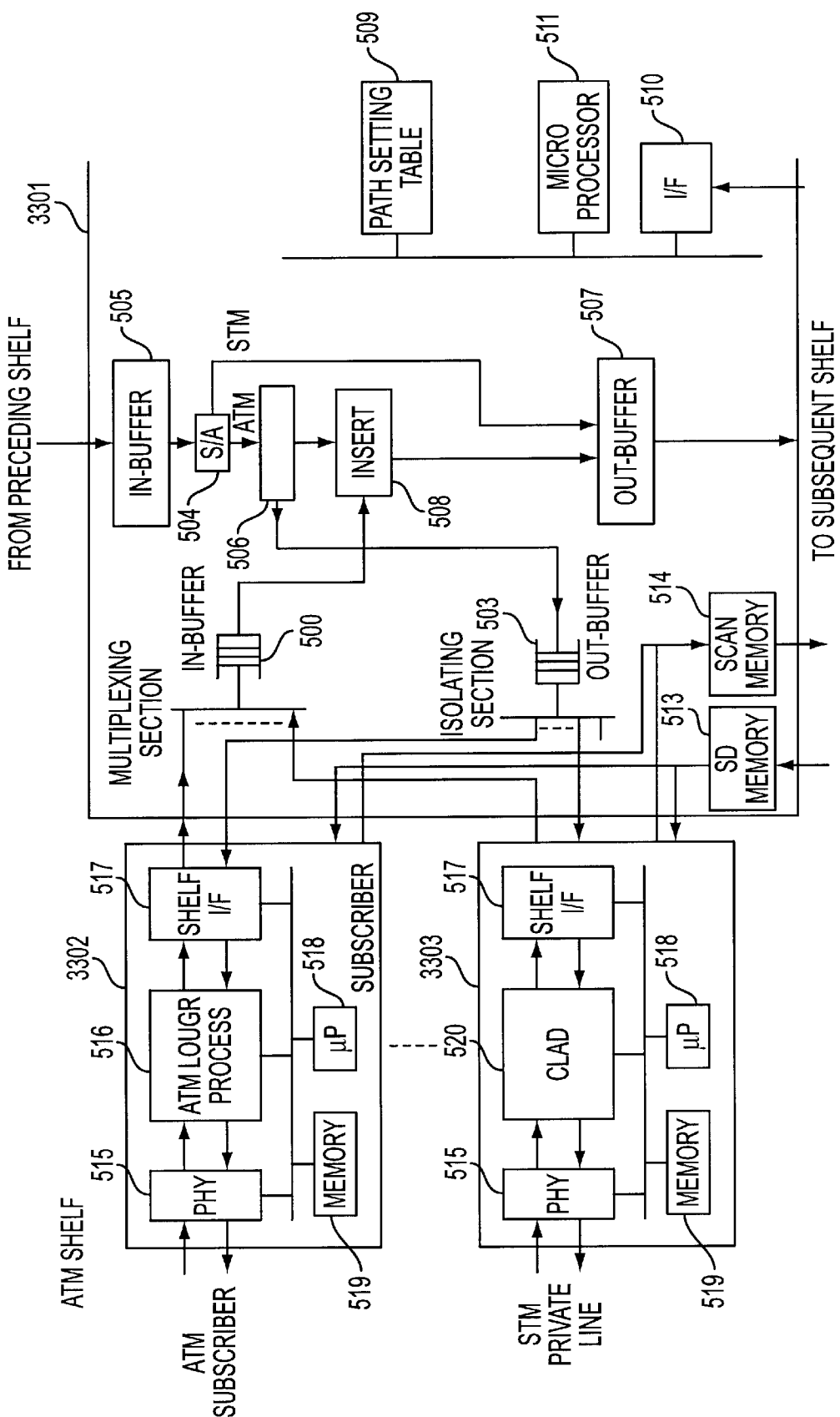
FIG. 15 is a block diagram showing a detail structure of ATMSH.

FIG. 15 is a diagram showing a detail structure of ATMSH 3300. This ATMSH 3300 is composed of the ATMSH common section 3301, a plurality of ATM units 3302 and a clad unit 3303. The ATMSH common section 3301 is provided to exchange the ATM time slot between the ring type transmission line and each ATM unit 3302. The in-buffer 500 sequentially stores the fixed length packets which has been multiplexed by a multiplexing section 501 in the ascending line extended from the ATM unit 3302. Meanwhile, the out-buffer 503 receives the fixed length packets extracted from the ATM time slot flowing into the ring type transmission line for temporary storing and then transmits this packet to the descending line of the ATM unit 3302 via an isolator 502. The time slot flowing into the ring type transmission line is once stored in the in-buffer 505. Thereafter, the fixed length packet of the STM time slot is bypassed to the out-buffer 507 by means of the STM/ATM identifying circuit 504 and it is then transmitted to a multi-drop circuit 506. This multi-drop circuit 506 drops the fixed length packet having the VPI/VCI registered to a path setting table 503 which will be explained later to the out-buffer 503. On the other hand, the insertion circuit 508 inserts the fixed length packet read from the in-buffer 500 into the idle time slot of the ATM time slot. For instance, the insertion circuit 508 executes insertion of cell using the preset insertion logic. In other words, token is previously assigned to each shelf depending on the quality or bandwidth and when an idle time slot appears, the shelf having the token transmits the fixed length packet staying in the buffer. The token is reduced one by one for each insertion of the fixed length packet and when it becomes zero, insertion is disabled even when the idle time slot appears. Here, it is also possible to employ the slotted ring system in which when the token becomes zero in all shelves, reset is effectuated and the token is newly assigned. A microprocessor 511 sets the path setting data transmitted from the small switching controller 3400 via the interface circuit 510 to a path setting table 509.

The scan memory 514 and SD memory 513 are connected to the ATM unit 3302 and clad unit 3303 to temporarily store the scan signal and SC signal.

The STM unit 3302 is composed of a physical layer processing section 515 for terminating the signal from the ATM subscriber, an ATM layer processing section 516, a shelf interface 571 as an interface with the ATMSH common section 3301, a microprocessor 518 for controlling these elements and other memory 519. The ATM layer processing section 516 executes usage parameter control (UPC), OAM process and performance monitor (PM), etc. The memory 519 includes a path setting table for storing a pass setting data from the small switching controller 3400. The fixed length packet may be created from the ATM data by converting the header of the ATM cell from the ATM subscriber accommodated in the self unit depending on the path setting table. Meanwhile, the ATM unit 3303 accommodating the STM private line is different from the ATM unit 3302 in that it includes the clad processing section 520 for converting the STM data from the STM subscriber into the ATM data.

Figure 16:
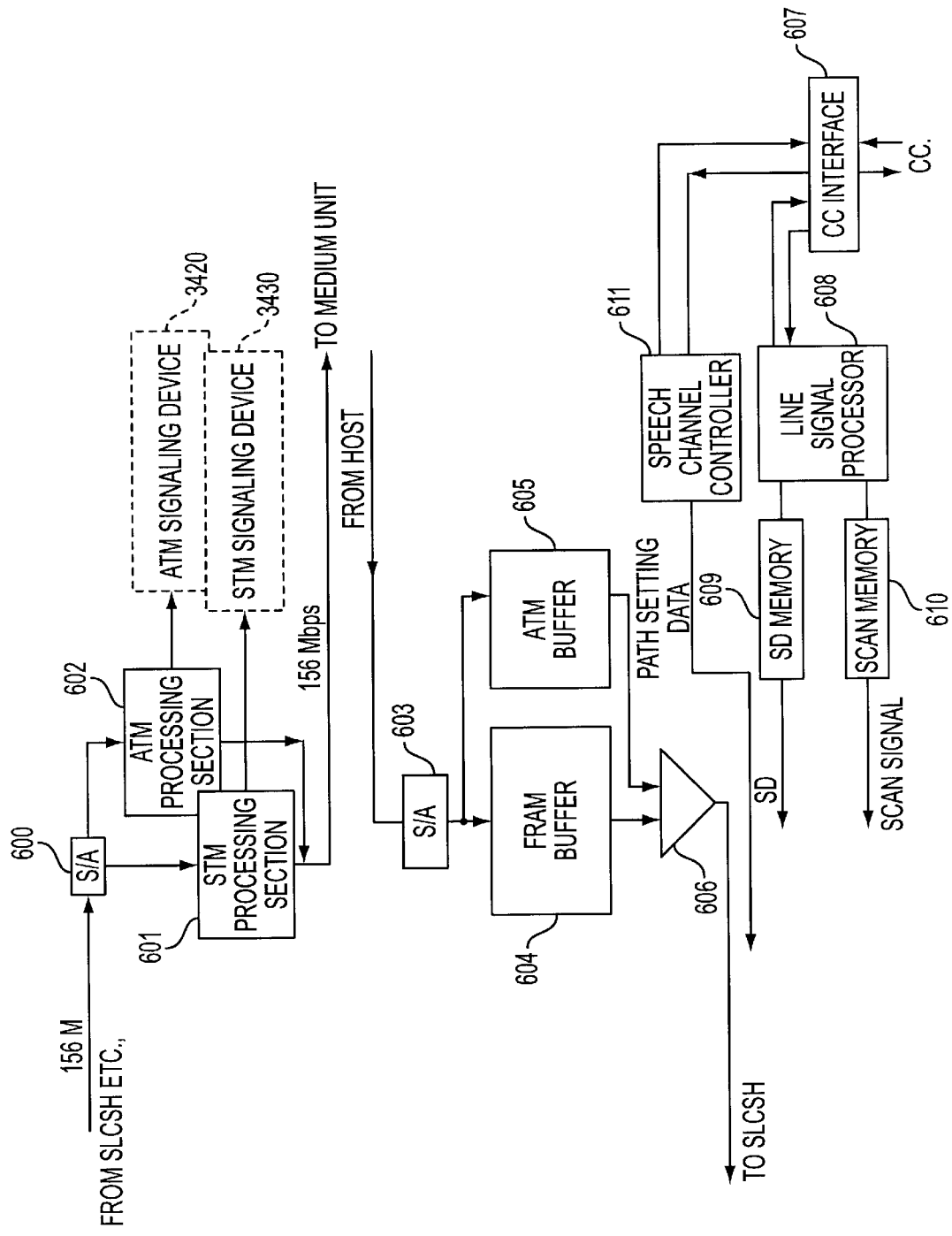
FIG. 16 is a block diagram a detail structure of a small common area of a small switching controller.

FIG. 16 is a diagram showing a detail structure of the small common section 3410 of the small switching controller 3400. In this figure, the STM/ATM identifying circuit 600 identifies whether the time slot on the ring type transmission line is the STM time slot or ATM time slot and sends the fixed length packet of the STM time slot to the STM processing section 601 corresponding to the STMSH common section, while the fixed length packet of the ATM time slot to the ATM processing section 602 corresponding to the ATMSH common section 3301 shown in FIG. 15. The STM processing section 601 is connected to the STM signaling device 3420 to send the PB signal, etc. extracted from the virtual time slot to the STM signaling device 3420. The ATM processing section 602 is connected to the ATM signaling device 3430 to send the control ATM cell extracted from the ATM time slot to the ATM signaling device 3430. The STM signaling device 3420 and ATM signaling device 3430 notify the PB signal and control cell received to the central control 1500 for the assignment of the virtual time slot VTS or VPI/VCI.

After the process in the STM processing section 601 and ATM processing section 602, the fixed length packet is transmitted to the medium unit 2000 as the host device by any one of the following three methods.

In the first method, as shown in FIG. 16, the time slot of the ring type transmission line in the small unit 3000 is transmitted in direct to the medium unit 2000 as the host device. The virtual time slot VTR and ATM time slot from the other small unit 3000 are respectively exchanged in the medium unit 2000 as the host device and these are respectively returned to the small unit 3000. In this case, the transmission line between the small unit 3000 and medium unit 2000 has the transmission rate of 156 Mbps which is equal to that of the ring type transmission line and therefore the structure of the small common section can be simplified.

In the second method, only the fixed length packets loading the data which requires the exchange process in the medium unit 2000 as the host device among the fixed length packets of the time slot flowing into the ring type transmission line are extracted and is then transmitted to the medium unit as the host device. In this case, the transmission line between the small unit 3000 and medium unit 2000 may be set without relation to the transmission rate of the ring type transmission line of the small unit 3000.

For the STM data, the virtual time slot VTS to be exchanged by the medium unit 2000 on the ring type transmission line and the virtual time slot VTS (re-mapping data) on the ring type transmission line to which the virtual time slot received from the host device should be inserted are set in the table (not illustrated) at the time of starting the communication and such time slots are extracted depending on such setting. Moreover, for the ATM data, the VPI/VCI to be transmitted to the medium unit 2000 of the host device is set, at the time of starting the communication or previously, to the table (not illustrated) and it is then extracted depending on this setting.

In the third method, the re-mapping method in the second method is executed in the frame buffer 604 which will be explained later.

FIG. 16 shows the first method. The STM/ATM identifying circuit 603 identifies all time slots from the medium unit 2000 as the host device whether these are STM time slot or ATM time slot and stores the fixed length packets of the STM time slot in the frame buffer 604 and also stores the fixed length packets of the ATM time slot in the ATM buffer.

The frame buffer 604 is used, as explained above, for time adjustment of 125 μs to hold the fixed length packet until the STM time slot of the preset frame appears in the frame after the next period. The ATM buffer 605 inserts the stored fixed length packet into the idle ATM time slot of the transmission line by finding such idle time slots.

A speech channel setup controller 611 receives, via the central control interface 607, contents (virtual time slot, header converting information) of the table set in SLCSH, DTSH, ATMSH from the CC 1500 and VPI/VCI notified to the ATM subscriber and then transmits it as the path setting information using the signal line.

A line signal processor 608 monitors the scan memory 610 storing the scan signal (for example, dial pulse collected in SLCSH) collected from each shelf and makes a communication as required with CC via the CC interface 607. Moreover, the line signal processor 608 stores, in the SD memory, the SD (Signal Distributor) signal which is sent to the terminal from CC by receiving the control signal from CC. Here, the SD signal is a so-called bit map signal which shows a meaning with only one bit which is used, for example, to drive a relay.

[3] Explanation of Medium Unit

Figure 26:
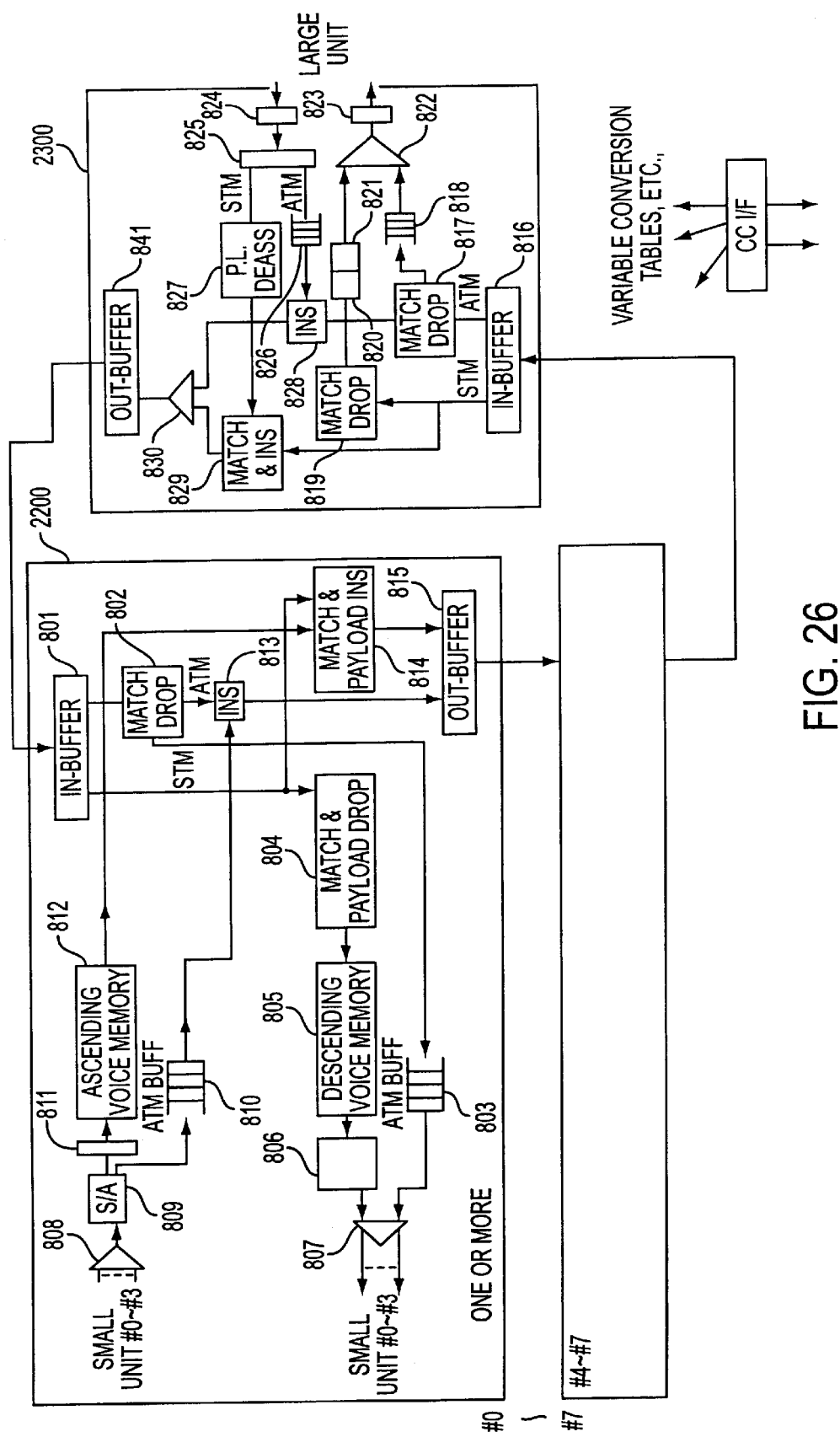
FIG. 26 is a block diagram showing a third embodiment of a medium unit 2000.

Next, a medium unit 2000 will be explained. The medium unit of the present invention is shown in FIG. 17 or FIG. 26.

1) First Embodiment (Memory Exchange Process)

Figure 17:
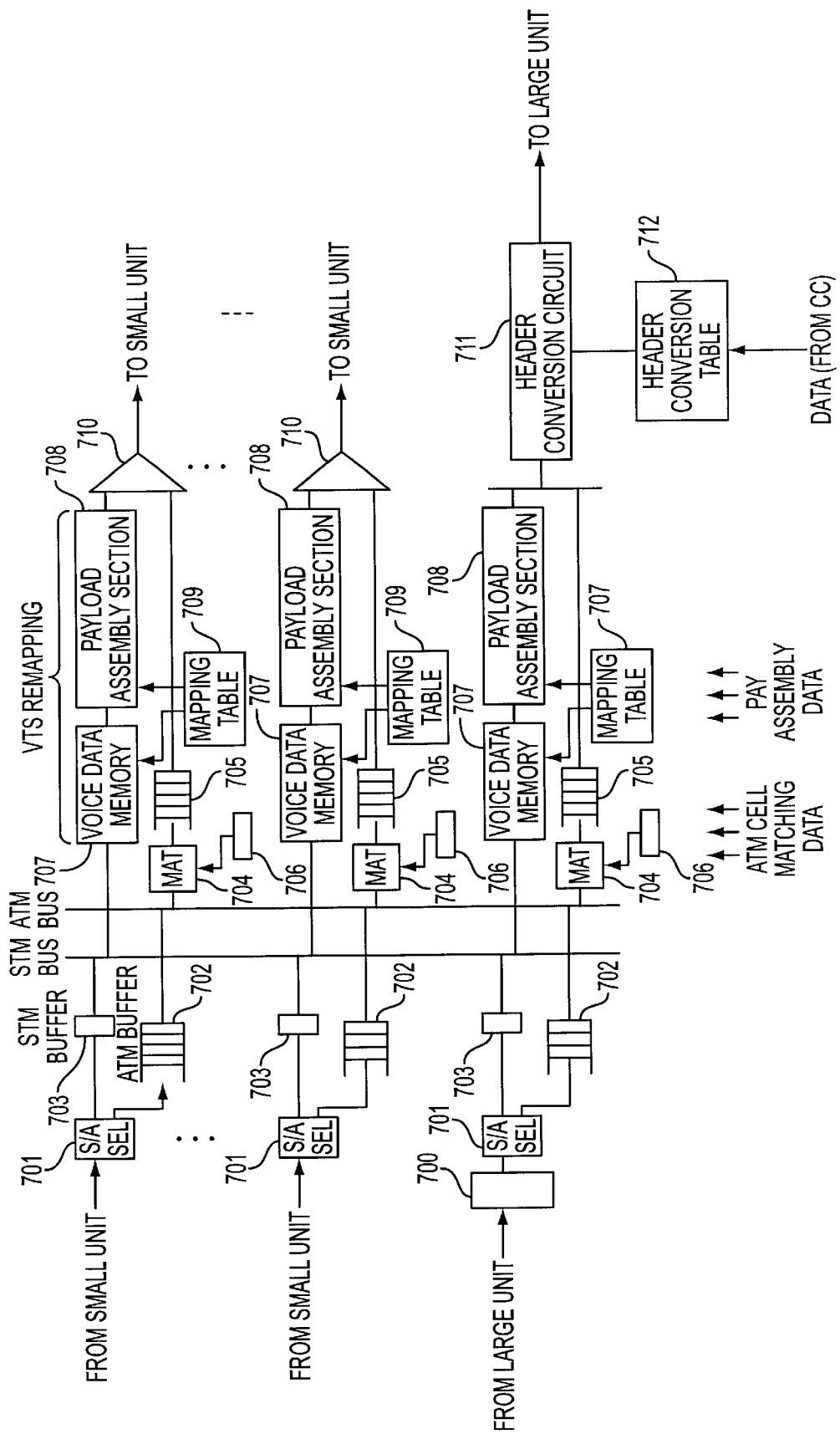
FIG. 17 is a block diagram showing a first embodiment of a medium unit.

FIG. 17 shows a first embodiment of the medium unit 2000. The medium unit 2000 of the first embodiment is structured as a centralized type for exchanging the time slots in the memory. In more practical, the medium unit 2000 temporarily stores the fixed length packets received from the small unit 3000 or large unit 1000 in the buffer and collects them for each destination unit. In this case, the STM data is processed in unit of the virtual time slot VTS.

Hereinafter, operation will be explained with reference to FIG. 17. A fixed length packet converting section 700 sets the ATM/STM identifier indicating the STM data when the ATM cell received from the large unit 1000 has the STM data in the payload. Meanwhile, when the ATM data exists in the payload, the ATM/STM identifier for indicating the ATM data is set. An STM/ATM identifying section 701 identifies the fixed length packet received from the small unit 3000 or the fixed length packet converting section 700 and respectively stores the fixed length packet having the ATM/STM identifier indicating the ATM data into the ATM buffer 702 and the fixed length packet having the ATM/STM identifier indicating the STM data into the STM buffer 703. The ATM buffer 702 transmits the fixed length packet being stored into the ATM bus responsive to the instruction from the sequencer not illustrated. The fixed length packet on the bus is fetched into the ATM buffer 705 by means of a matching section 704 provided for each transmission line. The matching section 704 fetches the fixed length packet having the registered VPI/VCI in accordance with a matching table 706 set by the CC1500. Meanwhile, each STM buffer 703 transmits the fixed length packet stored to the STM bus depending on the instruction from the sequencer (not illustrated). The STM data on the bus is fetched by the voice data memory 707 provided to each transmission line to update a new payload of the fixed length packet by means of a payload assembling section 708 and the header is transmitted to a new destination. For example, in the case of exchanging the voice data of subscriber from the small unit 3000-1 to the small unit 3000-8, the fixed length packet including the virtual time slot loading the voice data of the relevant subscriber is temporarily stored in the STM buffer 703 and then stored in the voice data memory 707. Moreover, only the STM data in the payload directed to the small unit 3000-8 from the voice data memory 707 is extracted and is the mapped in the payload in the transmission line of the destination unit. The voice data memory 707 and payload assembly section 708 execute the process in accordance with the payload assembly data which indicates that the data of which virtual time slot should be loaded to which virtual time slot depending on-the mapping table 709 (namely, the STM time slot number TSID and payload number in the receiving side and STM time slot number TSID and payload number in the transmitting side).

The selector 710 causes the ATM time slot and STM time slot to flow on the transmission line in accordance with the contents of the transmission line of the small unit.

On the other hand, the transmitting side for the large unit 1000 is almost same as that explained above and it is characterized in that the header converting circuit 711 is provided and the fixed length packet loading the STM data is also formed as the ATM cell. This header converting circuit 711 converts the header of each fixed length packet into the VPI/VCI in the input side of the large unit 1000 in accordance with the contents of the header converting table 712.

2) Second Embodiment

Figure 18:
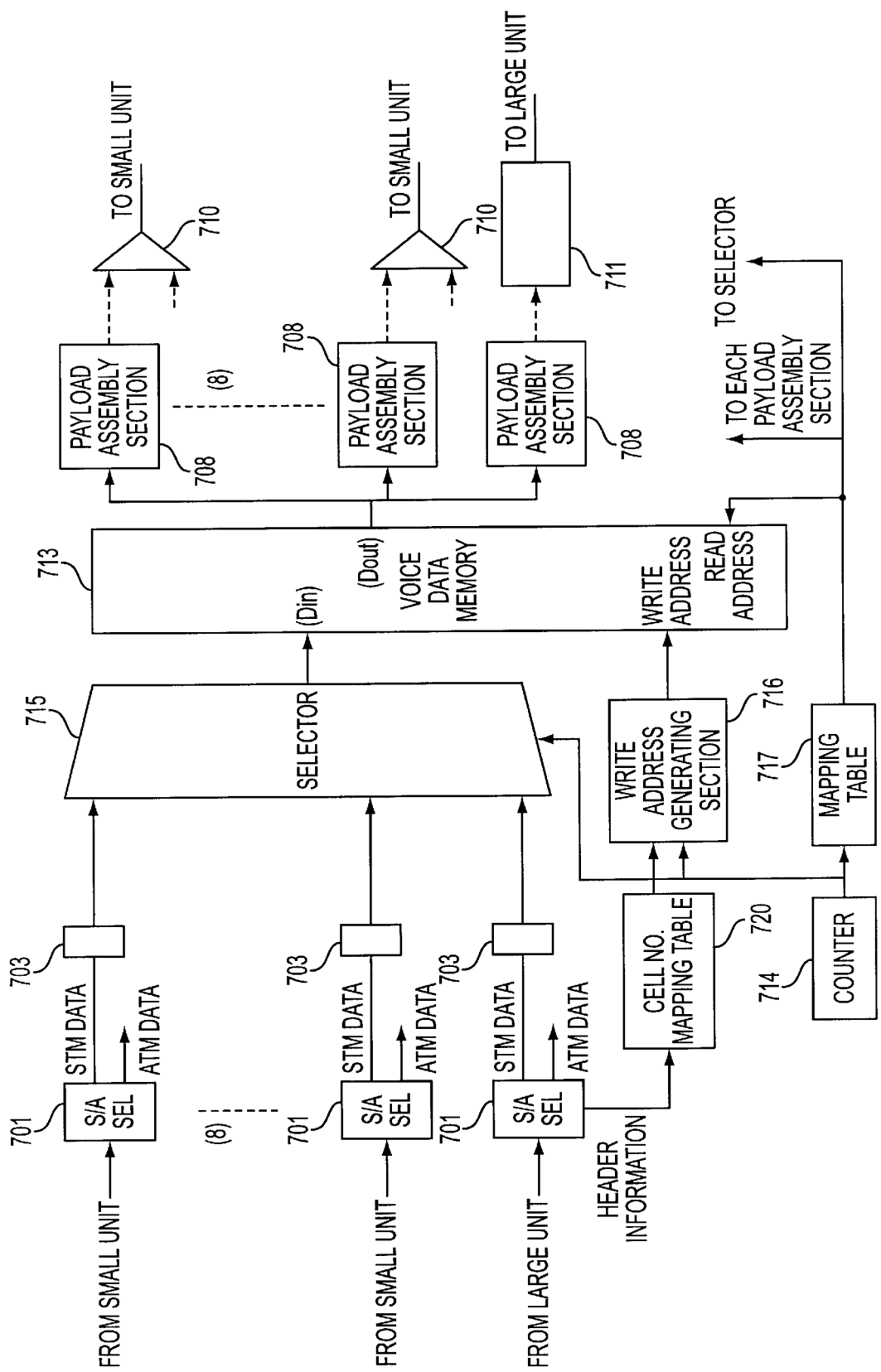
FIG. 18 is a function block diagram of the medium unit to realize a centralized buffer system.
Figure 24:
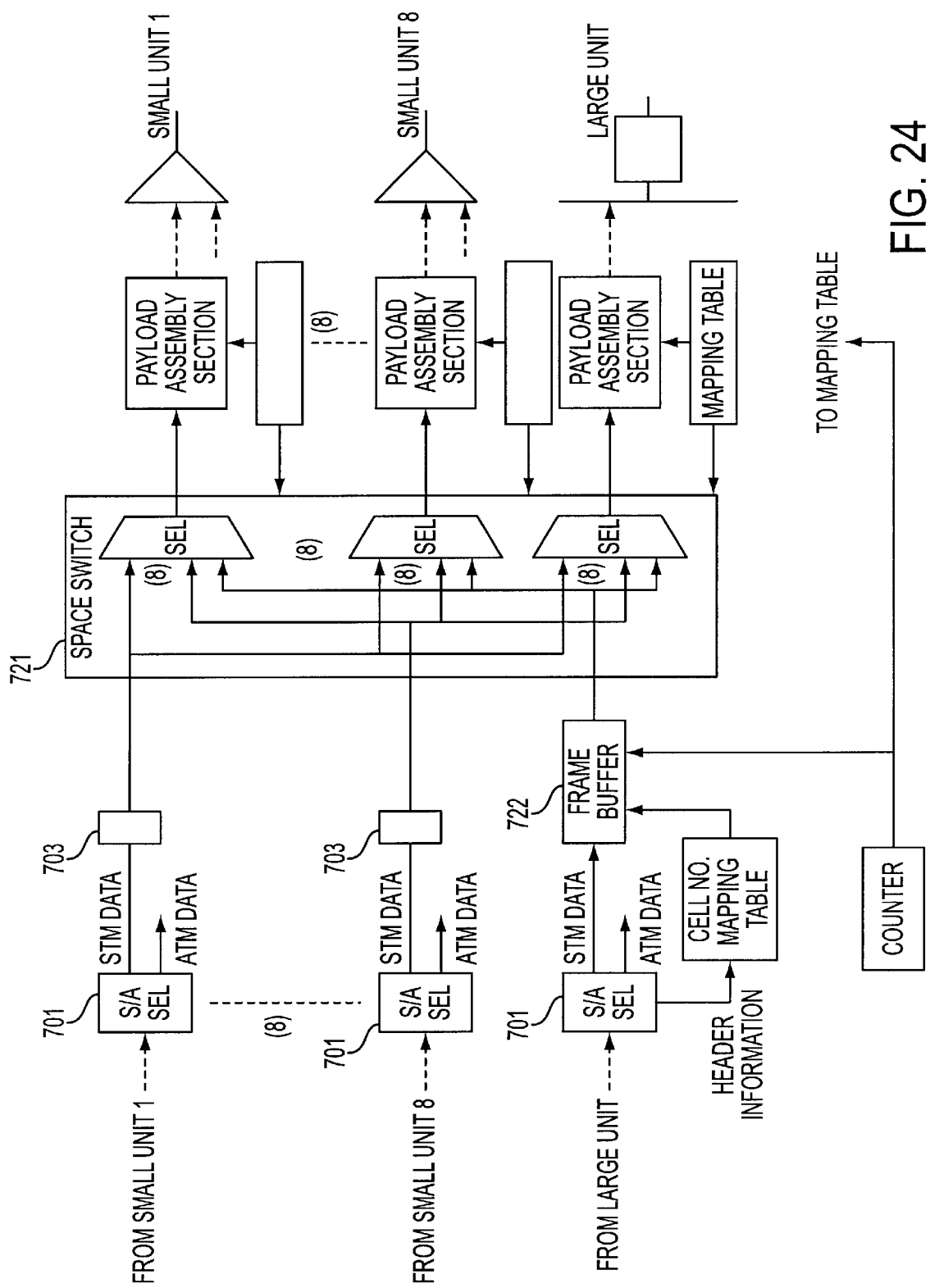
FIG. 24 is a block diagram for explaining a space switching system.

FIG. 18 and FIG. 24 respectively show modification examples of the first embodiment of the medium unit 2000 (a: centralized buffer system (time switch system); b: space switch system). For the simplification, exchange of ATM data is not explained because it is similar to that in FIG. 17 and only the part related to the exchange of STM data will be explained.

These two modification examples provide the effect that capacity of voice data memory can be reduced in comparison with the structure of FIG. 17 where one voice data memory is provided for one small unit (or large unit) of the transmitting destination.

a) Centralized Buffer System (Time Switch System)

FIG. 18 is a function block diagram of a medium unit for realizing the centralized buffer system. Differences between FIG. 18 and FIG. 17 are that (1) one voice data memory 713 is provided in common to the transmitting line side of the small units 1 to 8 and large unit and the STM date from the small units 1 to 8 and large unit selected by the selector 715 depending on the count value from the counter 714 is written into the voice data memory 713, (2) a cell No. mapping table 720 for obtaining the natural sequence of the cell based on the sequence information of the header of the ATM cell from the large unit and a write address generating section 716 for generating the write address to store the STM data selected by the selector 715 into the address of the voice data memory 713 based on the natural sequence are provided, and (3) one mapping table 717 is provided in common to the transmitting line side to the small units 1 to 8 and large unit, the read address is given to the voice data memory 713 in accordance with the count value from the counter 714 and an instruction to fetch the STM data is issued to the payload assembly section of the small units 1 to 8 and large unit.

Figure 19:
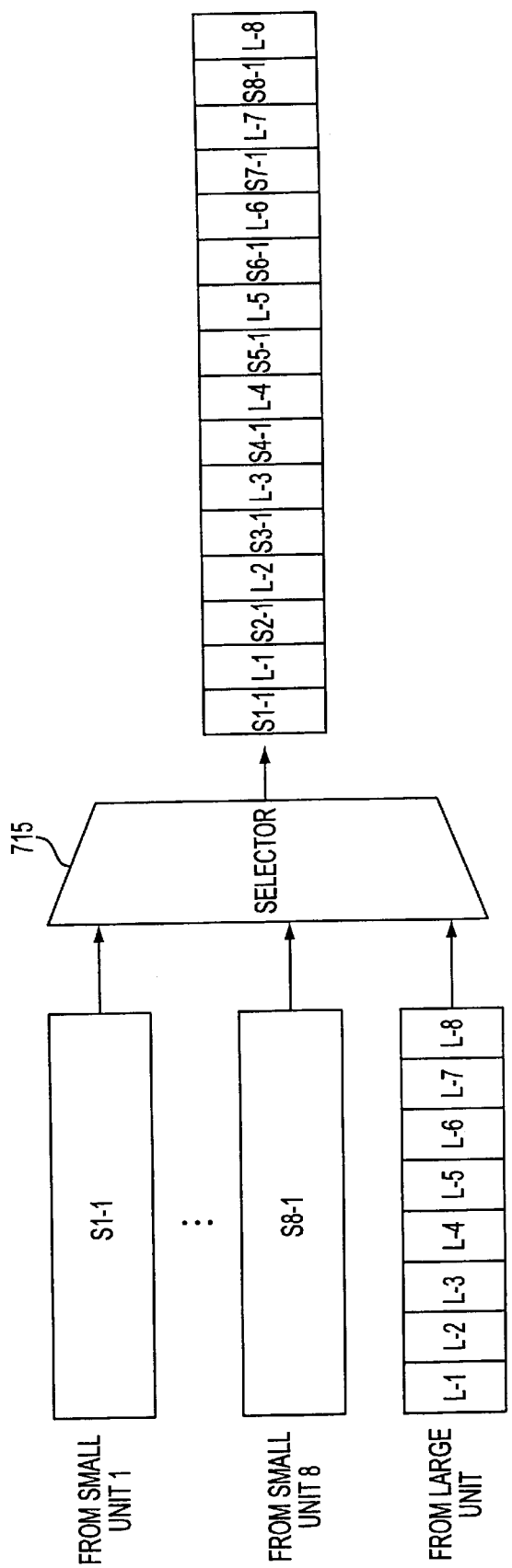
FIG. 19 is a diagram for explaining operation of a selector of the medium unit of FIG. 18.

FIG. 19 is a diagram for explaining operation of the selector 715.

The input "S1-1" (or "S8-1") for the selector in this figure indicates an octet of a certain cell input from the small until (or small unit 8). In the same manner, "L-1" indicates an octet of a certain cell input from the large unit. The input rate from the small unit is 156 Mbps and that from the large unit is 1.2 Gbps. Therefore, the 8 octets are input from the large unit during the one input octet from the small unit. The selector 715 multiplexes these data to provide the processing rate of 2.4 Gbps after the multiplexing. This multiplexing process is controlled by an output of the counter 714 as indicated in FIG. 18.

In FIG. 18, the STM data output from the selector 715 is once stored in the voice data memory 713 and time switching is executed by this voice data memory 713 and mapping table 717.

Figure 20:
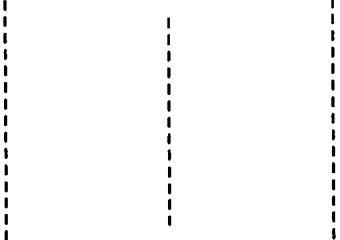
FIG. 20 is a diagram showing an image of storing data into a voice data memory of the medium unit of FIG. 18.

FIG. 20 is a diagram showing an image of storing data into the voice data memory 713. Output data of the selector 715 are sequentially stored from younger addresses. Sx-y-z in the figure means the data of zth octet of the payload of the fixed length packet of the STM time slot number TSID#y from the small unit x. In the same manner, L-a-b means the data of bth octet of the payload of the ATM cell of the cell No. inserted into the ath time slot (one frame is formed of the 352 time slots from the large unit) from the large unit As shown in the figure, the data of the lth octet of the payload section of the fixed length packet of TSID#1 from the small unit is stored in the address 0 of the voice data memory 713 and data are stored thereafter as indicated in the figure. This write address is generated by a write address generating section 716 based on the output of counter 714. An input of the cell No. mapping table 720 is also applied to the write address generating section 716 but it will be explained later in detail.

In this modification example, only 48 octets of the payload section of the fixed length packet storing the STM data are accumulated in the voice data memory 713. Therefore, in the timing that the data of header section output from the selector 715 is input to the voice data memory 713, the write enable signal to the voice data memory 713 is not given. In FIG. 18, the write enable signal and the block for generating this signal are omitted but generation (for the payload section)/no-generation (for header section) is controlled by an output of the counter 714.

Moreover, for example, while the ATM cell or fixed length packet storing the ATM data appears from the large unit or small unit, it is not required to store the payload section into the voice data memory. Therefore, even in this timing, the write enable signal is not given. The signal indicating the STM data or ATM data of the fixed length packet is given to the signal generating block not illustrated from the STM/ATM identifying section 701 and therefore the write enable signal is generated with reference to this signal.

Figure 21:
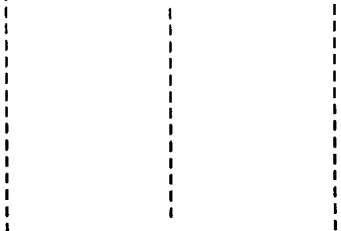
FIG. 21 is a diagram showing a practical example of a mapping table of the medium unit of FIG. 18.

Next, FIG. 21 shows a practical example of the mapping table 717. In this figure, Sx-y-Hz means that the data itself to be stored in the zth octet of the header section of the STM time slot number TSID#y to the small unit x is accumulated here. In the same manner, Sx-y-Pz means that the address of the voice data memory 713 storing the data to be stored in the zth octet of the payload section of the STM time slot number TSID#y to the small unit x is accumulated. Lx-y-Hz and Lx-y-Pz also have the same meaning. L indicates the large unit and x is omitted here because x=1.

For example, the data L-1-H1 read from the address 1 of the mapping table 717 is input to each payload assembly section 708 and voice data memory 713 and only the payload assembly section 708 corresponding to the large unit fetches these data. In the payload assembly section 798 of the large unit, relevant data is set in the 1st octet of the header section of the cell No. 1 ATM cell to be inserted to the 1st time slot for the large unit.

The read address of the mapping table 717 is given from the counter 714. An output of the counter 714 is also given to the payload assembly-section 708 and voice data memory 713, although it is not illustrated. Therefore, since the fact that "address 1 of the mapping table 717" is an output of the counter is based on the recognition that data is provided for the large unit, only the payload assembly section corresponding to the large unit can fetch the output data of the mapping table 717.

Subsequently, when Sx-y-Hz, Lx-y-Hz are read in the same manner, only the related payload assembly section fetches the output data of the mapping table, upon recognition of the counter output.

Next, for example, the data L-1-P1 read from the address 11 of the mapping table is fetched only by the voice data memory 713 and the STM data is read from the address designated by such data. The STM data output from the voice data memory 713 is input to the payload assembly section 708. However, this data is fetched only by the payload assembly section 708 corresponding to the large unit. This fetch control is also executed on the basis of the counter output. The relevant data is set to the 1st octet of the payload section of the cell No. 1 ATM cell to be inserted to the 1st time slot for the large unit.

Moreover, the practical switching operation will be explained.

For example, the operation for switching the 2nd octet of the payload section of the fixed length packet of the TSID#1 from the small unit 1 to the 42nd octet of the payload section of the cell No. 352 ATM cell to the large unit is executed as follow.

First, 2nd octet of the payload section of the fixed length packet of TSID#1 from the small unit 1 is accumulated in the address 16 of the voice data memory of FIG. 20. From which address of the voice data memory the data which is stored in the 42nd octet of the payload section of the No. 352 ATM cell to the large unit should be read is determined by the data stored in the address 37299 of the mapping table 717 of FIG. 21. Therefore, in above example, the data indicating the address 16 of the voice data memory 713 is stored in the address 37299 of the mapping table.

Meanwhile, the fixed length packet or ATM cell to be transmitted to the small unit or large unit stores in some cases the ATM data in addition to the STM data. The selector 710 of FIG. 18 is controlled to transmit the ATM cell storing the STM data or to transmit the ATM cell storing the ATM data.

An output of the mapping table 717 shown in FIG. 17 is also given to the selector 71 and ATM buffer 705 of FIG. 17. When the part corresponding to the "ATM/STM identifier" among the output data mapped to the header section of the mapping table 717 indicates "ATM", the selector 710 operates to select an output of the ATM buffer 705. During the period of this operation, the read operation from the voice data memory 713 and assembly operation in the payload assembly section 708 are stopped and only the read operation from the ATM buffer 705 is conducted. Meanwhile, when the part corresponding to ATM/STM identifier indicates "STM", the selector 710 operates to select an output of the payload assembly section. During this period, the read operation from the voice data memory 713 and assembly operation in the payload assembly section are conducted but the read operation from the ATM buffer 705 is stopped. Therefore, the fixed length packet or ATM cell having the ATM data and the fixed length packet or ATM cell having the STM data may be multiplexed in unit of the 53 octets.

From above explanation, a ratio of the STM time slot and ATM time slot among the time slots on the transmission line to the small unit and arrangement sequence of the STM time slot and ATM time slot of 44 time slots can be controlled by the data (data area used as the ATM/STM identifier of the header section) to be set in the ATM mapping table 717. The ratio of the number of both cells may be varied and arrangement sequence can also be designated freely. Moreover, a ratio of the ATM cells storing the STM data and the ATM cells storing the ATM data among the cells on the transmission line to the large unit and arrangement sequence of the ATM cells storing the STM data and the ATM cells storing the ATM data among 352 cells can also be controlled by the data to be set in the mapping table 717.

Next, role of the cell No. mapping table 720 will be explained with reference to FIG. 22 and FIG. 23. The cell No. mapping table 720 plays the role, as shown in FIG. 22(a), of assuring the cell sequence in the frame when a cell reaches the medium unit as the destination for the cell which is transmitted to the medium unit as the destination via the large unit from the medium unit.

Figure 22A:
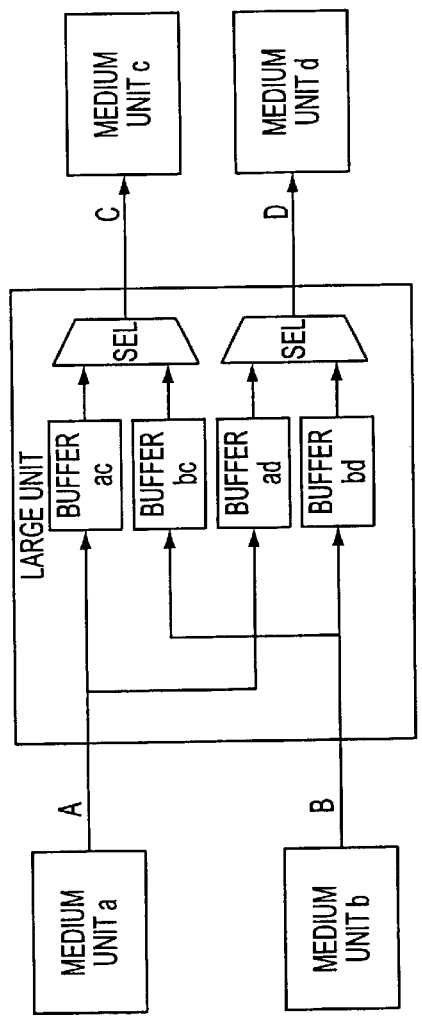
FIGS. 22(a) and 22(b) are diagrams (No. 1) for explaining a role of a cell number mapping table of the medium unit of FIG. 18.

FIG. 22(a) shows the route extended to the medium units c, d from the medium units a, b via the large unit. The large unit has a selector for selecting the buffer ac storing the cells transmitted to the medium unit c from the medium unit a and the buffer bc storing the cells transmitted to the medium unit c from the medium unit b. Moreover, the large unit has a selector for selecting the buffer ad storing the cells transmitted to the medium unit d from the medium unit a and the buffer bd storing the cells transmitted to the medium unit d from the medium unit b.

Figure 22B:
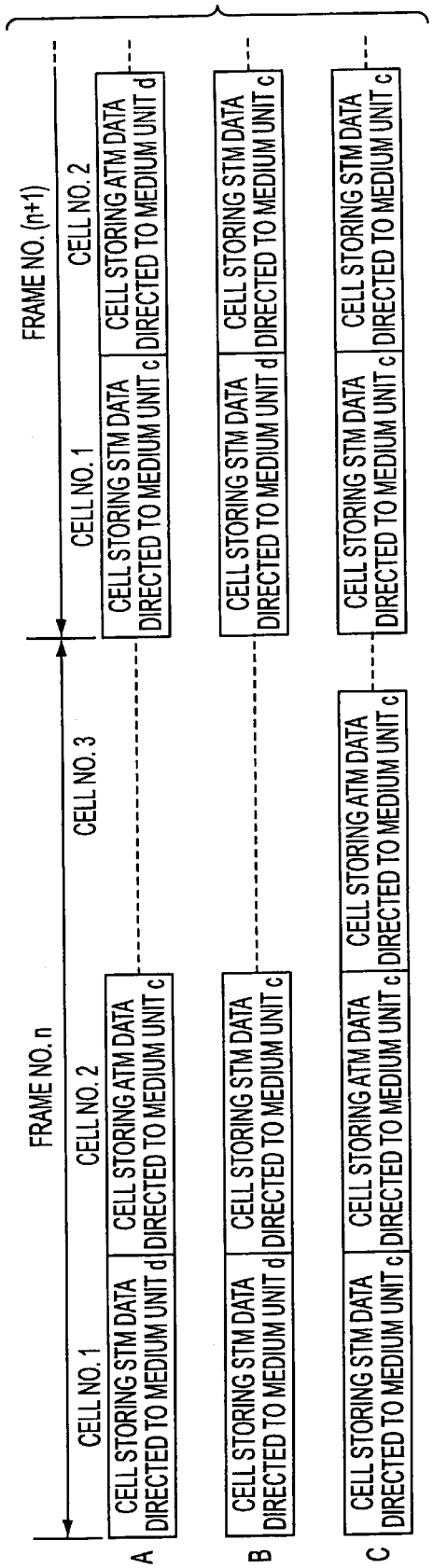

FIG. 22(b) is a diagram showing the timing chart of such cells. A, B are timing charts at the transmission timing of the medium units a, b as the originating units and C is the timing chart at the input timing to the medium unit c as the terminating unit. The phases of A and B are synchronized. However, there are small difference between these phases from the microscopic view but it is neglected here. Meanwhile, C has a delay in the large unit and it must truly be sifted to the right side from A and B but it is aligned to A and B for helping the understand. In the medium units a and b, positions of the ATM cell having the STM data and the ATM cell having the ATM data are determined at the transmission timing and each frame is in the same position. However, position of the STM data storing cell in the medium unit a is not always same in the medium unit b.

The cell No. 1 transmitted from the medium unit a is the ATM cell having the STM data. In the case of the ATM cell having the STM cell, the ATM cell of the same destination is transmitted in every frame to the same position. In FIG. 22(b), an example of the ATM cell storing the STM data to medium unit c in every frame is shown. In the same manner, the cell No. 2 is the ATM cell having the ATM data. In the case of the ATM cell having the ATM data, position of every frame is not fixed. Namely, the relevant position is directed to the medium unit c in a certain frame but it is directed to the medium unit b in the next frame. In this figure, a certain position is directed to the medium unit c in the frame No. n and is directed to the medium unit d in the next frame No. n+1.

Comparison of the timing charts A, B, C suggests that the medium unit a outputs the cell directed to medium unit c, while the medium unit b outputs the cell directed to medium unit d in the cell No. 1 of the frame No. n. Therefore, the cell from the medium unit a reaches the medium unit c as the cell No. 1. In the same manner, in the cell No. 2, the medium units a, b output the cell directed to the medium unit c. The STM exchange cannot realize the switching in such multiple timing. But, the large unit is the ATM exchange including the buffer as shown in the figure. Therefore, if the timing is multiple, any cells may be delayed in the buffer. In FIG. 22, output cell of the medium unit b is delayed, cell transmitted as the cell No. 2 from the medium unit a is input as the cell No. 2 and the cell transmitted as the cell No. 2 from the medium unit b is input as the cell No. 3.

On the other hand, in the frame No. n+1, the cell No. 2 from the medium unit b at the transmission timing reaches the medium unit c as the cell No. 2 because the timing is not multiple, namely, the medium unit a is directed to the medium unit d, while the medium unit b is directed to the medium unit c.

As explained above, at the input of c, cell arriving sequence is different for each frame. In general, if the data arriving sequence is different in every frame, such data cannot be time-switched. The cell No. mapping table solves this problem. Namely, if the cell arriving sequence is different in every frame, the time switching can be realized.

Figure 23A:
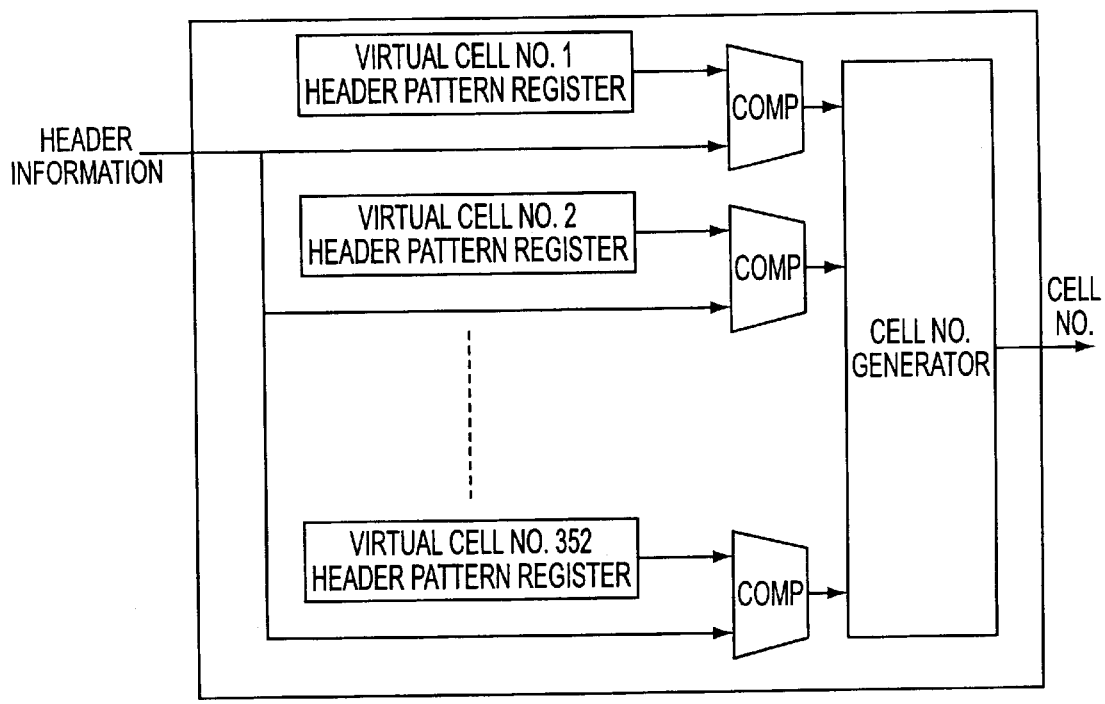
FIGS. 23(a) and 23(b) are diagrams (No. 2) for explaining a role of a cell number mapping table of the medium unit of FIG. 18.
Figure 23B:
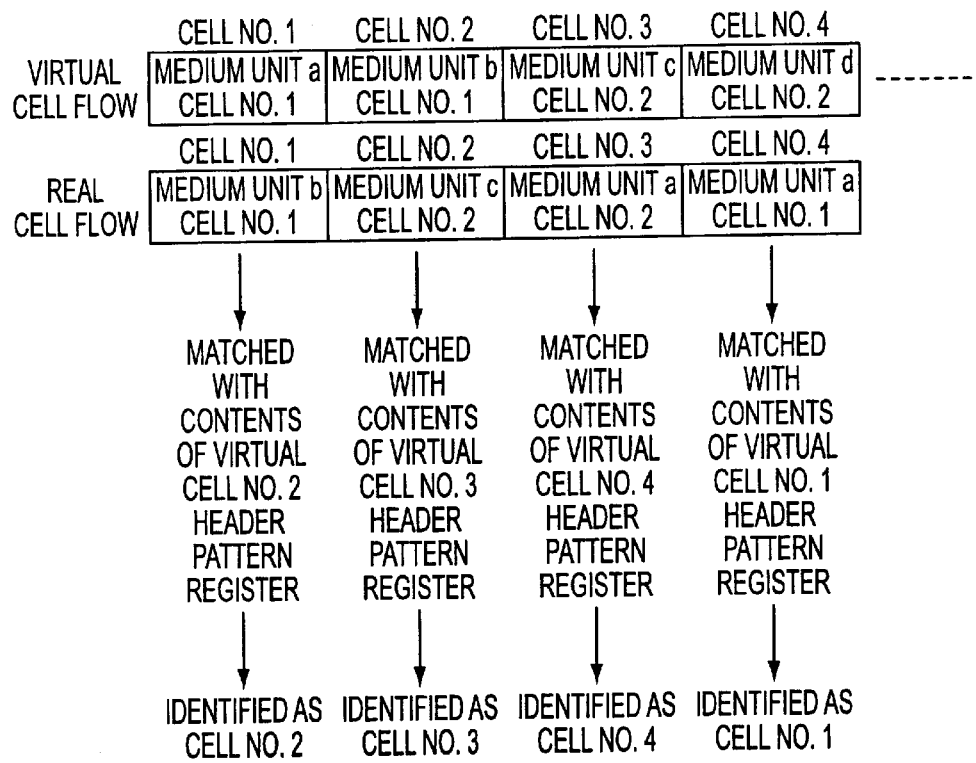

FIG. 23(a) is a function block diagram of the cell No. mapping table 720 and FIG. 23(b) is a diagram showing the timing chart of the function block. On the occasion of sending the ATM cell having the STM data to the large unit from each medium unit, the cell No. at the timing of sending the medium unit and information indicating the medium unit as the originating unit are given to the header section. Moreover, the ATM/STM identifier is also inserted.

In each medium unit, a virtual cell No. is estimated for the cells input from the large unit.

The STM data in the virtual cell No. 1 is written into the area corresponding to the cell No. 1 from the large unit of the voice data memory. It can also be adopted to the virtual cells after the No. 2 virtual cell.

For instance, in FIG. 23(b), the virtual cell No. 1 is the cell No. 1 at the time of transmission from the medium unit a. The No. 2 is the cell No. 1 at the time of transmission from the medium unit b . . . The medium unit a and cell No. 1 are set to the virtual cell No. 1 header pattern register, while medium unit b, cell No. 1 are set to the virtual cell No. 2 header pattern register.

In the actual flow of cells ("actual cell flow" in the figure), it is assumed that the cell No. 1 from the medium unit b exists in the position of the cell No. 1 as shown in the figure. The cell No. at the transmission timing from the medium unit and information indicating the medium unit as the originating unit which are header information of this cell are input to each COMP (comparator). In the virtual cell flow, the cell No. 1 from the medium unit b is the cell No. 2. Namely, the medium unit b and cell No. 1 are set to the virtual cell No. 2 header pattern register and contents of the pattern register matches the header information of the inflow cell only at the comparator COMP corresponding to the pattern register. In this case, the cell No. generator provides the cell No. 2 since matching is obtained in only the COMP corresponding to the virtual cell No. 2 header pattern register which is the comparison result in each COMP. This is transmitted to the write address generator shown in FIG. 18 and the STM data in the cell is written into the corresponding area of the cell No. 2 from the large unit in the voice data memory 713.

As is obvious from above explanation, if the cell arriving sequence from the large unit for the medium unit is different in each frame, each arriving cell is given the virtual cell No. by the cell No. mapping table and is written into the corresponding area of the virtual cell No. from the large unit in every frame and voice data memory 713.

b) Space Switching System

FIG. 24 is a diagram for explaining the space switching system. Like FIG. 18, only the part related to the switching operation of the STM data is indicated and the switching operation of the ATM data is omitted.

The STM data is input to the space switch 721. The STM data from the large unit is input, after output from S/A SEL, to the space switch 721 via the frame buffer 722. The frame buffer 722 has the capacity for accumulating all cells (352 cells) in one frame (125 μs) input from the large unit. The frame buffer 722 stores the cells in the sequence from the younger number of address and virtual cell No. As in the case of the structure as explained previously, the cell sequence does not become constant when the cell passes the large unit and reaches the medium unit as the destination. Therefore, the virtual cell No. of the input cell is obtained as explained previously using the cell No. mapping table. Data is then stored in the address corresponding to the virtual cell No. of the frame buffer 722. When it is read in the sequence of the younger address depending on an output of the counter, the cell may be seen as if it has arrived in the sequence of the virtual cell No.

According to this structure, the buffer capacity required for switching of the STM data is a half of the voice data memory in the centralized buffer system and is equal to 1/18 in comparison with FIG. 17.

FIGS. 25(a) and (b) diagrammatically show a practical example of the mapping table.

FIG. 25(a) is a mapping table corresponding to the small unit. x-Hy indicates that the data which should be stored in the yth octet of the header section of the fixed length packet of the STM time slot number TSID#x is accumulated here. In the same manner, x-Py indicates that from which small unit or large unit the data which should be stored in the yth octet of the payload section of the fixed length packet of the STM time slot number TSID#x is received. FIG. 25(b) shows an example of the mapping table corresponding to the large unit and concept for x-Hy, x-Py is same as that in FIG. 25(a). However, 44 fixed length packets are transmitted by one frame to the small unit, the addresses of the corresponding mapping table can be counted up to 2332 (53×44) (0 to 2331), while in the mapping table corresponding to the large unit, since 352 ATM cells are transmitted by one frame, the addresses may be counted up to 18656 (53×352) (0 to 18655).

In the mapping table corresponding to the small unit and large unit, since transmission of one frame requires 125 μs, access is made at the rate of 156 Mbps in the mapping table corresponding to the small unit, while at the rate of 1.2 Gbps in the mapping table corresponding to the large unit.

Moreover, the data read from the address x-Hy of the mapping table is set, as is explained in the centralized buffer system, in the yth octet of the header section of the ATM cell of the fixed length packet of TSID#x or No. x in the payload assembly section.

More practical switching operation will be explained.

For example, the operation for switching the 2nd octet of the payload section of the fixed length packet of the STM time slot number TSID#1 from the small unit 1 to the 2nd octet of the payload section of the fixed length packet of the STM time slot number TSID#1 from the small unit 2 will be explained hereunder.

As shown in FIG. 24, an output of the small unit 1 is input to all SEL (selectors) in the space switch 721. In this case, the data designating the small unit 1 is set to the address 6 of the mapping table (FIG. 25(a)) corresponding to the payload assembly section of which destination is small unit 2. With this designation, the payload assembly section of the small unit 2 selects the output data from the small unit 1 in the timing of the 2nd octet of the payload section of the fixed length packet of TSID#1.

The subsequent operation until transmission to the small unit or large unit is similar to that of the centralized buffer system.

3) Third Embodiment (Ring Type Transmission Line Exchange Process)

FIG. 26 is a diagram showing the third embodiment of the medium unit 2000. The medium unit 2000 of the third embodiment executes the exchange process (switching operation) by the ring type transmission line. In more practical, a plurality of small interface section 2200 and large interface 2300 are connected through the ring type transmission line 2100.

In the small interface section 2200, the fixed length packet of the time slot flowing into the ring type transmission line 2100 is once stored in the in-buffer 801. In the ATM time slot, the fixed length packet having VPI/VCI to be fetched is dropped by the multi-drop section 802 and is then stored in the ATM buffer 803. In the STM time slot, meanwhile, the virtual time slot to be fetched is extracted by matching and payload drop 804 and is then stored in the descending voice data memory 805. The STM data stored in the descending voice data memory 805 is included in the new payload by a payload assembly section 806. The fixed length packet obtained by adding the header to such STM data and the fixed length packet stored in the ATM buffer 803 are multiplexed by the multiplexing section 807 and is then transmitted to the small unit 3000. On the other hand, the STM/ATM identifying section 809 of the small interface section 2200 identifies the time slot received from the small unit 3000. The fixed length packet of the ATM time slot is sent to the ATM buffer 810, while the fixed length packet of the STM time slot is divided in unit of the STM time slot in the payload de-assembly section 811 and then stored in the ascending voice data memory 812, respectively. The inserting section 813 inserts the fixed length packet stored in the ATM buffer 810 to the idle ATM time slot of the ring type transmission line by finding such idle time slot. The matching and payload inserting section 814 inserts the voice data stored in the ascending voice data memory 812 to the predetermined virtual time slot and processes the voice data depending on the STM time slot number ID and payload number. The fixed length packet to be transmitted to the ring type transmission line is once stored in an out-cell buffer 815 and thereafter transmitted to the ring type transmission line 2100.

In the large interface 2300, the fixed length packet flowing into the ring type transmission line 2100 is once stored in an in-buffer 816. The match drop section 817 extracts the fixed length packet having the VPI/VCI to be fetched depending on the setting information of the ATM time slot to store it to the ATM buffer 818. On the other hand, the matching and payload drop 819 extracts the fixed length packet having the virtual time slot to be fetched depending on the setting information of the STM time slot and stores it to the ascending voice data memory 820. The payload assembly section 821 processes the voice data stored in the ascending voice data memory 820 in unit of the virtual time slot to constitute a packet having a new payload by summarizing the voice data to the same medium unit 2000. After each fixed length packet is multiplexed in the multiplexing section 822, VPC/VCI in the input side of the large unit 1000 directed to the medium unit 2000 as the destination is provided in the header converting section 823 to the fixed length packet to create the ATM cell for the transmission. On the other hand, the ATM cell received from the large unit 1000 is converted to the packet by the packet creating section 824. The STM/ATM identifying section 825 stores the fixed length packet to the ATM time slot in the ATM buffer 825 and deassembles the fixed length packet to the STM time slot in unit of each virtual time slot by the payload deassembling section 827. The inserting section 828 extracts the fixed length packet from the ATM buffer 826 and inserts it into the idle ATM time slot. The match and inserting section 829 inserts the voice data from the payload deassembling section 827 to the virtual time slot in the form of the transmission line depending on the setting information. The fixed length packet is multiplexed in the multiplexing section 830 and once stored in the out-buffer 841 and finally transmitted.

[4] Explanation of Large Unit

Figure 27:
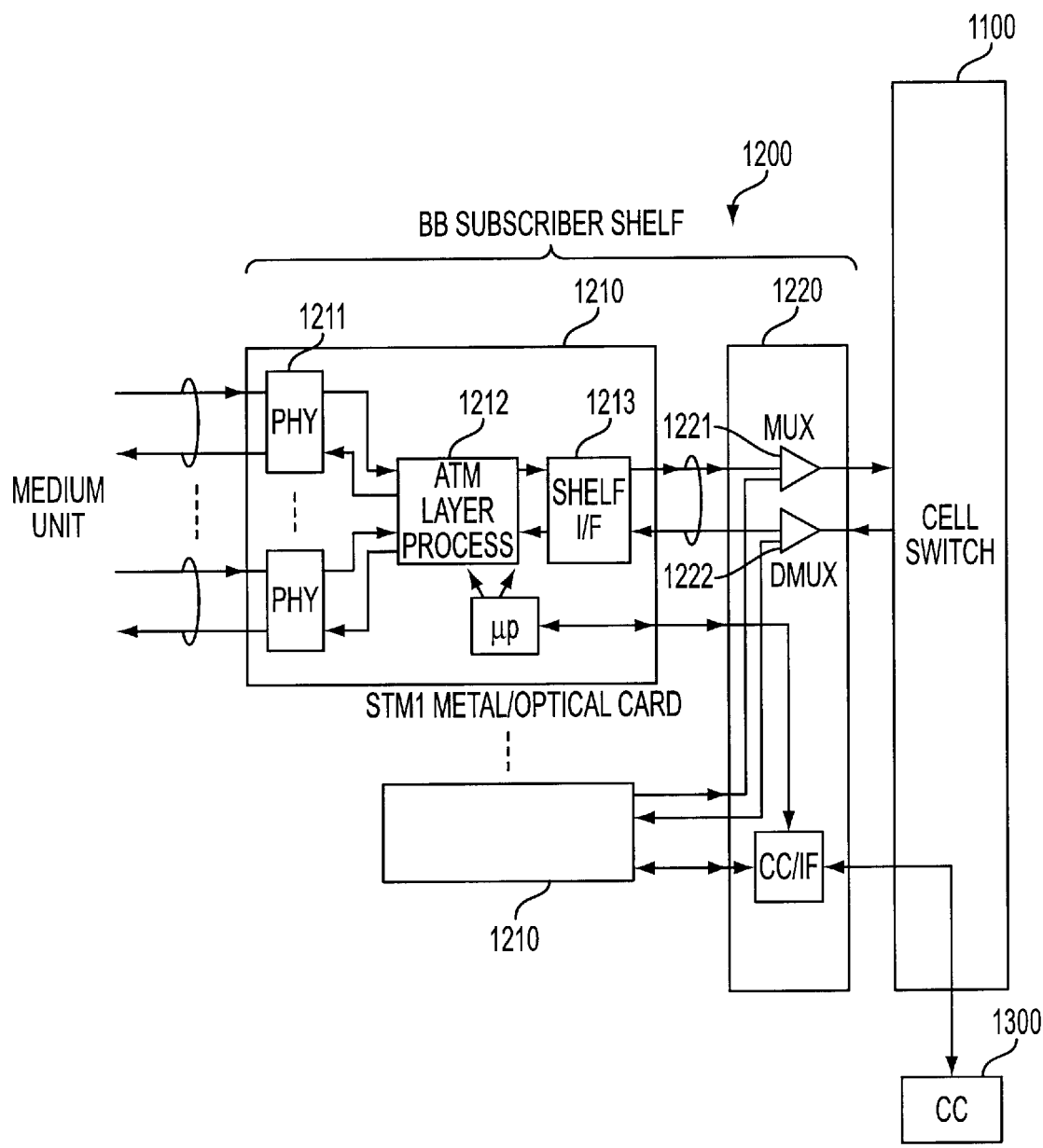
FIG. 27 is a block diagram showing a structure of a large unit.

Next, the large unit 1000 will be explained. FIG. 27 is a diagram showing a structure of a large unit which may be formed of an ordinary ATM exchange.

A large unit is composed of a cell switch 1100, a plurality of broad band subscriber shelf 1200 and a central control unit 1300. The broad band subscriber shelf 1200 is composed of an STM1 interface card 1210 and a shelf common section 1220. The ATM cell from the medium unit is received by a physical interface section 1211 of the STM interface card 1210 and is then sent, after the process by the ATM layer processing section 1212, to the shelf common section 1220 of the subsequent stage via the shelf interface section 1213. The shelf common section 1220 transmits the ATM cell to the sell switch 1100 in the subsequent stage after the multiplexing process of the ATM cell from the other STM1 interface card 1210. The cell output from the cell switch 1100 is distributed to each STM1 interface card 1210 by a separating section 1222 and is then transmitted to the medium unit 2000 via the STM1 interface card 1210.

As explained above, the cell loading the STM data is also processed like one ATM cell in he large unit.

[5] STM Data Exchange Process

Figure 28:
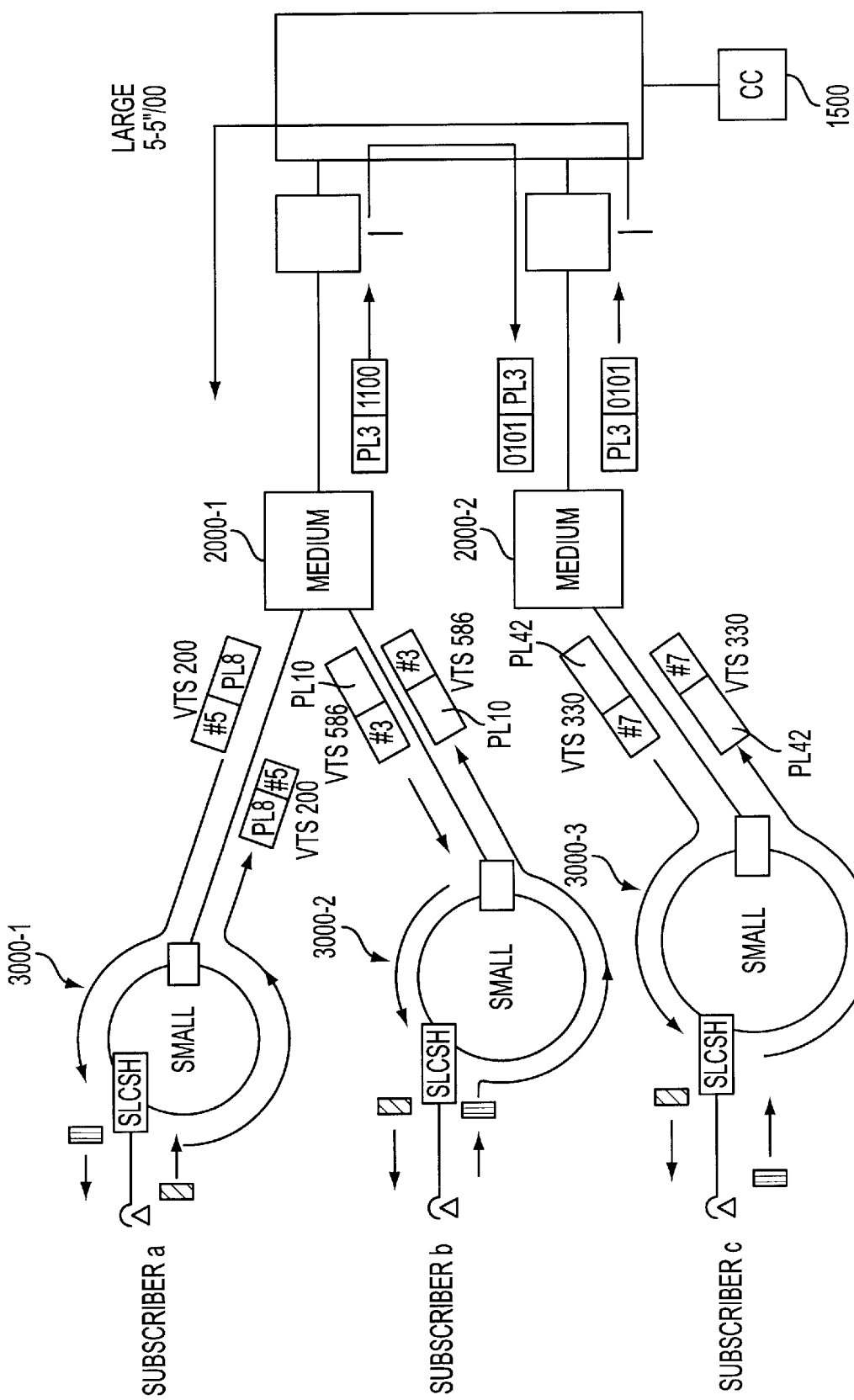
FIG. 28 is a diagram (No. 1) for explaining STM data transmission in the present invention.
Figure 29:
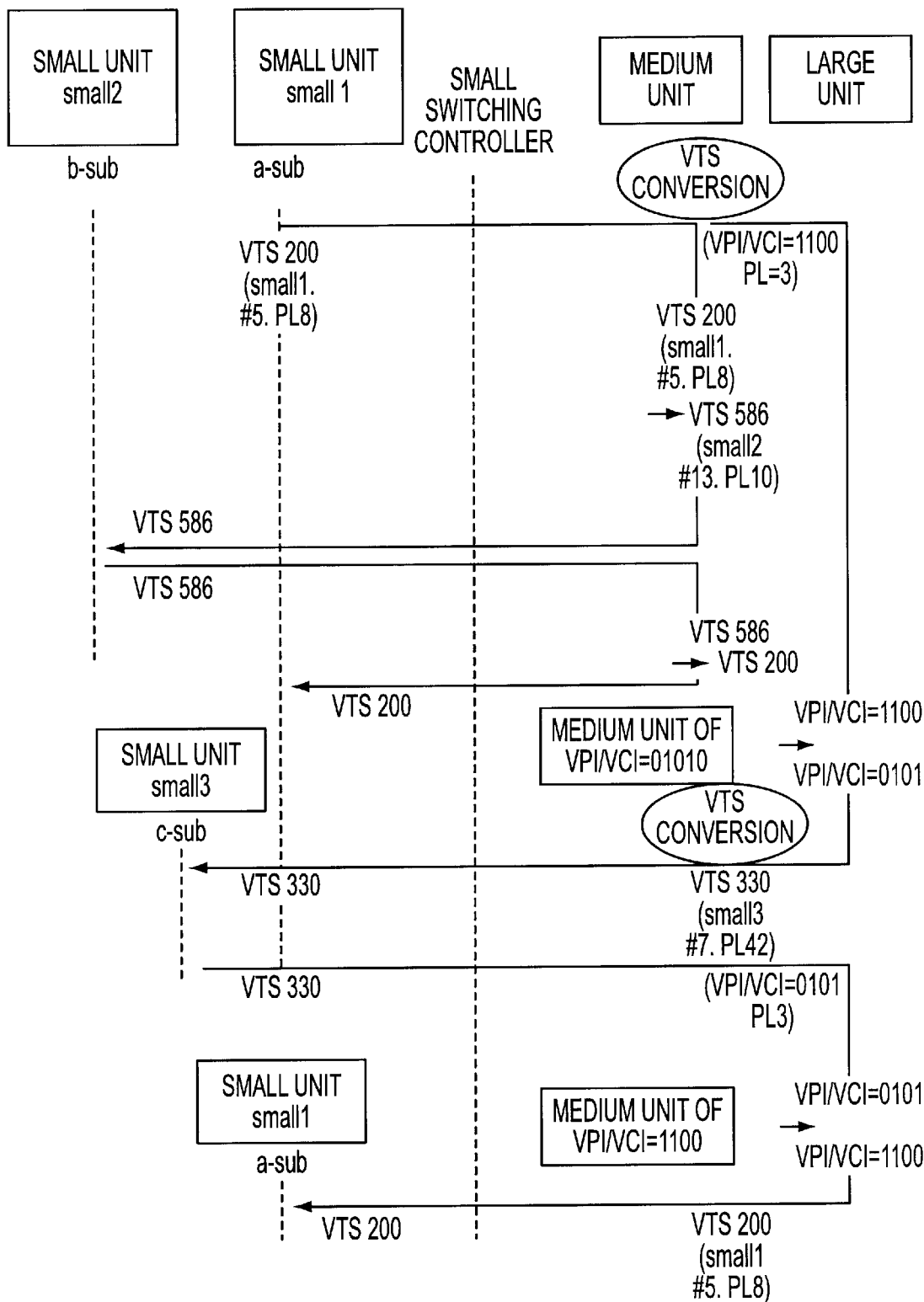
FIG. 29 is a diagram (No. 2) for explaining STM data transmission in the present invention.

FIG. 28 and FIG. 29 are diagrams for explaining transmission of the STM data in the present invention. The exchange shown in FIG. 28 is constituted by a large unit 1000, medium units 2000-1 to 2000-2 connected to this large unit and small units 3000-1 to 3000-3.

1) Communication in the Same Medium Unit

The communication between the subscriber a connected to the small unit 3000-1 and the subscriber b connected to the small unit 3000-2 will be explained. At the time of starting the communication, the virtual time slots VTS200, VTS586 are assigned by the central control 1500 and the virtual time slot VTS200 is set for the subscriber a in SLCSH of the small unit 3000-1, while the virtual time slot VTS586 to the subscriber b in SLCSH of the small unit 3000-2. Moreover, the converting information of the virtual time slots VTS200 and VTS586 is set to the medium unit 2000-1. First, SLCSH of the small unit 3000-1 stores, depending on the setting information explained above, the voice data from the subscriber a to the payload-position of the fixed length packet of the STM time slot corresponding to the virtual time slot VTS200, for example, the 8th octet (PL8) (48×8 packets+8) of the payload of the fixed length packet of the STM time slot number (TSID5) This STM time slot is transmitted up to the medium unit 2000-1 via the ring type transmission line for the exchange of the virtual time slot VTS. The medium unit 2000-1 stores, depending on the converting information explained above, the voice data of the STM time slot corresponding to the virtual time slot VTS 586 to the payload position of the STM time slot corresponding to the virtual time slot VTS 586, for example, to the 10th octet (PL10) (48×12 packets+10) of the payload of the fixed length packet of the STM time slot number 13 (TSID13) in order to send this data to the small unit 3000-2. SLCSH of he small unit 3000-2 fetches the voice data of the virtual time slot VTS 586 from the ring type transmission line depending on the setting information and then transmits this voice data to the subscriber b. On the other hand, the voice data from the subscriber b is first transmitted, as explained above, to the medium unit 2000-1 with the virtual time slot VTS586 and is then exchanged to the virtual time slot VTS200 in the medium unit 2000-1 and thereafter it is sent to the subscriber a.

2) Communication in Different Medium Units

Next, communication between the subscriber a connected to the small unit 3000-1 and the subscriber c connected to the small unit 3000-3 will be explained. Control section 1500 assigns, at the time of starting the communication, the virtual time slots VTS200 and VTS330 for the communication between the subscribers a and c. Moreover, the control section 1500 sets the virtual time slot VTS200 to the subscriber a in SLCSH of the small unit 3000-1 and the virtual time slot VTS330 to the subscriber c in SLCSH of the small unit 3000-3. The control section 1500 also sets, for the communication to the subscriber c from the subscriber a, the converting information, in the medium unit 2000-1, which indicates that the voice data of the virtual time slot VTS200 is stored in the 2nd octet of the payload of the ATM time slot having the header (input side VPI/VCI=1100) directed to the medium unit 2000-2. The control section 1500 also sets, to the medium unit 2000-2, the 3 converting information which indicates that the data stored in the third octet of the payload of the ATM time slot having the header of VPI/VCI=01001 is then stored in the payload position of the STM time slot corresponding to the virtual time slot VTS330, for example, to the 42nd octet (PL42) of the payload of the time slot of the STM time slot number 7 (TSID7) [48×6 packets+42]. Moreover, the control section 1500 also sets, for the communication from the subscriber c to the subscriber a, the converting information, in the medium unit 2000-2, which indicates that the voice data of the virtual time slot VTS330 is stored in the third octet of the payload of the ATM time slot having the header (input side VPI/VCI=0101) directed to the medium unit 2000-2. Moreover, the control section 1500 sets, in the medium unit 2000-1, the converting information indicating that the data stored in the third octet of the payload of the ATM time slot having the header of VPI/VCI=1100 is then stored to the payload position of the STM time slot corresponding to the virtual time slot VTS200, for example, to the eighth octet (PL8) of the payload of the time slot of the STM time slot number 5 (TSID5). Moreover, the control section 1500 sets the information to convert the input side VPI/VCI=1100 to the output side VPI/VCI=0101 and tag information to the broad band subscriber shelf of the large unit 100 accommodating the medium unit 2000-1 and also sets the information to convert the input side VPI/VCI= 0101 to the output side VPI/VCI=1100 and tag information to the broad band subscriber shelf of the large unit 1000 accommodating the medium unit 2000-2.

First, SLCSH of the small unit 3000-1 stores, depending on the setting information, the voice data from the subscriber a to the payload position of the STM time slot corresponding to the virtual time slot VTS200, for example, to the eighth octet (PL8) of the payload of the time slot of the STM time slot number 5 (TSID5). This STM time slot is transmitted to the medium unit 2000-1 via the ring type transmission line. The medium unit 2000-1 stores, depending on the setting information, the voice data of the virtual time slot VTS200 to the third octet (PL3) of the payload of the ATM cell (having the header, input side VPI/VCI=1100) directed to the medium unit 2000-2 to transmit this voice data to the large unit 1000. The broad band subscriber shelf of the large unit 1000 converts the header of input side VPI/VCI=1100 to the header of the output side VPI/VCI=0101 depending on the preset converting information and also adds a tag directed to the medium unit 2000-1. Upon reception of the ATM cell, the medium unit 2000-2 stores, depending on the setting information, the voice data of the third octet of the payload to the payload position of the STM time slot corresponding to the virtual time slot VTS330, for example, to the 42nd octet (PL42) of the payload of the time slot of the STM time slot number 7 (TSID7) and then transmits this voice data to the small unit 3000-3. SLCSH of the small unit 3000-3 fetches the voice data of the virtual time slot VTS330 from the ring type transmission line and then transmits it to the subscriber c. On the other hand, the voice data from the subscriber c is once transmitted by the virtual time slot VTS 330 as explained above up to the medium unit 2000-2 and it is then stored, in the medium unit 2000-2, to the third octet (PL3) of the payload of the ATM cell (having the input side VPI/VCI=0101 as the header) directed to the medium unit 2000-1 and thereafter it is sent to the large unit 1000. The broad band subscriber shelf of the large unit 1000 converts the header, depending on the preset converting information, the input side VPI/VCI=0101 to the output side VPI/VCI= 1100 and also adds the tag directed to the medium unit 2000-1. The medium unit 2000-1 extracts the voice data from the ATM cell received and processes for exchange to the virtual time slot VTS 200 and then sends this voice data to the small unit 3000-1. The small unit 3000-1 extracts the voice data from the virtual time slot VTS200 depending on the setting information and transmits this voice data to the subscriber a.

As explained above, in the communication between different medium units, the predetermined position of the payload of the cell No. determined when communication is started is used fixedly until termination of the communication. In this system, the switching for every STM data may be eliminated in the large unit to alleviate the processing load and it is very effective to suppress delay of voice data because data of a call is not crammed in one cell.

However, calls are terminated at random and one octet of the payload which has been used by the call terminated becomes idle. While the calls are sequentially terminated, application rate of the payloads is lowered. Moreover, since the hunted cell is never released until all calls in the payload are terminated, if one call, for example, in the payload is held for a long period of time, the ATM cell is held for a long period for such call. As explained, if the payload which has becomes the idle payload due to termination of call is left, the application efficiency of payload is lowered generating a problem that an influence is given on GOS (Grade of Service) of the system. Meanwhile, if the accommodation location of the calls in the payload is changed frequently for recycle use of the idle payload, amount of process increases resulting in a problem on the processing capability.

a) Re-arrangement System Using Double Surface Mapping Table

Figure 30:
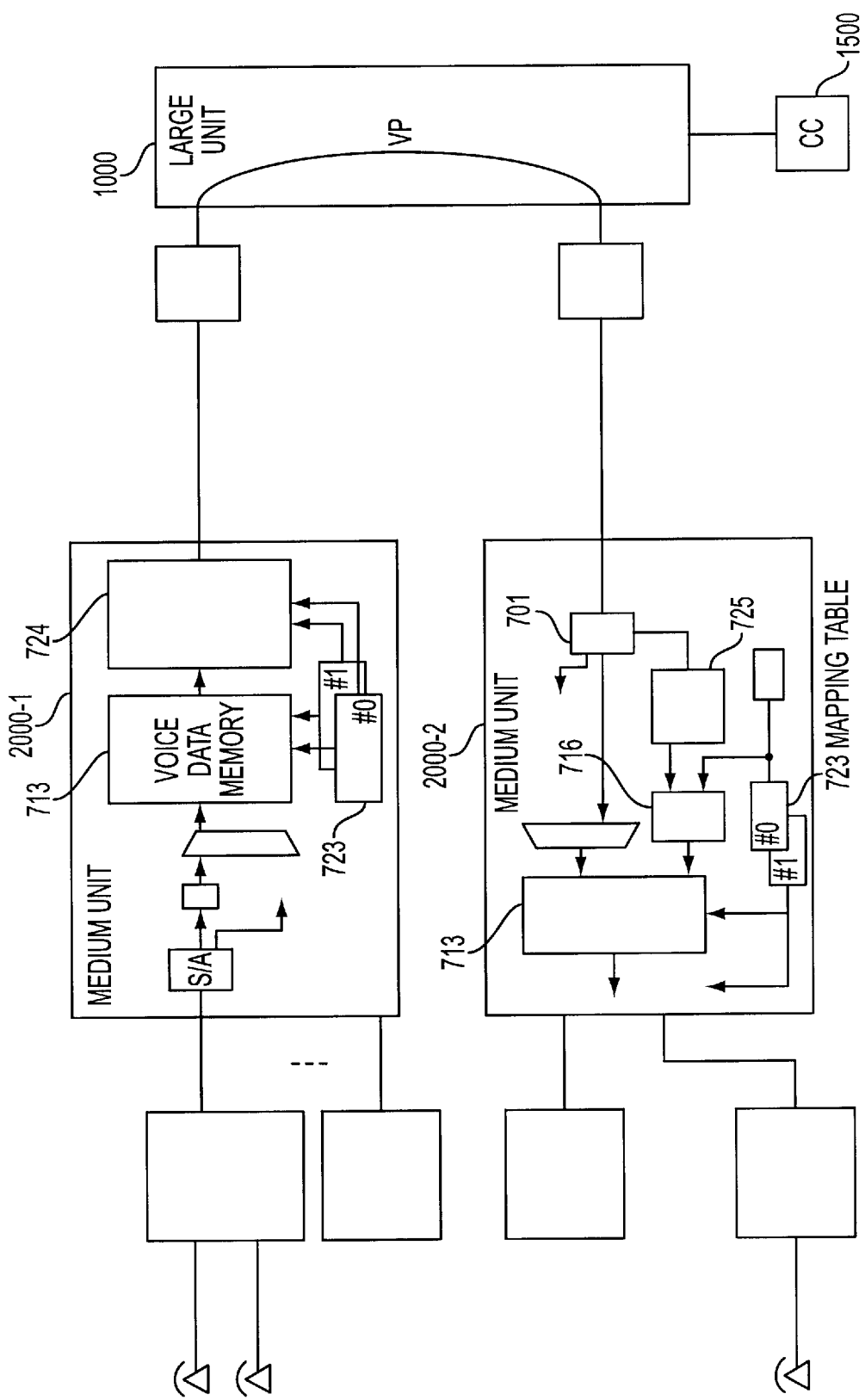
FIG. 30 is a block diagram showing an apparatus structure example in the first embodiment (re-arrangement system using a mapping table of the double surface structure)

FIG. 30 shows an example of structure of apparatus in the first embodiment. The medium units 2000-1, 2000-2 have the structure similar to that of FIG. 18. FIG. 30 shows only the main apparatuses. Namely, the medium unit 2000-1 of the originating side comprises at least a voice data memory 713, a mapping table 723 and a payload assembly section 724. The medium unit 2000-2 in the terminating side comprises at least an S/A sel 701, a cell No. mapping table 725, a write address generating section 716, a voice data memory 713 and a mapping table 723.

Figure 31:
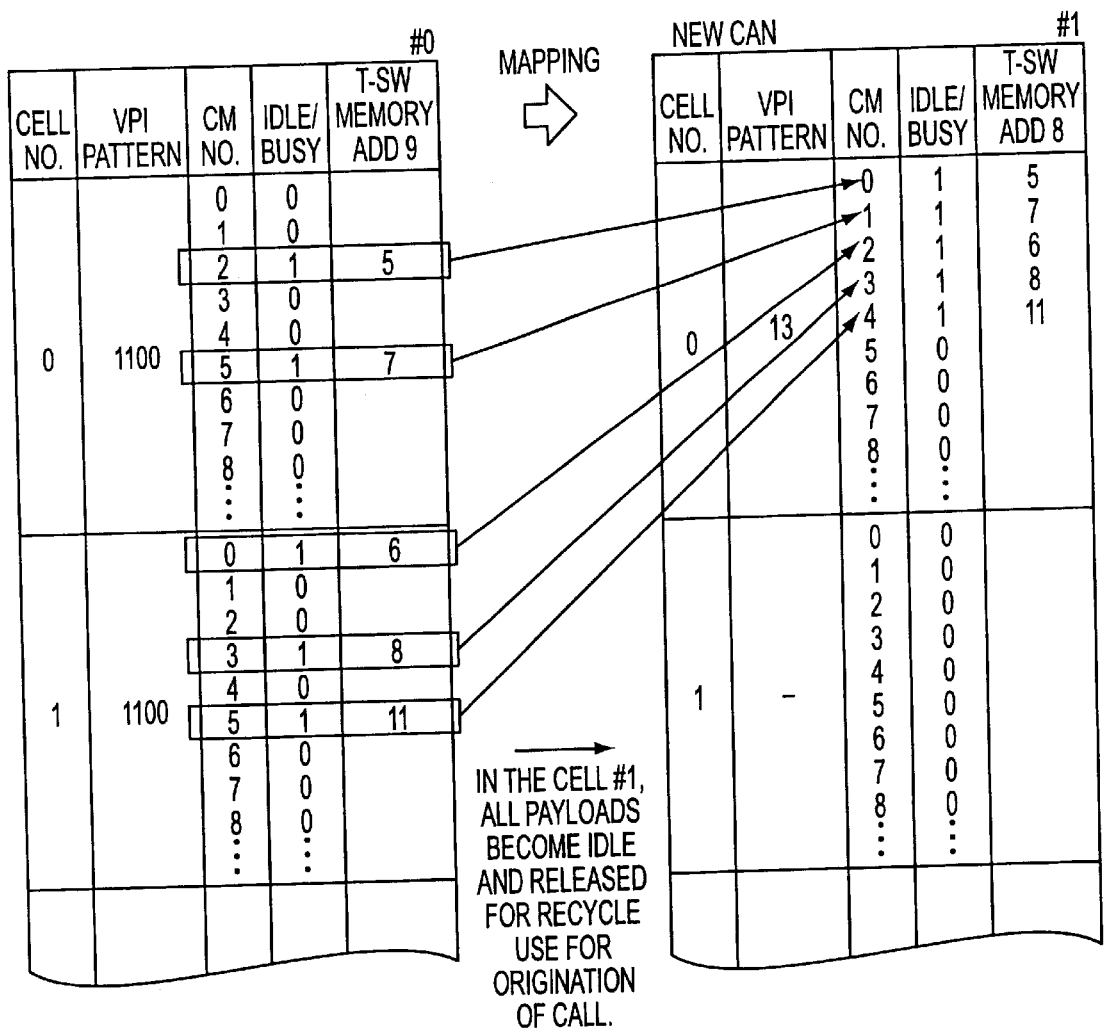
FIG. 31 is a diagram showing a mapping tabs of the medium unit.

The mapping table 723 is provided with double surfaces (#0, #1). For example, the mapping table 723 of the medium unit 2000-1 stores, as shown in FIG. 31, cell No., PL No., idle/busy information, voice data memory address and VPI information and the ATM cell is assembled on the basis of these pieces of information. The idle/busy information is "1" when the STM data is assigned to the octet of payload or is "0" when the STM data is not assigned.

Here, it is assumed that data transmission and reception is executed using the mapping table 723#0 between the medium unit 2000-1 and medium unit 2000-2. In this case, the medium unit 2000-1 in the originating side and the medium unit 2000-2 in the terminating side do not refer to the mapping table 723#1. In the medium unit 2000-1 in the originating side, the mapping table 723#0 is periodically watched to judge whether re-arrangement of the cell should be done or not depending on the idle/busy information.

Figure 32:
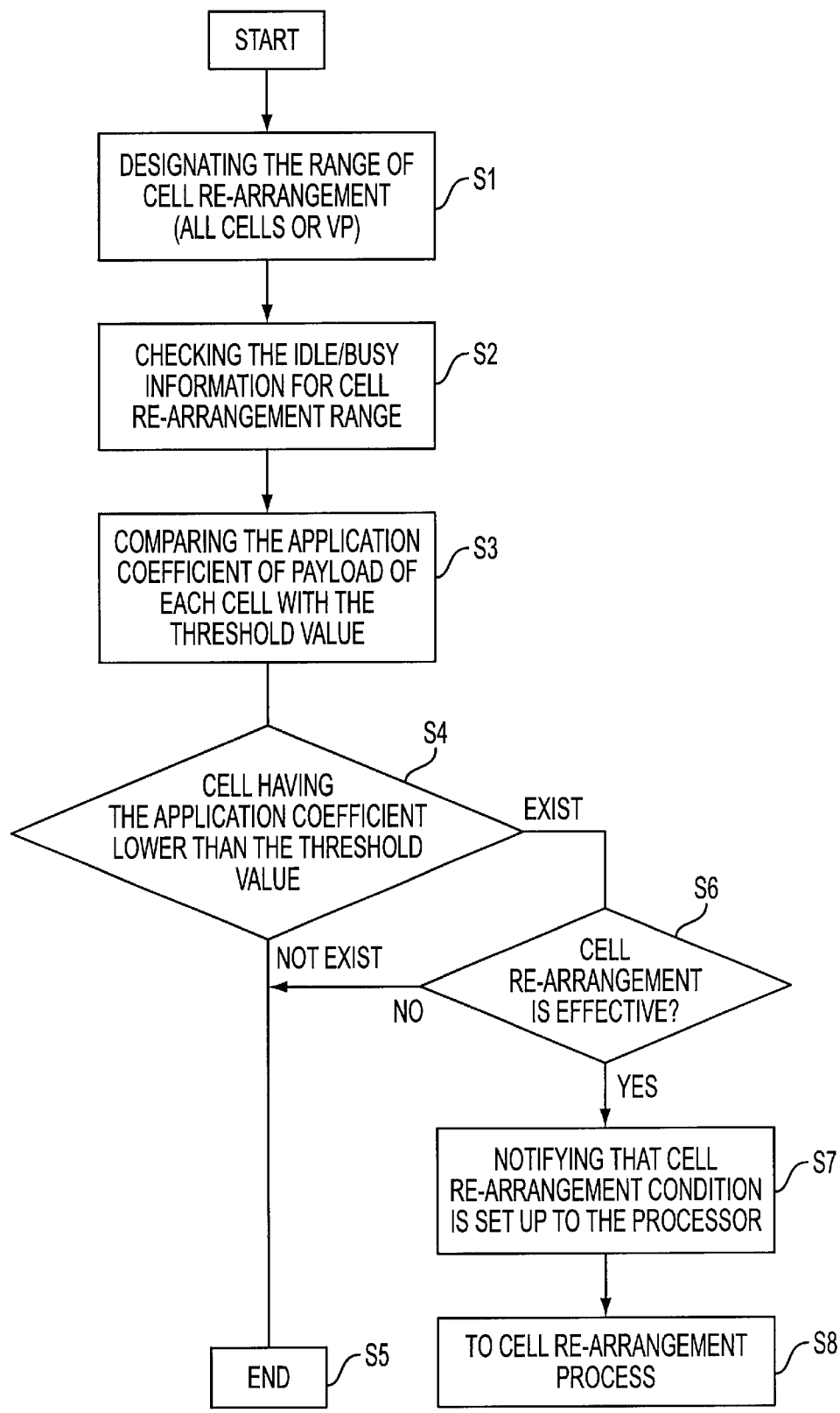
FIG. 32 is a flowchart for judging cell re-arrangement condition.

FIG. 32 shows a cell re-arrangement condition judging process flow. First, the range of the re-arrangement of cell is designated (step S1). The range of cell re-arrangement may be set for all cells in one period or the object of re-arrangement in one period may also be restricted in unit of VP or in unit of a plurality of cells. In the case of restricting the range of cell re-arrangement, the range is changed for each period and all ranges may be searched by checking the period whether it is the same period or not.

Next, for the range of cell re-arrangement, the idle/busy information on the mapping table in the originating side is checked (step S2) to compare the application coefficient of payload of each cell (=Number of calls/48 octets) with the threshold value (step S3). If there is no cell having the application coefficient lower than the threshold value (NO in the step S4), the cell re-arrangement condition judging process flow comes to the end here (step S5). Meanwhile, there is a cell having the application coefficient lower than the threshold value (Exist in the step S4), it is judged whether cell re-arrangement is effective or not (step S6). This judgment is necessary for preventing a problem that when a new call is originated after re-arrangement of cell, a new cell will require the re-arrangement and thereby such re-arrangement is repeated many times.

Figure 33:
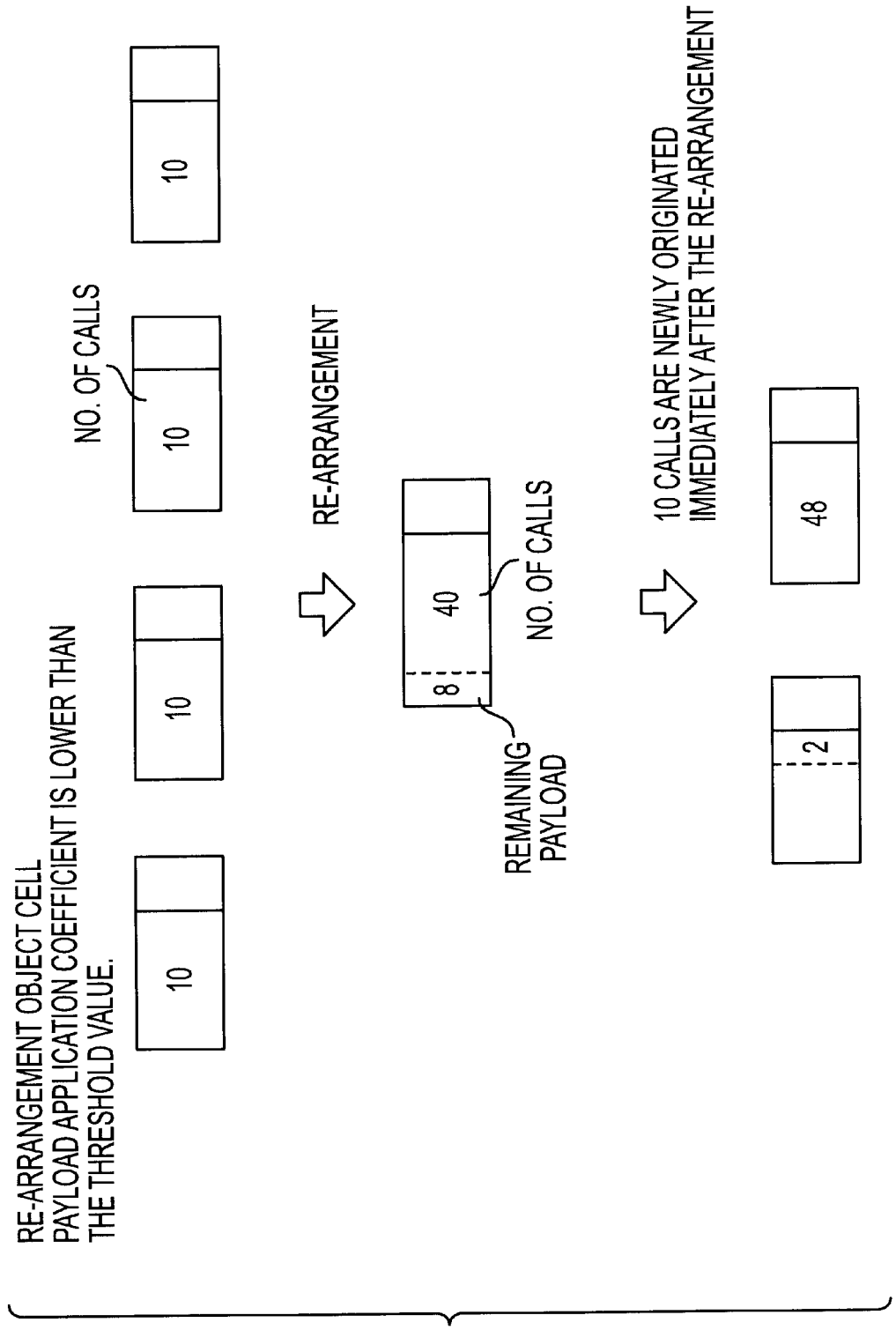
FIG. 33 is a diagram showing an example where the cell re-arrangement is judged invalid.

FIG. 33 shows an example for the case where the cell re-arrangement is judged invalid. Namely, if re-arrangement is executed when application coefficient of payload of four cells as the re-arrangement object cells is lower than the threshold value (for example, number of calls is 10), 40 calls may be accommodated in one cell but if 10 calls are newly generated immediately after the re-arrangement, some cells will require further re-arrangement.

Figure 34:
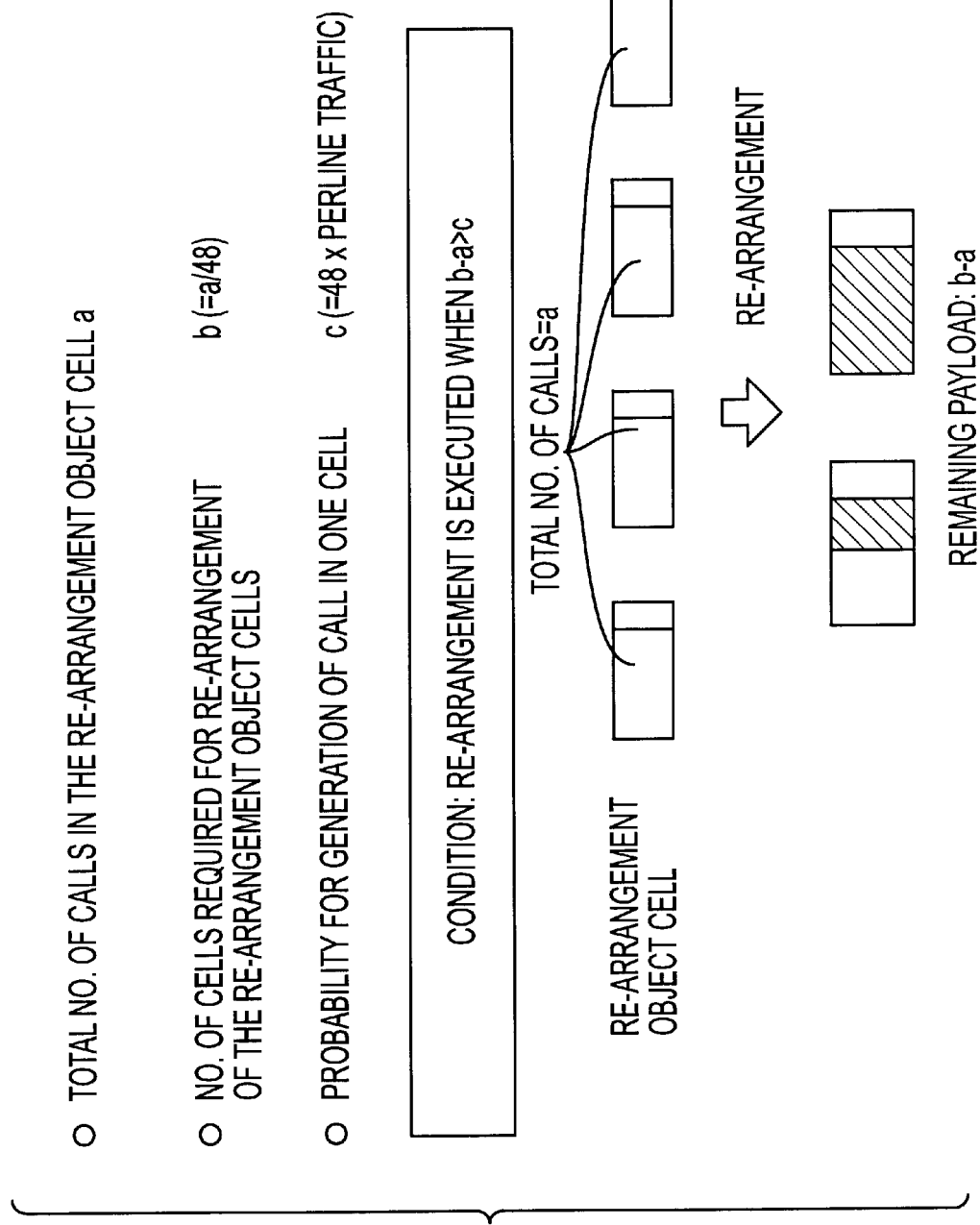
FIG. 34 is a diagram showing an example of the condition for judging validity of cell re-arrangement.

FIG. 34 shows an example of the condition for judging validity of the re-arrangement of cells. Namely, when a total number of calls in the re-arrangement object cell is defined as a, the number of cells required to re-arrange the re-arrangement object cells as b (=a/48) and probability of generation of call in one cell as c (=48×traffics per line), the re-arrangement is executed when b−a>c. According to this condition, only when the payload of the cells after re-arrangement has the idle area for accommodating new calls (probability of generation of a call in one cell=48 octets×traffic per line), the re-arrangement process is executed. When the re-arrangement condition is established in the medium unit A in the originating side, it is notified to the processor from the originating side (step S7).

Figure 35:
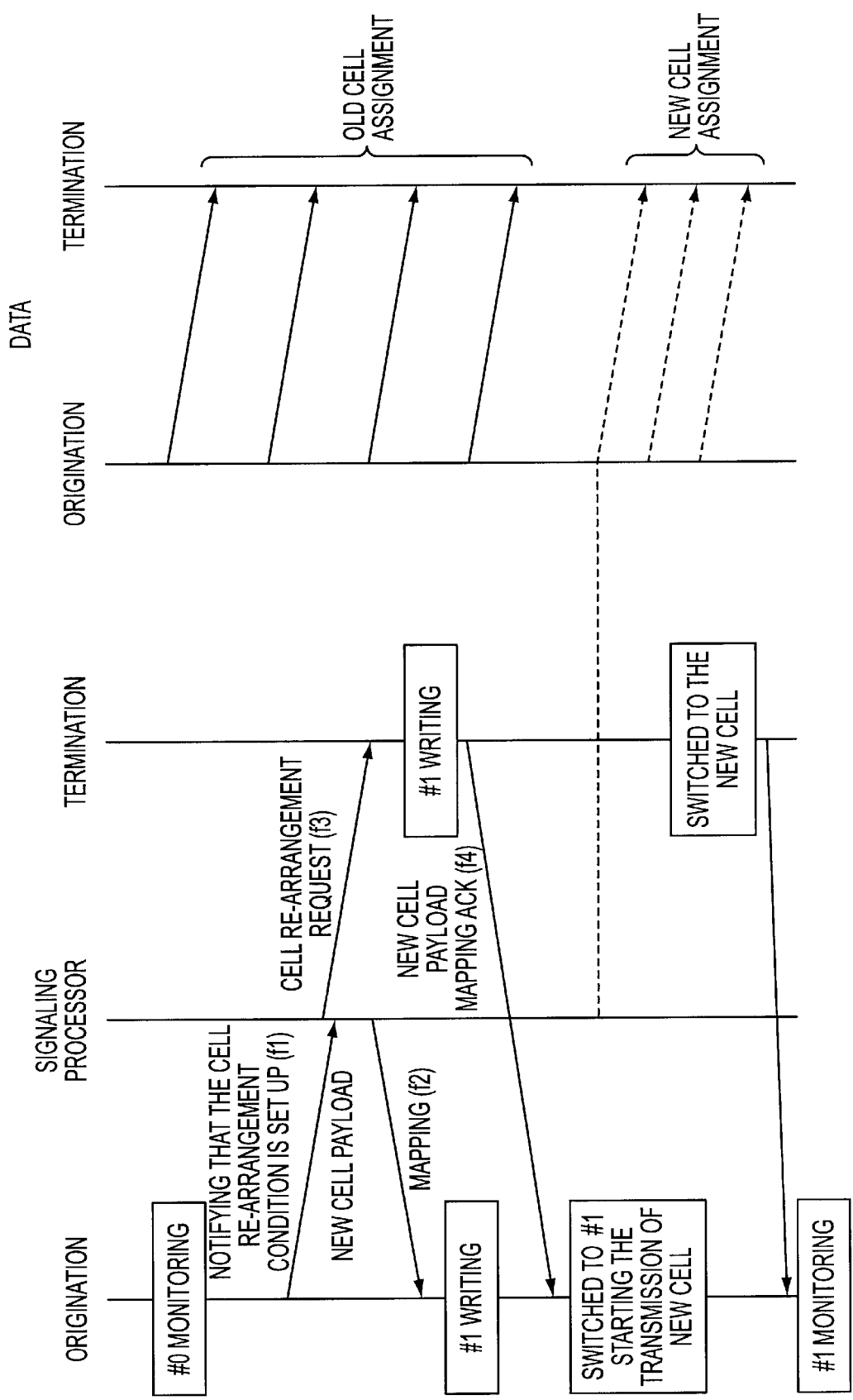
FIG. 35 is a diagram showing a signal sequence in the first embodiment.
Figure 36:
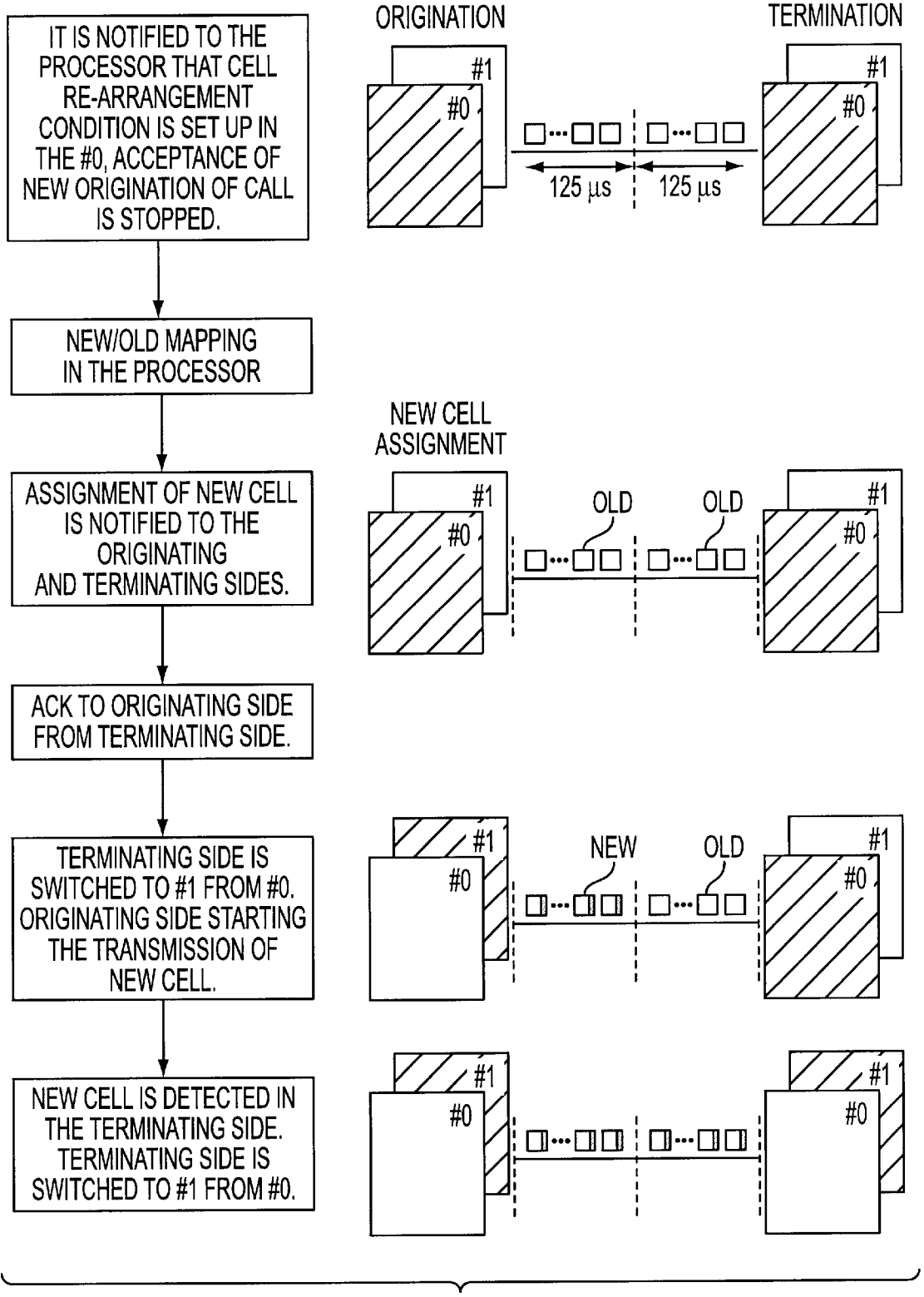
FIG. 36 is a diagram showing an image of processing flow in the first embodiment.

FIG. 35 is a diagram showing the signal sequence in the first embodiment, while FIG. 36 is a diagram showing an image of the process flow.

As shown in FIG. 35, the processor which is notified (f1) the establishment of re-arrangement condition of the cell from the originating side executes the mapping to the old and new cells so that the number of idle payloads is reduced. An example of old and new mappings is shown in FIG. 31. In an example of FIG. 31, the STM data of the calls accommodated in the old cells No. 0 and No. 1 directed to the medium unit 2000-2 is re-arranged to the new cell No. #0. As a result of this re-arrangement, the new cell No. 1 in which all payloads become idle is released from a call and it is then used again for generation of new calls.

The processor notifies (f2), upon completion of re-arrangement of cells, the assignment of new cells to the medium unit 2000-1 in the originating side to designate writing into the mapping table #1. Simultaneously, the processor issues the request (f3) of re-arrangement of cells to the medium unit 2000-2 in the terminating side to designate writing of assignment of new cell to the mapping table #1. Origination of new calls is not accepted until the writing of the assignment of new cells in the originating and terminating sides to the mapping table #1 is completed.

The medium unit 2000-2 in the terminating side notifies, upon completion of writing to the mapping table #1, completion of the re-arrangement of cells to the medium unit 2000-1 in the originating side via the processor (f4). Upon reception of this notice, the medium unit 2000-1 in the originating side changes the mapping table for making reference to the table #1. Simultaneously, transmission of cell in the assignment of new cell and acceptance of generation of new call are started. The payload assembly section 724 gives the identifier indicating the new cell to the header of new cell and then transmits the identifier.

In this case, the old cells are yet exchanged by referring to the mapping table #0 in the medium unit 2000-2 in the terminating side and the information of the newly originated call is written on the mapping table #1. Origination of call while acceptance of newly originated call is temporarily stopped is delayed during connection. Therefore, it is recommended that the re-arrangement of cell is conducted when the number of calls is less than the number of payloads×0.9 to leave the payloads for accommodating the delayed calls after acceptance of newly generated calls is started. An identifier which indicates assignment of new cell is given, by the payload assembly 724, to the header or first octet of the payload of the cell to be transmitted upon assignment of new cell.

Figure 37:
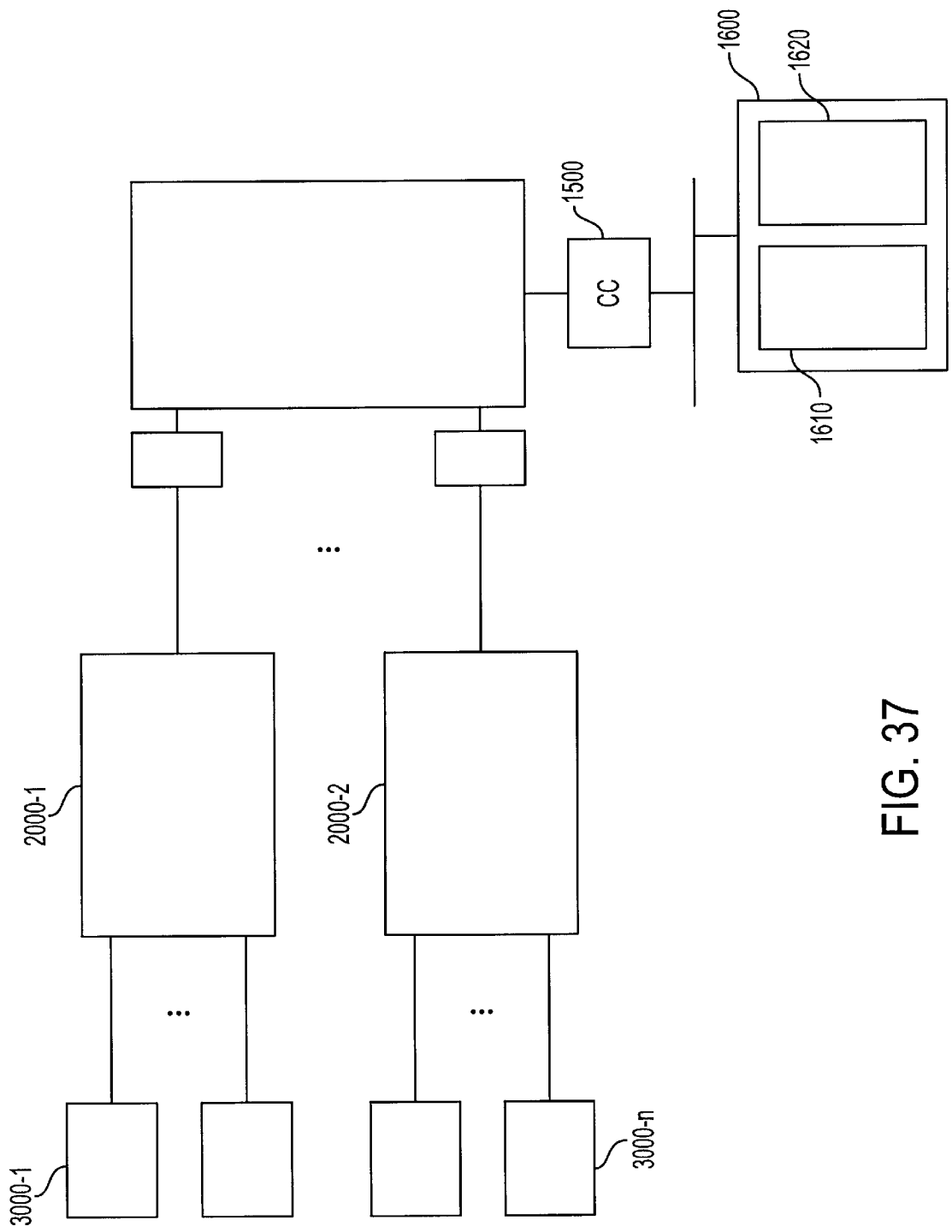
FIG. 37 is a block diagram showing an apparatus structure example in the second embodiment (re-arrangement system using a switching timing difference)

The medium unit 2000-2 in the terminating side conducts the switching operation of the old cells in the mapping table #0 until the cell No. mapping table 725 detects the identifier in the header indicating the new cell. When the cell No. mapping table 725 detects a new cell, the mapping table 723 is changed to #1 from #0 for continuation of the switching operation. The medium unit 2000-2 in the terminating side notifies detection of new cell to the medium unit 2000-1 in the originating side via the processor (f5). The medium unit 2000-1 in the originating side which has received such notice starts to monitor the idle/busy information of the mapping table #1.

b) Re-arrangement System Using Switching Timing Difference b-1) First Embodiment FIG. 37 is a diagram showing the second embodiment. In this figure, re-arrangement of payload of the ATM cell can be realized by the control section 1500 and MM 1600 of large unit.

FIG. 38 is a diagram showing contents of an ATM cell idle/busy management·transmission destination identifying data 1610. The ATM cell idle/busy management·transmission destination identifying data 1610 is provided for each medium unit. The idle/busy information and transmission destination information are stored for each cell No. When the payloads of ATM cells having a certain cell No. are at least one busy, "1" indicating the busy condition is set as the idle/busy information when the payloads of ATM cells having a certain cell No. are all idle, "0" indicating the idle condition is set as the idle/busy information. As the transmission destination information, the information for identifying each medium unit is set.

FIG. 39 is a diagram showing the contents of the payload idle/busy management data 1620 of the ATM cell. The payload idle/busy management data 1620 of the ATM cell is also provided for each medium unit. The idle/busy information an subscriber information are stored for each payload No. For the payloads used, "1" indicating the busy condition is set as the idle/busy information while for the idle payloads, "0" indicating the idle condition I set as the idle/busy information. As the subscriber information, the information for identifying a subscriber using the relevant payload is set.

Figure 40:
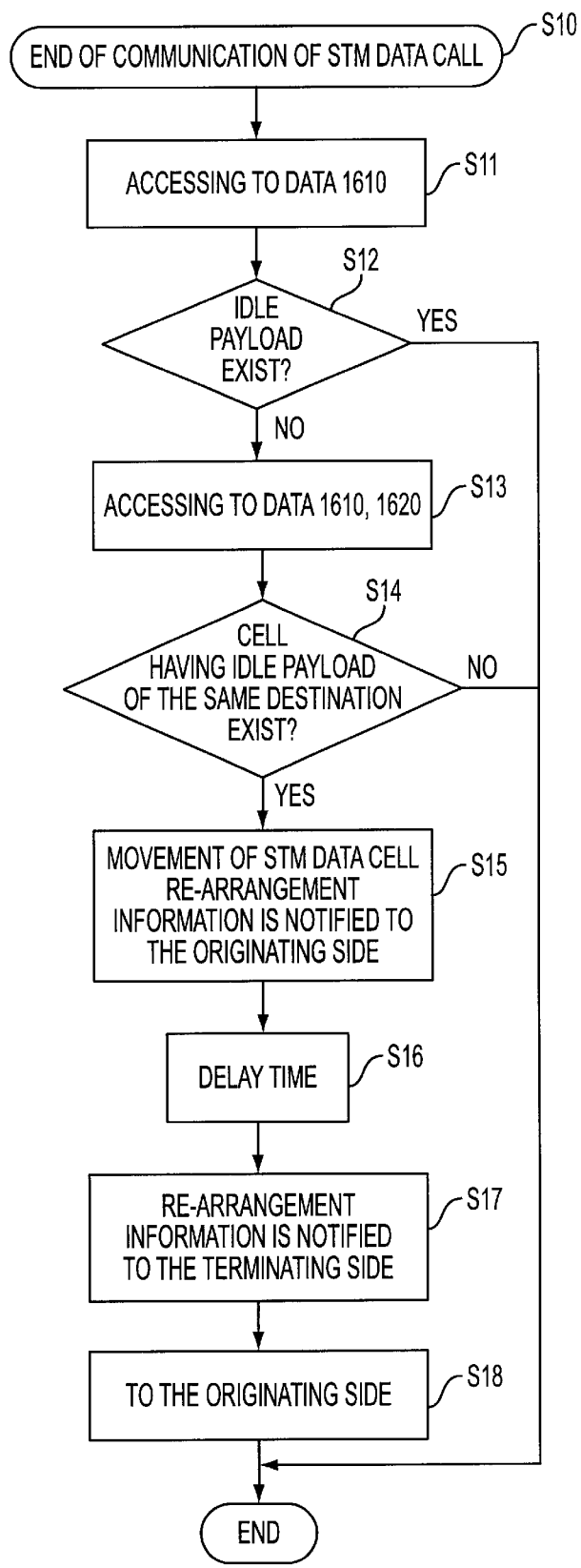
FIG. 40 shows a control flowchart of the re-arrangement function of CC 1500 in the second embodiment.
Figure 41A:
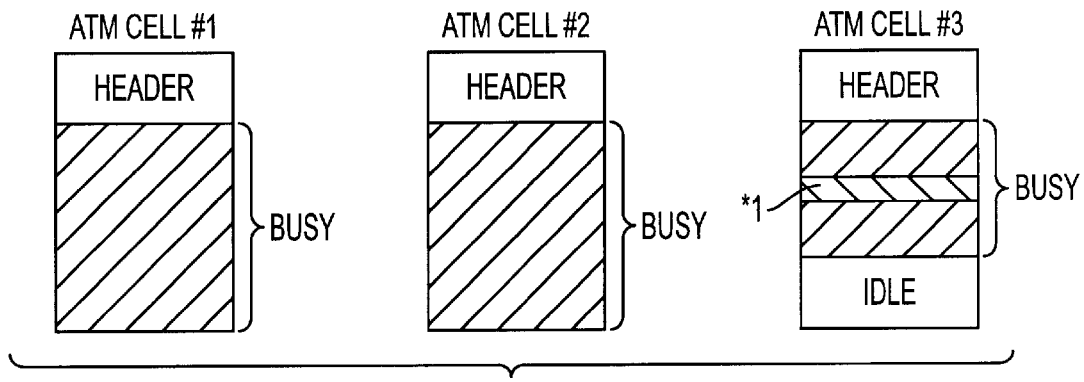
FIGS. 41(a), 41(b), 41(c) show diagrams of the re-arrangement of STM data call.
Figure 41B:
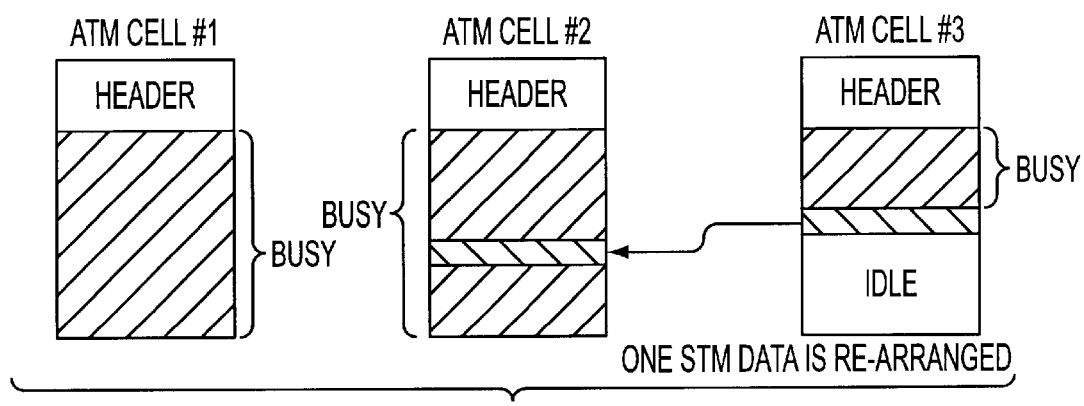
Figure 41C:
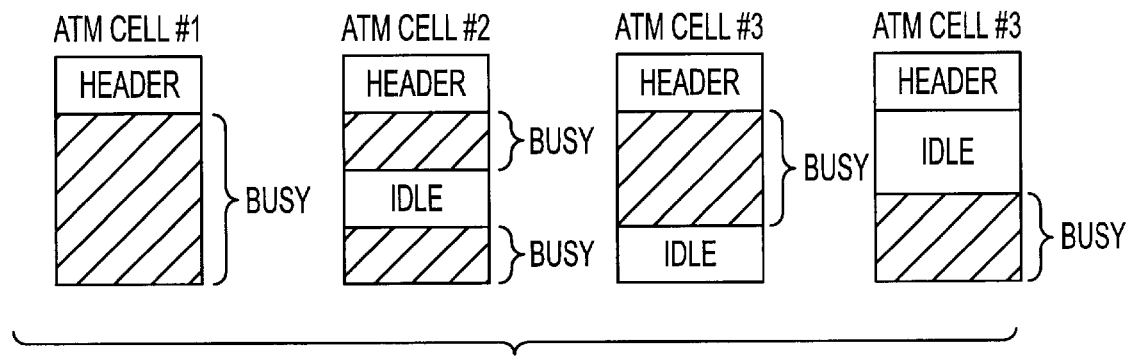

FIG. 40 shows a re-arrangement function control flowchart of the control section 1500 in the second embodiment. FIG. 41 is a diagram showing re-arrangement of the STM data calls.

In regard to FIG. 40, re-arrangement operation will be explained with reference to FIG. 38 to FIG. 41.

The control section 1500 makes access, upon detection of the end of communication of the STM data call (step S10), to the cell idle/busy management data 1620 (step 51) to judge whether there is idle area in the ATM cell loading the call to be terminated (step S12).

If the payloads of the ATM cells No. 1 and No. 2 are all busy and the payload of the ATM cell No. 3 is idle as shown in FIG. 41(*a*), and it is assumed that the call to be terminated is located at the payload of the ATM cell No. 3, following process is executed. Since "1" is set to the cell No. 6 to No. 48 in the cell No. 1 as the idle/busy information of the payload idle/busy management data 1620, it is judged in the step S12 that there is an idle area (Yes in the step S12)and therefore re-arrangement process is not executed.

Meanwhile, if all payloads of the ATM cells No. 1 and No. 2 are all busy and there is an idle payload in the ATM cell No. 3 as shown in FIG. 41(*b*), following process is executed when it is assumed that the call to be terminated is located at the payload of the ATM cell No. 2. Since "1" is set to the cell No. 2 as the idle/busy information of the payload idle/busy management data 1620 and it is judged in the step S12 that there is no idle (No in the step S12), operation skips to the step S13.

In the step S13, access is made to the ATM cell payload idle/busy management data 1620 shown in FIG. 39 to judge whether there is an idle ATM cell having the same destination or not (step S14).

In FIG. 38, the ATM cell of the cell No. 2 and the ATM cell of the cell No. 3 have the same transmission destination. Therefore, in the FIG. 39, it is searched whether there is an idle payload of the ATM cell of the cell No. 3 or not. Since the ATM cell of cell No. 3 has an idle payload, operation goes to the step S15. If the ATM cell of cell No. 3 does not have any idle payload (No in the step S14), re-arrangement is not conducted, Next, the control section 1500 determines to move the STM data call located at the maximum octet of the other ATM cell having the idle payload to the idle payload of the ATM cell where the call terminated has been located and notifies the information about the STM data call to be moved to the medium unit a in the originating side (step S15). In the medium unit in the originating side, the STM data call as the object of movement is set to both ATM cell of cell No. before movement and ATM cell of cell No. after movement until an instruction of the step S19 is issued and is then transmitted to the large unit.

In FIG. 41(*b*), the STM data call is re-arranged to the idle payload of the ATM cell of cell No. 2 from the position of the maximum octet of the ATM cell of the cell No. 3.

Thereafter, a delay time is provided which is enough for the ATM cell to reach the medium unit as the destination via the large unit from the medium unit as the originating unit (step S16).

After the delay time has passed, the control section 1500 notifies, to the medium unit the payload position of the old cell No. and the payload position of the new cell No. (step S17). Thereafter, the medium unit as the terminating unit extracts the new STM data call from the ATM cell of new cell No.

According to FIG. 39, the STM data call located at the third octet of the ATM cell of the cell No. 3 is extracted from the 10th octet of the ATM cell of the cell No. 2.

The control section 1500 instructs the medium unit of the originating side to delete the STM data all having moved from the payload position of the old cell No. (step S18) and completes the re-arrangement process.

b-2) Second Embodiment

In the first embodiment, the re-arrangement of payload has been conducted for each completion of communication of one STM data call, but in the second embodiment, assignment of a plurality of ATM cells being divided is re-arranged periodically or not periodically during the midnight in which the load of exchange is rather lower.

In the second embodiment, unlike the first embodiment, it is naturally unnecessary that the payload of the ATM is used not efficiently at the desired timing of the operation of the exchange. It is because many ATM cells having idle payloads probably exist until the timing in which assignment of a plurality of divided ATM cells is rearranged periodically or not periodically during the midnight in which the load of the exchange is rather lower.

In the first embodiment, only the re-arrangement to another ATM cell from one ATM cell is executed for every termination of the communication of the STM data call, but in the second embodiment, a plurality of ATM cells having idle payload and the same transmission destination exist.

Figure 42:
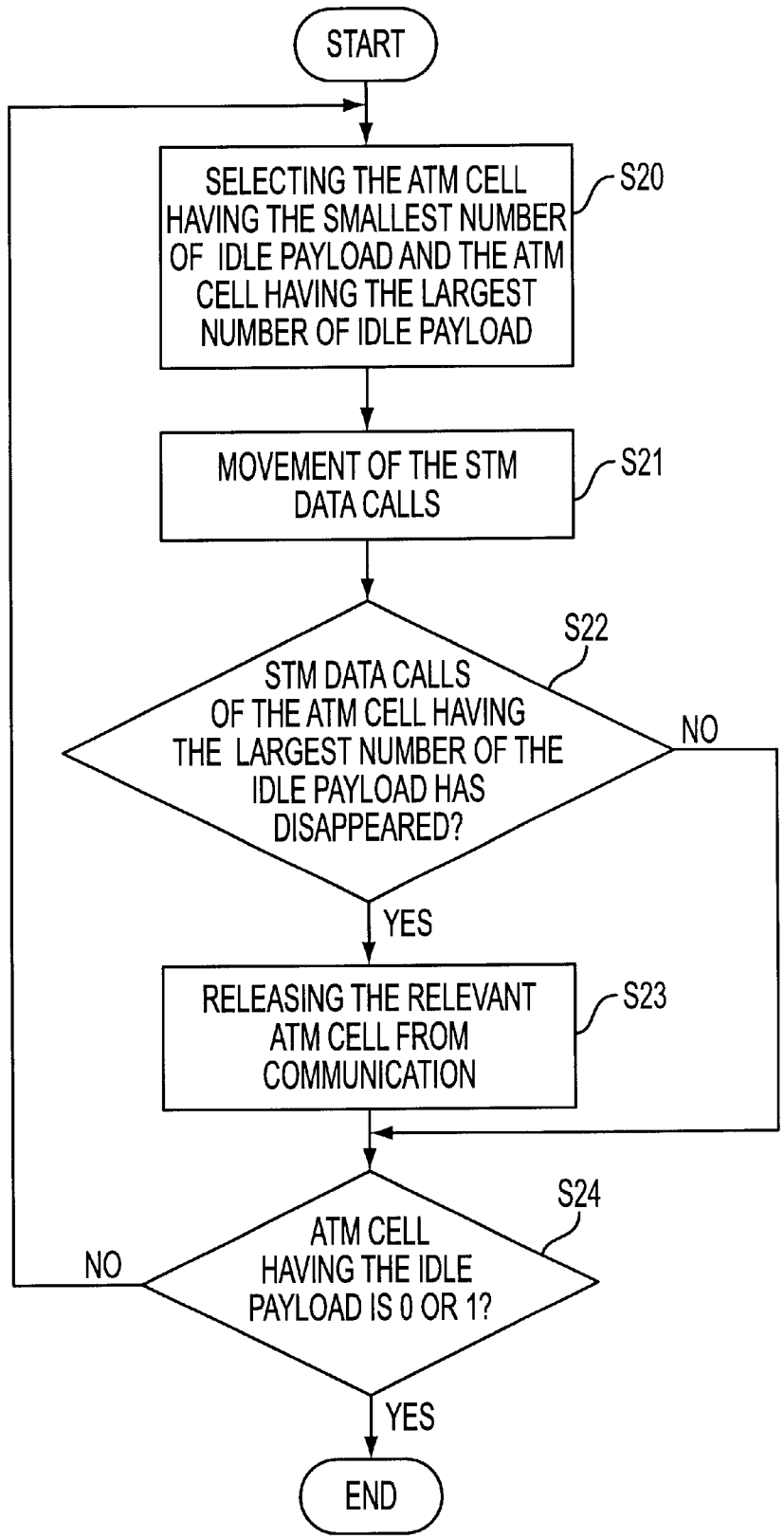
FIG. 42 shows a control flowchart of the re-arrangement function of CC 1500 in the second embodiment.

FIG. 42 shows a control flow of the re-arrangement function of the control section 1500 in the second embodiment. Regarding FIG. 42, the re-arrangement operation will be explained with reference to FIG. 41(*c*).

FIG. 41(*c*) indicates that a plurality of ATM cells having idle payload exist. The control section 1500 executes the re-arrangement of the STM call of payload in the following procedures.

When the re-arrangement process starts, the ATM cell having smallest number of idle payloads and the ATM cell having the largest number of idle payloads are selected (step S20). One of the STM data calls loaded on the ATM cell having the largest number of idle payloads is moved to the position of any idle octet of the payloads of the ATM cell having the smallest number of idle payloads (step S21). In the step S21, since re-arrangement is performed in the same method as the first embodiment where the re-arrangement is conducted to the payload of another ATM cell from the payload of one ATM cell, missing of the STM data call at the time of re-arrangement can be prevented.

Here, it is judged whether the STM data call loaded on the ATM cell having the largest number of idle payloads has been lost or not (step S22). If there is no STM data call, the relevant ATM cell is released from communication (step S23), but if the STM data call still exists, operation goes to the step S24.

It is judged whether there is no ATM cell having an idle payload or only one ATM cell having an idle payload exists (step S24). If there is no ATM cell having an idle payload or only one ATM cell exists, the re-arrangement process is completed but if two or more ATM cells having idle payload exist, operation returns to the step S20 and process is repeated until the ATM cell having the idle payload becomes one or less.

Since the re-arrangement process as explained above is employed, if the ATM cells having a plurality of idle payloads exist, re-arrangement of the payload of the STM data call can be realized even with the simplified control.

[6] Exchange Process of ATM Data

Figure 43:
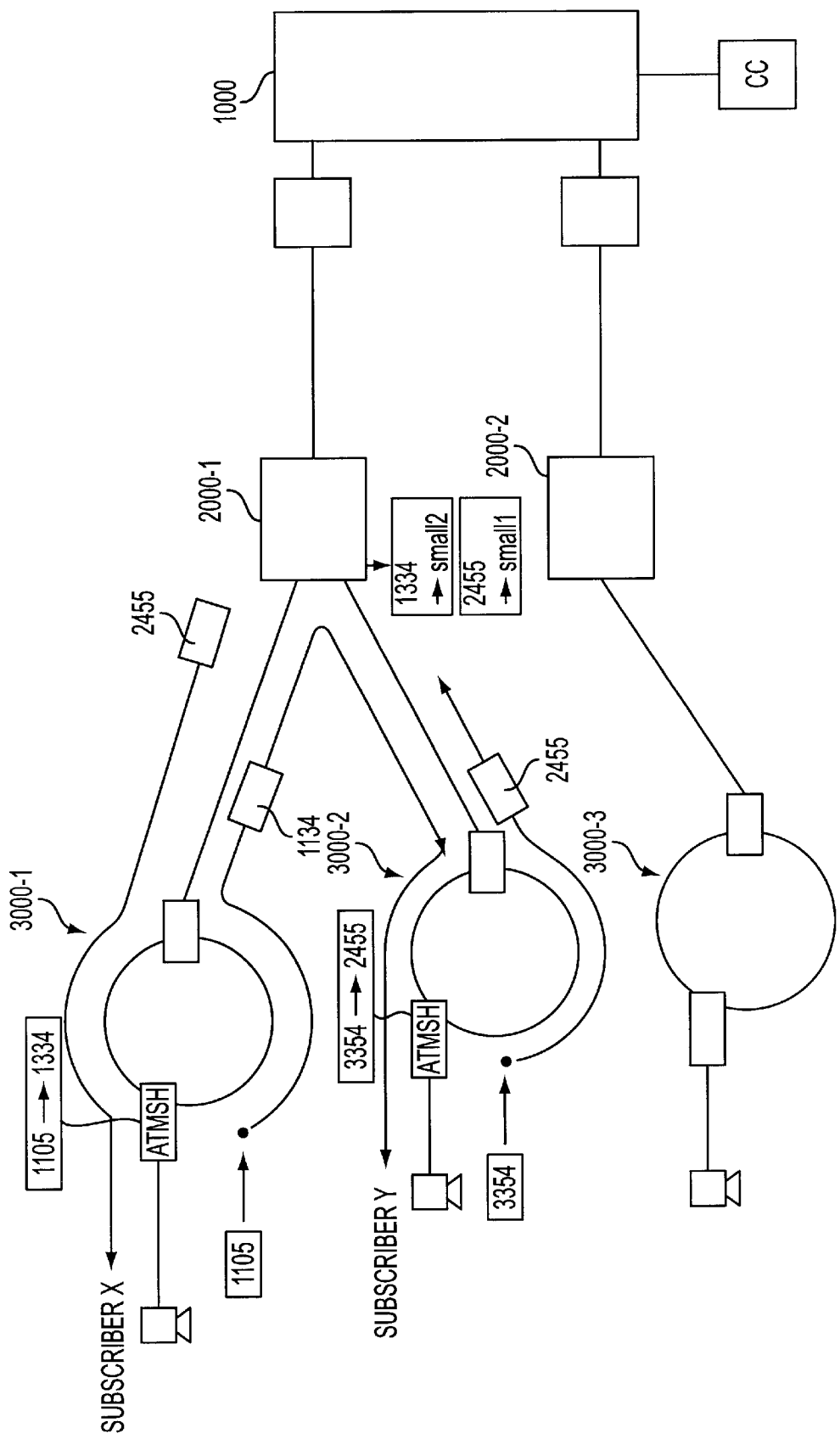
FIG. 43 is a diagram for explaining transmission of the ATM data in the present invention and showing communication between subscribers X and Y.
Figure 44:
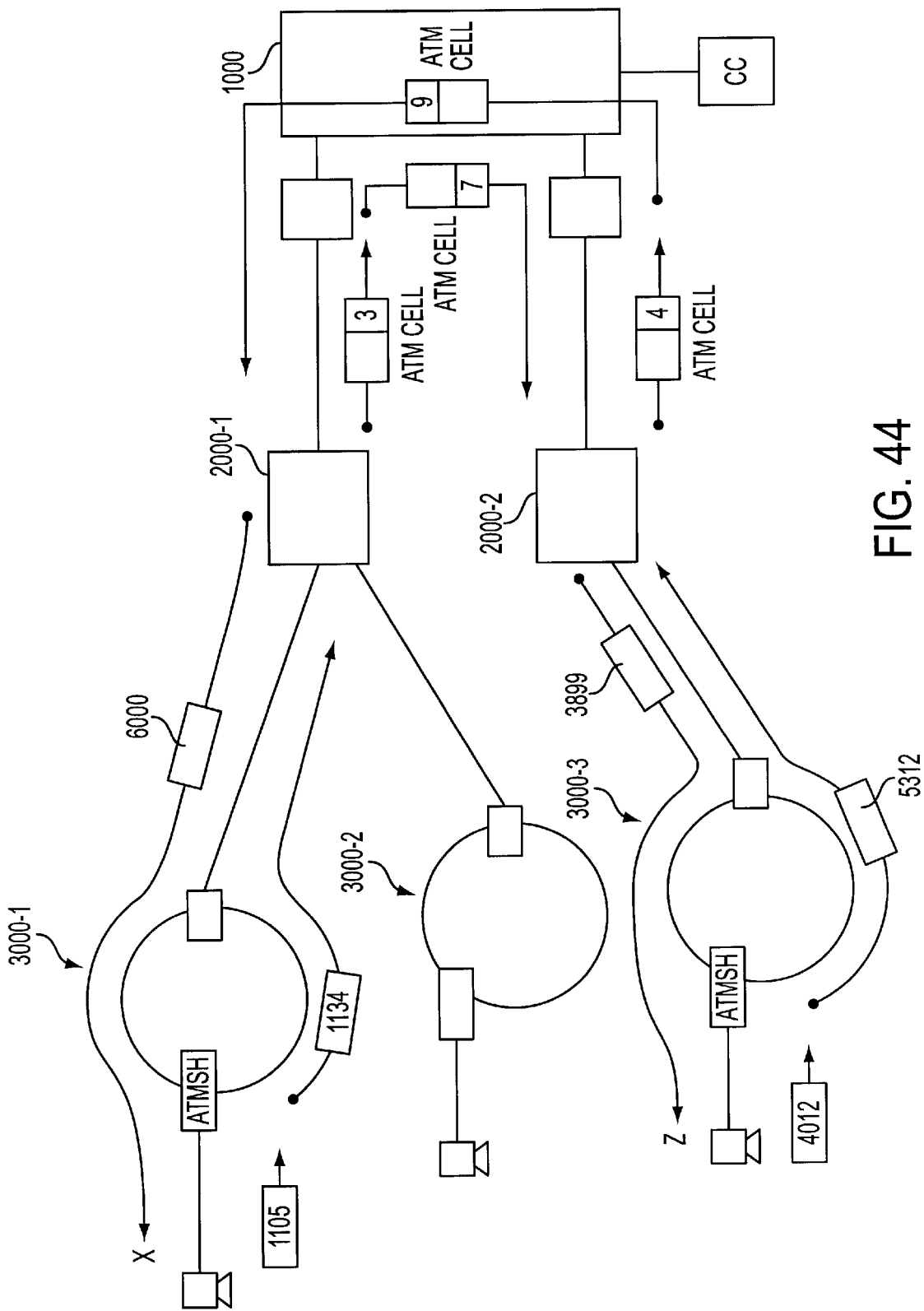
FIG. 44 is a diagram for explaining transmission of ATM data in the present invention and showing communication between subscribers X and Z.

FIG. 43 and FIG. 44 are diagrams for explaining transmission of the ATM data in the present invention. FIG. 43 shows transmission to a subscriber Y from a subscriber X, while FIG. 44 shows transmission to a subscriber Z from a subscriber X. The exchanges shown in FIG. 43 and FIG. 44 are respectively composed of a large unit 1000, medium units 2000-1 to 2000-2 connected to the large unit and small units 3000-1 to 3000-3.

a) Communication Between Small Units Accommodated in the Same Medium Unit

A communication between an ATM subscriber X connected to the small unit 3000-1 and an ATM subscriber Y connected to the small unit 3000-1 will be explained with reference to FIG. 43. The control section assigns, at the time of starting the communication, the VPI/VCI on the transmission line in the procedures explained above. Namely, the control section notifies VPI/VCI=1105 to the ATM subscriber X as VPI/VCI to the ATM subscriber Y from the ATM subscriber X, and also sets a header converting table indicating to convert VPI/VCI=1105 to VPI/VCI=1334 to ATMSH of the small unit 3000-1, an exchange table indicating transfer of the fixed length packet having VPI/VCI=1334 to the small unit 3000-2 to the medium unit 2000-1 and a registration table as the fixed length packet to fetch VPI/VCI=1334 to ATMSH accommodating the ATM subscriber Y of the small unit 3000-2. Moreover, the control section notifies VPI/VCI=3354 to the ATM subscriber Y as VPI/VCI to the ATM subscriber X from the subscriber Y and also sets a header converting table indicating to convert VPI/VCI=3354 to VPI/VCI=2455 to ATMSH of the small unit 3000-2, an exchange table indicating transfer of the fixed length packet having VPI/VCI=2455 to the small unit 3000-1 to the medium unit 2000-1 and a registration table as the fixed length packet for fetching VPI/VCI=2455 to ATMSH accommodating the ATM subscriber X of the small unit 3000-1.

ATMSH of the small unit 3000-1 changes VPI/VCI of the ATM cell from the ATM subscriber X to 1334 from 1105 and then inserts such VPI/VCI to the idle ATM time slot of the ring type transmission line. The small switching controller of the small unit 3000-1 sends the data on the ring type transmission line in direct to the medium unit 2000-1. The matching circuit provided in the line accommodating the small unit 3000-2 of the medium unit 2000-1 receives the fixed length packet having VPI/VCI=1334 in accordance with the table and then transmits the packet to the small unit 3000-2. TMSH accommodating the ATM subscriber Y fetches the fixed length packet having VPI/VCI=1334 in accordance with the setting table from the ATM time slot flowing into the ring type transmission line and then transmits this packet to the ATM subscriber Y.

Meanwhile, the ATM cell to the ATM subscriber X from the ATM subscriber Y is also subjected to the header conversion depending on the preset table by the same method and is then transmitted via the medium unit 2000-1.

b) Communication Between Small Units Accommodated in Different Medium Units

Next, communication between the ATM subscriber X connected to a small scale cell exchange 3000-1 and the ATM subscriber Z connected to a small scale cell exchange 3000-3 will be explained with reference to FIG. 44. The control section 1500 assigns, at the time of starting communication, VPI/VCI on each transmission line. Namely, The control section notifies VPI/VCI=1105 to the ATM subscriber X as VPI/VCI to the ATM subscriber Z from the ATM subscriber X and also sets a header conversion table indicating conversion of VPI/VCI=1105 to VPI/VCI=1134 to ATMSH of the small unit 3000-1, an exchange table indicating conversion of the fixed length packet having VPI/VCI=1334 to the ATM cell having VPI/VCI=3 to the medium unit 2000-1, a header conversion table for converting input side VPI/VCI=3 to the output side VPI/VCI=7 and setting a tag information to the switching to AIFSH1200-2 to AIFSH1200-1 of the large unit, an exchange table indicating conversion of the ATM cell having VPI/VCI=7 to the fixed length packet having VPI/VCI=3899 and also indicating transfer to the small unit 3000-3 to the medium unit 2000-2 and a registration table for changing the fixed length packet having VPI/VCI=3899 to the packet to be fetched to ATMSH accommodating the ATM subscriber Z of the small unit 3000-3.

Moreover, the control section notifies VPI/VCI=4012 to the ATM subscriber Z as VPI/VCI to the ATM subscriber X from the ATM subscriber Z and also sets a header conversion table for converting VPI/VCI=4012 to VPI/VCI=5312 to ATMSH of the small unit 3000-3, an exchange table for converting the fixed length packet having VPI/VCI=5312 to the ATM cell having VPI/VCI=4 to the medium unit 2000-2, a header conversion table for converting the input side VPI/VCI=4 to the output side VPI/VCI=9 and setting the tag information for switching to AIFSH 1200-1 to AIFSH 1200-2 of the large unit, an exchange table for converting the ATM cell having VPI/VCI=9 to the fixed length packet having VPI/VCI=6000 and transferring it to the small unit 3000-1 to the medium unit 2000-1 and a registration table for changing the fixed length packet having VPI/VCI=6000 to the packet to be fetched to ATMSH accommodating the ATM subscriber X of the small unit 3000-1.

ATMSH of the small unit 3000-1 changes VPI/VCI of the ATM cell from the ATM subscriber X to 1134 from 1105 and inserts the VPI/VCI=1134 to the idle ATM time slot of the ring type transmission line. The small switching controller of the small unit 3000-1 sends the data on the ring type transmission line to the medium unit in direct. The matching circuit provided on the line directed to the large unit of the medium unit 2000-1 converts the cell having VPI/VCI=1134 to the ATM cell having VPI/VCI=3 depending on the table. AIFSH 1200-1 of the large unit converts the input side VPI/VCI=3 of the ATM cell to the output side VPI/VCI=7. Therefore, the ATM cell is switched to the medium unit 2000-2 via the AIFSH 1200-2 of the large unit. The medium unit 2000-2 converts the ATM cell having VPI/VCI=7 to the fixed length packet having VPI/VCI=3899 and inserts this packet to the idle ATM time slot directed to the small unit 3000-3 by means of the matching circuit of the line accommodating the small unit 3000-3. ATMSH accommodating the ATM subscriber Z fetches the fixed length packet having VPI/VCI=3899 from the ATM time slot depending on the setting table flowing into the ring type transmission line and converts it to the ATM cell to send it to the ATM subscriber Z.

On the other hand, with the similar method as explained above, the ATM cell to the ATM subscriber X from the ATM subscriber Z is transmitted via the medium unit 2000-2, large unit 1000 and medium unit 2000-2.

As explained previously, the present invention provides the first effect that the manufacturing cost can be to reduce and the development of the STM exchange and the ATM exchange are effectively because the basic configuration of the STM exchange and the ATM exchange are common hardware and software.

The present invention provides the second effect that exchange in unit of the ATM data can be realized because the ATM data is exchanged in unit of the ATM time slot, the STM data can also be exchanged in unit of the STM time slog and moreover in unit of the STM data stored in the payload of the fixed length packet and thereby two kinds of different type data can be exchanged in one exchange.

The present invention provides the third effect that since the STM time slot for loading the STM data is formed by an artificial virtual time slot and the STM data is assigned in unit of the virtual time slot, quality of the STM data can be assured.

The present invention provides the fourth effect that since the ATM exchange interface is constituted similar to the standard ATM exchange interface, the hardware and software package of the STM exchange can be used in common with that of the ATM exchange and thereby cost reduction may be realized.

The present invention provides the fifth effect that sequence of the ATM cells received from different hybrid exchanges can always be set constant using the management information having the identification information and thereby periodicity of the STM data can be maintained and moreover since the transmission sequence of the ATM cells from the same hybrid exchange can be set constant using the management information including the identification information and sequence information, periodicity of the STM data can be maintained.

The present invention provides the sixth effect that since re-arrangement of the payload of the ATM cell is executed, dividing loss of the ATM cells may be reduced, loss of calls may also be reduced and effective use of the system resources can be realized.

It will be recognized that various embodiments other than the above-described may be employed without departing from the invention described above, the scope of which is set forth in the following claims.

What is claimed is:

1. A hybrid switching system for switching a first fixed length packet for storing STM (Synchronous Transfer Mode) data composition for a plurality of subscribers and a second fixed length packet for storing STM data of one subscriber to the payload of said second fixed length packet, the hybrid switching system comprising:
   an identifier setting means for setting one of an STM and ATM identifier indicating existence of an STM data to a header of the first fixed length packet and setting said one of the STM and ATM identifier indicating existence of an ATM data to a header of the second fixed length packet;
   a storing means for storing sequence information in the header of the first fixed length packet and position information of a payload of the first fixed length packet corresponding to each STM data;
   an identifying means for identifying the first and second fixed length packets depending on said one of the STM and ATM identifier;
   an STM data switching means for switching the first fixed length packet on the basis of the sequence information and position information stored in said storing means; and
   an ATM data switching means for switching the second fixed length packet in unit of the ATM data.

2. A switching system for transmitting and receiving ATM cells, the switching system comprising:
   an ATM exchange for switching the ATM cells, each ATM cell having a plurality of STM data into a payload; and
   a plurality of hybrid exchanges, connected to said ATM exchange, for switching the ATM cells and the STM data,
   wherein at least two said hybrid exchanges transmit the ATM cell to the ATM exchange, each said hybrid exchange having inserting means for inserting STM data into STM time slots constructed in a payload of the ATM cell, the STM time slots being periodically assigned to the STM data, and management information setting means for setting, to a header of the ATM cell, a management information consisting of a transmission sequence information within a predetermined period and an identifying information for identifying which hybrid exchange transmits the ATM cell, and
   at least one hybrid exchange receives the ATM cell from said ATM exchange, said hybrid exchange having sequence setting means for setting a reception sequence in a predetermined period of the ATM cell received from the ATM exchange on the basis of said management information in the header of the ATM cell.

3. The switching system according to claim 2, wherein said sequence setting means comprising:
   means for storing said management information included in the header of the ATM cell received in correspondence to the receiving sequence, and
   means for setting the receiving sequence of the ATM cell received on the basis of information from said storing means.

4. A re-arrangement method for STM data in an exchange for transmitting and receiving a fixed length packet and arranging a plurality of STM data in a payload of the fixed length packet depending on a destination address in a header of said fixed length packet and switching the STM data in unit of the STM data arranged in the payload, the method comprising the steps of:
   detecting a fixed length packet having idle areas larger than a predetermined value in the payload of the fixed length packet;
   judging whether or not a total value of the idle areas of a payload of a plurality of fixed length packets detected in said detecting step is larger than the predetermined value; and
   re-arranging the STM data arranged in the payload of a plurality of the fixed length packets to eliminate the idle areas in the payload when the total idle areas in the payload of a plurality of fixed length packets is urged to be larger than the predetermined value in said judging step.

5. A re-arrangement method for STM data in an exchange for transmitting and receiving fixed length packets by arranging a plurality of STM data in a payload of the fixed length packets depending on a destination in a header of said fixed length packets and switching such STM data in unit of the STM data arranged in the payload, the method comprising the steps of:
   detecting fixed length packets having idle areas by monitoring whether there is an idle area in a payload of each fixed length packet;
   identifying whether or not a detected fixed length packet is a fixed length packet of the same destination depending on the header of a plurality of fixed length packets detected by said detecting step; and
   re-arranging, when said plurality of fixed length packets of the same destination are detected in said identifying step, the STM data among a plurality of fixed length packets to reduce the number of the fixed length packets having idle areas in the payload.

6. A method for exchanging, in a hybrid exchange, periodically transmitting first type data and second type data through time-division-multiplexed slots of a fixed length, each of said fixed length slots including a first slot and a second slot; the method comprising the steps of:
   switching first type data and second type data through time-division-multiplexed slots of fixed length, the fixed length slots including first type slots and second type slots comprising:
   inserting said first type data from a first type terminal with an identifier indicating the first type data into one of the first type slots which is assigned to said first type terminal, said first type slots being periodically assigned to said first type data;
   identifying said first type slots with an identifier indicating said first type data and extracting said first type data from one of said first type slots which is assigned to said first type terminal;

inserting said second type data from a second type terminal with an identifier indicating the second type data into said second type slots, said second type slots being non-periodically assigned to said second type data;

identifying said second type slots with an identifier indicating said second data and extracting said second type data from one of said second type slots which relates to said second type terminal and transmitting said first type data over said first type slot and said second type data over said second type slot.

7. A method according to claim 6, wherein said first type slot is divided into a plurality of virtual time slots, said periodically assigning step periodically assigning a time slot to said first type data and said step of identifying said first type slot extracting said first type data from said virtual time slot.

8. A hybrid switching system for switching first type data and second type data through time-division-multiplexed slots of fixed length, the fixed length slots including first type slots and second type slots, comprising:

a plurality of first type interfaces, each of first type interfaces including first inserting means accommodating a first type terminal for inserting said first type data from said first type terminal with an identifier indicating the first type data into one of the first type slots which is assigned to said first type terminal accommodated therein, said first type slots being periodically assigned to said first type data and first extracting means for identifying said first type slots with an identifier indicating said first type data and extracting said first type data from one of said first type slots which is assigned to said first type terminal accommodated therein:

a plurality of second type interfaces, each of said second type interfaces including second inserting means accommodating a second type terminal for inserting said second type data from said second type terminal with an identifier indicating the second type data into said idle second type slots, said second type slots being non-periodically assigned to said second type data, and second extracting means for identifying said second type slots with an identifier indicating said second data and extracting said second type data from one of said second type slots which relates to said second type terminal accommodated therein; and a transmitting section transmitting said first type data over said first type slot and said second type data over said second type slot.

9. A hybrid switching system according to claim 8, further comprising means for assembling said extracted data into cells for delivering to an ATM exchange.

10. A hybrid switching system according to claim 8, wherein said first type slot is divided into a plurality of virtual time slots, said first inserting means periodically assigns said virtual time slot to said first type data and said first extracting means extracts said first type data from said virtual time slot.

11. A hybrid switching system for switching an STM (Synchronous Transfer Mode) data to be transmitted between STM terminals and an ATM (Asynchronous Transfer Mode) data to be transmitted between ATM terminals, comprising:

a synchronous transmission terminal interface section, coupled to an STM terminal for mutually converting between the STM data and a first type fixed length packet, the STM data sent from the STM terminal;

an asynchronous transmission terminal interface section, coupled to an ATM terminal for mutually converting between the ATM data and a second type fixed length packet, the ATM data sent from the ATM terminal;

an ATM exchange interface section, coupled to an ATM exchange handling ATM cells, for switching the ATM cells based on a routing information of the header and assembling and disassembling between said first type fixed length packet or said second type fixed length packet and said ATM cells; and a transmitting section, coupled to said synchronous transmission terminal interface section, said asynchronous transmission terminal interface section and said ATM exchange-interface section, for transmitting the STM data over the first type fixed length packet and the ATM data over the second type fixed length packet.

12. A hybrid switching system for switching STM (Synchronous Transfer Mode) data and ATM (Asynchronous Transfer Mode) data transmitted through time-division-multiplexed slots of fixed length, the fixed length slots including STM time slots and ATM time slots, comprising:

a plurality of STM interfaces, each of STM interfaces including first inserting means accommodating an STM terminal for inserting said STM data from said STM terminal with an identifier indicating the STM data into one of the STM time slots which is assigned to said STM terminal accommodated therein, said STM time slots being periodically assigned to said STM data, and first extracting means for identifying said STM time slots with an identifier indicating said STM data and extracting said STM data from one of said STM time slots which is assigned to said STM terminal accommodated therein;

a plurality of ATM interfaces, each of ATM interfaces including second inserting means accommodating an ATM terminal for inserting said ATM data from said ATM terminal with an identifier indicating the ATM data into said idle ATM time slots, said ATM time slots being non-periodically assigned to said ATM data, and second extracting means for identifying said ATM time slots with an identifier indicating said ATM data and extracting said ATM data from one of said ATM time slots which relates to said ATM terminal accommodated therein; and a transmitting section transmitting said STM data over said STM time slot and said ATM data over said ATM time slot.

13. A hybrid exchange according to claim 12, wherein said first inserting means inserts a fixed length packet having said one of the STM and ATM identifier in a header and a plurality of STM data in a payload section into said STM time slot, and said first extracting means extracts the STM data from the payload section of said fixed length packet.

14. A hybrid exchange according to claim 12, further comprising means for assembling said extracted data into cells for delivering to an ATM exchange.

15. The method according to claim 6, further comprising the step of creating cells for delivery to an ATM exchange using said extracted data.

16. A hybrid switching system for switching first type data and second type data through time-division- multiplexed slots of fixed length, the fixed length slots including first type slots and second type slots, comprising:

first inserting means for inserting said first type data with an identifier indicating the first type data into said first type slots, said first type slots being periodically assigned to said first type data;

first extracting means for identifying said first type slots with an identifier indicating said first type data and extracting said first type data from said first type slots;

second inserting means for inserting said second type data with an identifier indicating the second type data into said second type slots, said second type slots being nonperiodically assigned to said second type data;

second extracting means for identifying said second type slots with an identifier indicating said second data and extracting said second type data from said second type slots; and a transmitting section, which has a ring type transmission line, transmitting said first type data over said first type slot and said second type data over said second type slot on the ring type transmission line.

17. A hybrid switching system for switching an STM (Synchronous Transfer Mode) data to be transmitted between STM terminals and an ATM (Asynchronous Transfer Mode) data to be transmitted between ATM terminals, comprising:

a synchronous transmission terminal interface section, coupled to an STM terminal for mutually converting between the STM data and a first type fixed length packet, the STM data sent from the STM terminal;

an asynchronous transmission terminal interface section, coupled to an ATM terminal for mutually converting between the ATM data and a second type fixed length packet, the ATM data sent from the ATM terminal;

an ATM exchange interface section, coupled to an ATM exchange handling ATM cells, for switching the ATM cell based on a routing information of the header and assembling and disassembling between said first type fixed length packet or said second type fixed length packet and said ATM cell; and a transmitting section, which has a ring type transmission line, for transmitting the STM data over the first type fixed length packet and the ATM data over the second type fixed length packet.

18. A hybrid switching system for switching STM (Synchronous Transfer Mode) data and ATM (Asynchronous Transfer Mode) data transmitted through time-division-multiplexed slots of fixed length, the fixed length slots including STM time slots and ATM time slots, comprising:

first inserting means for inserting said STM data with an identifier indicating the STM data into the STM time slots, said STM time slots being periodically assigned to said STM data;

first extracting means for identifying said STM type slots with an identifier indicating said STM data and extracting said STM data from said STM time slots;

second inserting means for inserting said ATM data from said ATM terminal with an identifier indicating the ATM data into said idle ATM time slots, said ATM time slots being non-periodically assigned to said ATM data;

second extracting means for identifying said ATM time slots with an identifier indicating said ATM data and extracting said ATM data from said ATM time slots; and a transmitting section, which has a ring type transmission line, transmitting said STM data over said STM time slot and said ATM data over said ATM time slot on the ring type transmission line.

19. The hybrid exchange according to claim 11, wherein said ATM exchange interface section, further comprising:

means for setting a management information consisting of the transmission sequence information of the ATM cells transmitted to said ATM exchange in a predetermined period and identifying information for identifying a self hybrid exchange to the ATM cell assembled from said first fixed length packet.

20. The hybrid exchange according to claim 11, wherein said ATM exchange interface section, further comprising:

means for setting a receiving sequence of the ATM cells received within the predetermined period on the basis of said management information of said ATM cells.

* * * * *